US009032466B2

(12) United States Patent
Gupta et al.

(10) Patent No.: US 9,032,466 B2
(45) Date of Patent: *May 12, 2015

(54) OPTIMIZED DELIVERY OF INTERACTIVITY EVENT ASSETS IN A MOBILE BROADCAST COMMUNICATION SYSTEM

(75) Inventors: Binita Gupta, San Diego, CA (US); Suryanarayana C. Chittuluri, San Diego, CA (US); Eitan Pilipski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

This patent is subject to a terminal disclaimer.

(21) Appl. No.: 13/004,835

(22) Filed: Jan. 11, 2011

(65) Prior Publication Data

US 2011/0202947 A1 Aug. 18, 2011

Related U.S. Application Data

(60) Provisional application No. 61/294,753, filed on Jan. 13, 2010, provisional application No. 61/305,787, filed on Feb. 18, 2010, provisional application No. 61/310,191, filed on Mar. 3, 2010, provisional (Continued)

(51) Int. Cl.
*H04N 21/47* (2011.01)
*H04N 21/43* (2011.01)
(Continued)

(52) U.S. Cl.
CPC .... *H04N 21/47205* (2013.01); *H04L 29/06387* (2013.01); *H04N 21/8545* (2013.01);
(Continued)

(58) Field of Classification Search
CPC ............... H04N 21/41407; H04N 21/4345; H04N 21/4307; H04N 21/431; H04N 21/47; H04N 21/47205; H04N 21/8545; H04N 21/8547; H04L 29/06387
USPC ................................................. 725/24, 60, 61
See application file for complete search history.

(56) References Cited

U.S. PATENT DOCUMENTS 5,600,378 A   2/1997 Wasilewski
6,530,084 B1 * 3/2003 Del Sesto et al. ............... 725/61
(Continued)

FOREIGN PATENT DOCUMENTS

CN  1382344 A  11/2002
CN  1655595 A   8/2005
(Continued)

OTHER PUBLICATIONS

Crinon R et al: "Data Broadcasting and Interactive Television", Proceedings of the IEEE, New York, US, vol. 94, No. 1, Jan. 1, 2006, pp. 102-118, XP002502467.
(Continued)

*Primary Examiner* — Pinkal R Chokshi
(74) *Attorney, Agent, or Firm* — The Marbury Law Group, PLLC

(57) ABSTRACT

Systems, apparatus and methods provide an automatic capability for delivering interactivity event applications for execution on receiver devices within a broadcast network based upon interactivity event application data, information and sequence logic. Interactivity event content providers may provide to a broadcast network interactivity event application data, event metadata information and sequence logic a broadcast network. Receiver devices may be configured to receive only real-time interactivity event assets relevant to a currently monitored real-time channel, or channels adjacent to the currently monitored channel. Receiver devices may also be configured to avoid acquiring assets for interactive sequences not related to a currently viewed or adjacent channel.

85 Claims, 57 Drawing Sheets

Related U.S. Application Data application No. 61/319,684, filed on Mar. 31, 2010, provisional application No. 61/321,357, filed on Apr. 6, 2010, provisional application No. 61/322,703, filed on Apr. 9, 2010, provisional application No. 61/328,063, filed on Apr. 26, 2010, provisional application No. 61/328,559, filed on Apr. 27, 2010, provisional application No. 61/349,598, filed on May 28, 2010.

(51) Int. Cl.
| | |
|---|---|
| *H04N 21/472* | (2011.01) |
| *H04N 21/431* | (2011.01) |
| *H04N 21/262* | (2011.01) |
| *H04N 21/414* | (2011.01) |
| *H04N 21/434* | (2011.01) |
| *H04N 21/443* | (2011.01) |
| *H04N 21/643* | (2011.01) |
| *H04L 29/06* | (2006.01) |
| *H04N 21/8545* | (2011.01) |
| *H04N 21/8547* | (2011.01) |

(52) U.S. Cl.
CPC ........ *H04N21/8547* (2013.01); *H04N 21/4307* (2013.01); *H04N 21/431* (2013.01); *H04N 21/47* (2013.01); *H04N 21/26266* (2013.01); *H04N 21/41407* (2013.01); *H04N 21/4345* (2013.01); *H04N 21/443* (2013.01); *H04N 21/643* (2013.01)

(56) References Cited

U.S. PATENT DOCUMENTS

| | | | |
|---|---|---|---|
| 6,629,284 | B1 | 9/2003 | Leermakers |
| 6,714,264 | B1* | 3/2004 | Kempisty ...................... 348/732 |
| 6,751,401 | B1 | 6/2004 | Arai et al. |
| 6,806,889 | B1* | 10/2004 | Malaure et al. ............... 715/733 |
| 6,886,178 | B1 | 4/2005 | Mao et al. |
| 7,257,583 | B2 | 8/2007 | Hofmeister et al. |
| 7,596,797 | B1 | 9/2009 | Kapner, III et al. |
| 7,634,787 | B1 | 12/2009 | Gebhardt et al. |
| 7,852,372 | B2 | 12/2010 | Sohmers et al. |
| 7,890,988 | B2 | 2/2011 | Urdang et al. |
| 8,117,564 | B2 | 2/2012 | Woods et al. |
| 8,526,350 | B2 | 9/2013 | Xue et al. |
| 8,640,153 | B2* | 1/2014 | Gatto et al. ...................... 725/12 |
| 2001/0016944 | A1 | 8/2001 | Terakado et al. |
| 2001/0037507 | A1 | 11/2001 | Mori |
| 2001/0054184 | A1 | 12/2001 | Watanabe et al. |
| 2002/0059624 | A1 | 5/2002 | Machida et al. |
| 2002/0092024 | A1* | 7/2002 | Nagaoka et al. ............... 725/62 |
| 2002/0162117 | A1* | 10/2002 | Pearson et al. ................ 725/109 |
| 2002/0184314 | A1 | 12/2002 | Riise |
| 2002/0199187 | A1 | 12/2002 | Gissin et al. |
| 2003/0039237 | A1 | 2/2003 | Forslow |
| 2003/0093530 | A1 | 5/2003 | Syed |
| 2003/0133693 | A1 | 7/2003 | Collins et al. |
| 2004/0215811 | A1 | 10/2004 | Bar et al. |
| 2005/0015796 | A1* | 1/2005 | Bruckner et al. ............... 725/32 |
| 2005/0015816 | A1 | 1/2005 | Christofalo et al. |
| 2005/0251848 | A1 | 11/2005 | Al-Janabi |
| 2006/0019618 | A1 | 1/2006 | Seppala |
| 2006/0026231 | A1 | 2/2006 | Degenhardt et al. |
| 2006/0168624 | A1 | 7/2006 | Carney et al. |
| 2007/0124789 | A1 | 5/2007 | Sachson et al. |
| 2007/0220564 | A1* | 9/2007 | Yano et al. ...................... 725/86 |
| 2007/0256015 | A1 | 11/2007 | Matz |
| 2008/0010342 | A1* | 1/2008 | Gebhardt et al. ............. 709/204 |
| 2008/0086742 | A1* | 4/2008 | Aldrey et al. ................... 725/24 |
| 2008/0216113 | A1 | 9/2008 | Yun et al. |
| 2008/0305737 | A1 | 12/2008 | Childress et al. |
| 2009/0138934 | A1 | 5/2009 | Aoki et al. |
| 2009/0217318 | A1 | 8/2009 | VerSteeg et al. |
| 2009/0276819 | A1 | 11/2009 | Kim et al. |
| 2009/0300143 | A1 | 12/2009 | Musa et al. |
| 2009/0300683 | A1 | 12/2009 | Rynkowski |
| 2010/0058423 | A1* | 3/2010 | Yaussy et al. ................... 725/118 |
| 2010/0095323 | A1 | 4/2010 | Williamson et al. |
| 2010/0131975 | A1* | 5/2010 | Landow et al. ................. 725/34 |
| 2010/0172625 | A1 | 7/2010 | Lee et al. |
| 2010/0262619 | A1 | 10/2010 | Zargahi et al. |
| 2011/0138417 | A1* | 6/2011 | Klappert ......................... 725/40 |
| 2011/0177774 | A1 | 7/2011 | Gupta et al. |
| 2011/0177775 | A1 | 7/2011 | Gupta et al. |
| 2011/0201966 | A1 | 8/2011 | Lubock et al. |
| 2011/0202966 | A1 | 8/2011 | Gupta et al. |
| 2011/0209181 | A1 | 8/2011 | Gupta et al. |
| 2011/0295978 | A1 | 12/2011 | Pazos et al. |
| 2012/0304215 | A1* | 11/2012 | McCarthy et al. .............. 725/24 |

FOREIGN PATENT DOCUMENTS

| | | |
|---|---|---|
| CN | 101077009 A | 11/2007 |
| CN | 101212266 A | 7/2008 |
| EP | 0957597 A2 | 11/1999 |
| EP | 1152605 A1 | 11/2001 |
| EP | 1622278 A2 | 2/2006 |
| EP | 1881667 A1 * | 1/2008 |
| EP | 1881667 A1 | 1/2008 |
| EP | 1940057 A2 | 7/2008 |
| EP | 2007044 A1 | 12/2008 |
| GB | 2423659 A | 8/2006 |
| JP | H11168667 A | 6/1999 |
| JP | 2000031921 | 1/2000 |
| JP | 2000209563 A | 7/2000 |
| JP | 2001127719 A | 5/2001 |
| JP | 2002051020 A | 2/2002 |
| JP | 2003111054 A | 4/2003 |
| JP | 2003223387 A | 8/2003 |
| JP | 2003264817 A | 9/2003 |
| JP | 2004235928 A | 8/2004 |
| JP | 2004241941 A | 8/2004 |
| JP | 2005130085 A | 5/2005 |
| JP | 2005176107 A | 6/2005 |
| JP | 2006115213 A | 4/2006 |
| JP | 2006303938 A | 11/2006 |
| JP | 2006527556 A | 11/2006 |
| JP | 2008544584 A | 12/2008 |
| JP | 2009504070 A | 1/2009 |
| JP | 2009278332 A | 11/2009 |
| JP | 2012529194 A | 11/2012 |
| WO | WO0133852 A1 | 5/2001 |
| WO | WO03107656 A1 | 12/2003 |
| WO | 2004112394 A1 | 12/2004 |
| WO | WO2005104558 A1 | 11/2005 |
| WO | WO2006075148 A2 | 7/2006 |
| WO | 2006086656 A2 | 8/2006 |
| WO | 2007018377 A1 | 2/2007 |
| WO | 2007052736 A1 | 5/2007 |
| WO | 2007109647 A2 | 9/2007 |
| WO | WO2008053568 A1 | 5/2008 |
| WO | 2008147367 A1 | 12/2008 |
| WO | 2009054478 A1 | 4/2009 |
| WO | 2009138041 A1 | 11/2009 |
| WO | 2010141447 A1 | 12/2010 |
| WO | 2011088264 | 7/2011 |

OTHER PUBLICATIONS

Leroux, P. et al: "Synchronized Interactive Services for Mobile Devices over IPDC/DVB-H and UMTS", Broadband Convergence Networks, 2007. BCN '07. 2nd IEEE/IFIP International Workshop on, IEEE, PI, May 1, 2007, pp. 1-12, XP031178259.

Paila, T et al: "FLUTE—File Delivery over Unidirectional Transport; draft-ietf-rmt-flute-revised-11.txt", Internet Engineering Task Force, IETF; Standardworkingdraft, Internet Society (ISOC) 4, Rue Des Falaises CH—1205 Geneva, Switzerland, No. 11, Mar. 2010, pp. 1-42, XP015067217.

"Introduction to Service Provider Video Service Technologies, Architectures, and Standards," 2006, Cisco Systems, Inc.

(56) References Cited

OTHER PUBLICATIONS

Open Mobile Alliance: Service Guide for Mobile Broadcast Services, OMA-TS-BCAST_Service_Guide-V1_0-20090212-A Feb. 12, 2009, pp. 1-232, XP002616290, Retrieved from the Internet : URL : http://member.openmobilealliance.org/ftp/Publicdocuments/bcast/Permanent_documents/OMA-T-BCAST_Service_Guide-V1_0-200902 12-A.zip [retrieved on Jan. 11, 2011] p. 17 p. 19-p. 20 pp. 22-23, "ServiceType".
Open Mobile Alliance (OMA), "Architecture of the Mobile Broadcast Services", V1.0, Feb. 12, 2009, pp. 109, http://www.openmobilealliance.org/Technical/release_program/docs/BCAST/V1_0.20090212-A/OMA-AD-BCAST-V1_0-20090212-A.pdf.
Open Mobile Alliance (OMA), "Broadcast Distribution System Adaptation—3GPP2/BCMCS", V1.0, Feb. 12, 2009, pp. 63, http://www.openmobilealliance.org/Technical/release_program/docs/BCAST/V1_0.20090212-A/OMA-TS-BCAST_BCMCS_Adaptation-V1_0-20090212-A.pdf.
Hu, Jian-Hao, et al. "A Novel Push-and Pull Hybrid Data Broadcast Scheme for Wireless Information Networks." IEEE 2000, pp. 1778-1782, ISBN: 0-7803-6283-7.
International Search Report and Written Opinion—PCT/US2011/021203—ISA/EPO—Jun. 10, 2011.
International Search Report and Written Opinion—PCT/US2011/021208, ISA/EPO—Jun. 10, 2011.
International Search Report and Written Opinion—PCT/US2011/021209, ISA/EPO—Jun. 9, 2011.
International Search Report and Written Opinion—PCT/US2011/021211, ISA/EPO—Jun. 10, 2011.
"ARIB STD-B24 5.1 Edition (Third Separate Volume)", Mar. 2007, Association of Radio Industries and Businesses, pp. 1, 2, 11, 15-43, 64 and 65.
Fukahori K., et al., "Advanced Satellite Communication Platform Based on Japanese BS Digital Broadcasting Standard," NTT R&D, vol. 51, No. 4 (Apr. 2002 Issue), The Telecommunications Association, Apr. 10, 2002, pp. 291-298, ISSN: 0915-2326.
"Interface Extra Edition—Introduction to Digital Broadcasting Basic Technology," Jan. 1, 2002, CQ Publishing Co., Ltd., pp. 134-158.
Mori T., et al., "End-to-End System Architecture for BS Digital Data Broadcasting Service," Matsushita Technical Journal, vol. 46, No. 6, (Dec. 2000 Issue), Matsushita Electric Industrial Co., Ltd., Dec. 18, 2000, pp. 9-18, ISSN: 1343-9529.
"Nikkei New Media Additional volume New Business Unabridged Book for Era of Convergence of Broadcasting and Telecommunications," 1st edition, Jun. 25, 2007, Nikkei Business Publications, Inc., pp. 137-144, ISBN: 978-4-8222-2517-9.

\* cited by examiner

OPTIMIZED DELIVERY OF INTERACTIVITY EVENT ASSETS IN A MOBILE BROADCAST COMMUNICATION SYSTEM

RELATED APPLICATIONS

This application claims the benefit of priority to each of: U.S. Provisional Application No. 61/294,753, entitled "Dynamic Delivery And Execution Of Interactive Applications Over The Mobile Broadcast Network" filed Jan. 13, 2010; U.S. Provisional Application No. 61/305,787, entitled "Signaling Mechanisms, Templates And Systems For Enabling Interactivity On Mobile Devices In A Mobile Broadcast Communication System" filed Feb. 18, 2010; U.S. Provisional Application No. 61/310,191, entitled "Dynamic Delivery And Execution Of Interactive Applications Over A Mobile Broadcast Network" filed Mar. 3, 2010; U.S. Provisional Application No. 61/319,684, entitled "Signaling Mechanisms, Templates And Systems For Enabling Interactivity On Mobile Devices In A Mobile Broadcast Communication System" filed Mar. 31, 2010; U.S. Provisional Application No. 61/321,357, entitled "Signaling Mechanisms, Templates And Systems For Enabling Interactivity On Mobile Devices In A Mobile Broadcast Communication System" filed Apr. 6, 2010; U.S. Provisional Application No. 61/322,703, entitled "Optimized Delivery Of Interactivity Event Assets In A Mobile Broadcast Communication System" filed Apr. 9, 2010; U.S. Provisional Application No. 61/328,063, entitled "Notification Of Interactivity Event Asset Delivery Sources In A Mobile Broadcast Communication System" filed Apr. 26, 2010; U.S. Provisional Application No. 61/328,559, entitled "Dynamic Interactive Application Generation Based On User Generated Interactive Elements Over A Mobile Broadcast Network" filed Apr. 27, 2010; and U.S. Provisional Application No. 61/349,598, entitled "File Delivery Over A Broadcast Network Using File System Abstraction, Broadcast Schedule Messages And Selective Reception" filed May 28, 2010, the entire contents of each of which are hereby incorporated by reference.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. A recent addition to wireless communication services has been the ability to broadcast television and other content to receiver devices. Multimedia forward link only (FLO) broadcast services allow users to view multimedia programming, such as television shows, as well as receive mobile editions of news, entertainment, sports, business, Internet data, data files and other content, using a mobile receiver device configured to receive the mobile broadcast transmissions. Multimedia broadcast services represent significant bandwidth that may be used for delivering a variety of services to mobile devices.

SUMMARY

The various embodiments provide systems, devices, methods and non-transitory computer readable media storing software for efficiently delivering applications, such as interactivity applications, to receiver devices via a multi-media broadcast network. The various embodiments enable generating and broadcasting an electronic catalog of applications, interactivity events, templates and related data to inform receiver devices of when and how to receive such content of interest. The various embodiments also enable broadcasting interactivity event signaling messages to enable receiver devices to properly implement interactivity events, including assembling event content from templates and data previously received and stored in memory.

The various embodiments enable configuring receiver devices to receive only real-time interactivity event assets (i.e., application data and resources for interactivity events to be displayed on a real-time channel) which are relevant to a currently monitored real-time channel. The various embodiments enable configuring receiver devices to receive channels adjacent to the currently monitored channel within a program listing or program guide in order to conserve device processing and battery power. The various embodiments enable configuring receiver devices to avoid acquiring assets for interactive sequences not related to a currently viewed or adjacent channel. The various embodiments further provide mechanisms and methods for efficiently delivering such content and conserving receiver device battery power. In various embodiments, assets and/or resources may be delivered close to the start time of the event such that only those devices which are tuned into a channel close to and/or adjacent to a currently viewed channel and interactivity event acquire the assets and/or resources. In such embodiments, the assets and/or resources may more readily target devices that are most likely to use particular assets/resources for displaying interactivity events. These and other functions and benefits of the various embodiments are described below in the detailed description.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
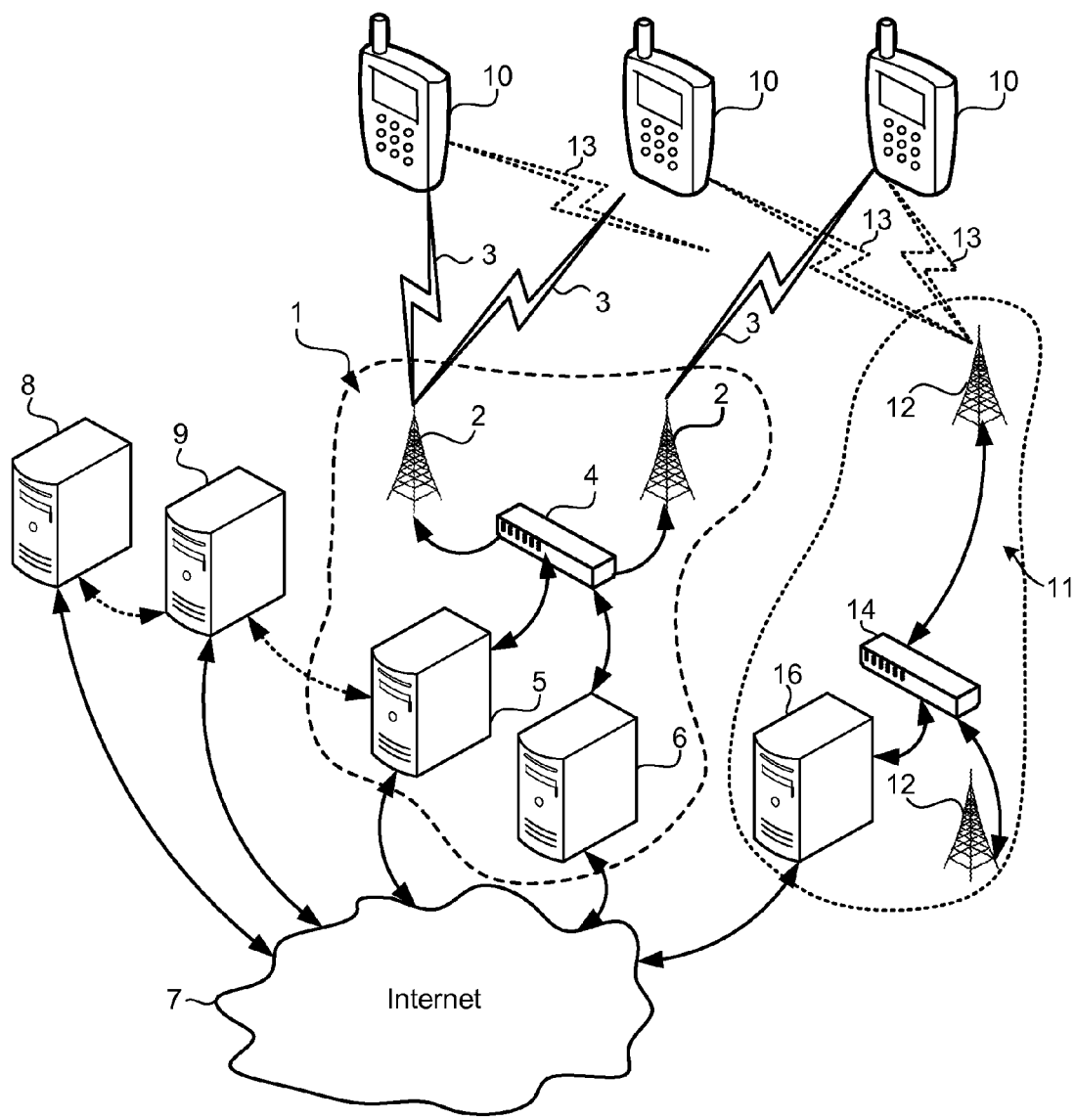
FIG. 1A is a communication system block diagram illustrating a mobile multimedia broadcast communication system and cellular "unicast" communication system suitable for use in an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "receiver device" are used interchangeably herein to refer to any one or all of mobile media broadcast receivers, cellular telephones, personal television devices, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, receivers within vehicles (e.g., automobiles) and similar personal electronic devices which include a programmable processor and memory and forward-link-only (FLO) mobile TV broadcast receiver circuitry for receiving and processing FLO broadcast transmissions such as MediaFLO® broadcasts.

The word "broadcast" is used herein to mean the transmission of data (information packets) so that it can be received by a large number of receiving devices simultaneously. Examples of broadcast messages are mobile television service broadcast signals, including content broadcasts (content flow) and overhead information broadcasts (overhead flow) such as metadata messages. Since broadcast networks can only transmit and have no direct return communication link, such networks are also referred to herein as "forward link only" (FLO) broadcast networks to distinguish such communication networks from two-way wireless communication networks, such as cellular telephone systems and wireless wide-area networks (e.g., WiFi, WiMAX, etc.).

As used herein an "interactivity event" refers to an event that is delivered with the broadcast media and provides content and functionality triggers for initiating an interactivity function on a mobile device. Interactivity content may be displayed to users on the mobile device in a sequence of one or more scenes, which may be referred to herein as "interactive sequence" (sometimes abbreviated as "iSeq"). An interactive sequence may include a collection of scenes that are bundled into a coherent entity that is intended to be rendered and presented as a single experience to the viewer. Interactive sequence application data includes scene information, text, images and user actions related metadata that can be used to generate an interactive sequence. As used herein, interactivity event application data includes or refers generally to event metadata, scene templates data, user actions and sequence logic. As used herein, the term "interactivity assets" refers generally to images and graphics used in an interactivity sequence or as part of an interactivity event. The term "interactivity resources" is used herein as a generic term to refer to a variety of resources used in an interactivity event, including application data, templates and interactivity assets.

A number of different mobile broadcast television services and broadcast standards are available or contemplated in the future, all of which may implement and benefit from the various embodiments. Such services and standards include Open Mobile Alliance Mobile Broadcast Services Enabler Suite (OMA BCAST), MediaFLO®, Digital Video Broadcast IP Datacasting (DVB-IPDC), Digital Video Broadcasting-Handheld (DVB-H), Digital Video Broadcasting-Satellite services to Handhelds (DVB-SH), Digital Video Broadcasting-Handheld 2 (DVB-H2), Advanced Television Systems Committee-Mobile/Handheld (ATSC-M/H), and China Multimedia Mobile Broadcasting (CMMB). While the broadcast formats and terminology vary among the different mobile multimedia broadcast service standards, they all employ metadata transmissions to enable mobile devices to receive selected content and inform users of programs and content available for viewing or download. For ease of reference, the various embodiments are described with reference to the MediaFLO® system, which is implemented in the FLO TV® broadcast systems. However, references to MediaFLO® terminology and technical details are for illustrative purposes only and are not intended to limit the scope of the claims to a particular FLO communication system or technology unless specifically recited in the claim language.

The various embodiments provide mechanisms and systems for delivering applications in a manner that supports user interactivity with mobile broadcast content via mobile receiver devices. An interactivity feature enables user engagement while the user is watching a particular broadcast content, such as a TV program or commercial, on his or her mobile device. Interactivity features enable active watching (as opposed to passive watching) by allowing users to actively interact and participate with content presented on their mobile devices. Users watching real-time content may be drawn into participating with the presented content, program sponsors, program producers and/or the broadcasting network. Interactive enticement items may be signals, instructions and/or data sent to the receiver devices, processed by applications running on the receiver devices, and displayed to the users. These interactive enticement items may cause the receiver device to display content that invites the users to click the display for more information, to vote on some aspect in the content, to have product details sent to them, initiate a purchase transaction (e.g., for advertised goods), and/or engage in other participation aspects. For example, interactive enticement items may be used to present users with an opportunity to request additional information related to a product in an advertisement, receive programming information related to an ongoing program, provide comments about the program, or respond to surveys, to name just a few types of possible interactivity actions. Such interactivity features may improve the user experience. The various embodiments provide an efficient mobile multimedia broadcast mechanism, which may be used to more fully support interactivity content.

The various embodiments provide signaling mechanisms to support presenting interactive content on receiver devices. These signaling mechanisms enable broadcasters to inform receiver devices of various resource flows. Receiver devices use these resource flows to obtain resources and signaling information for interactivity events related to monitored content, such as a TV program or commercial. Receiver devices may also use these resource flows to obtain resources and signaling information for interactivity events not bound to any specific monitored content/channel. More details regarding suitable systems, messages and methods that may be used for delivering and selectively receiving interactivity event files over a broadcast channel are described in U.S. patent application Ser. No. 13/004,702, entitled "File Delivery Over A Broadcast Network Using File System Abstraction, Broadcast Schedule Messages And Selective Reception", which is filed concurrently herewith and assigned to the assignee of the present application, and which is incorporated herein by reference in its entirety.

These signaling mechanisms provided by the various embodiments may include interactivity signaling flows (ISF) and interactivity resource flows (IRF). In various embodiments, the interactivity signaling flows may be used to carry interactivity event signaling messages (IESM), whereas the interactivity resource flows may be used to carry interactivity resources that are associated with the interactivity events. In an embodiment, both the interactivity resources and the interactivity event signaling messages may be broadcast on the same flow, such as on a generic interactivity flow. In various embodiments, the interactivity signaling flows and the interactivity resource flows may be carried on different flows. In other embodiments, the interactivity signaling flows and interactivity resource flows may be carried on the same flow.

The signaling mechanisms provided by the various embodiments also enable broadcasters to direct receiver devices to non-broadcast sources to obtain the interactivity event signaling messages (IESM) and resources. The signaling mechanisms disclosed by the various embodiments provide interactivity event broadcasting systems greater flexibility and expandability. The signaling mechanisms provided by the various embodiments also enable the flexible use of multiple interactivity signaling flows and interactivity resource flows, which may be shared across multiple channels.

To enable interactivity events, content providers may use an interactivity production system (IPS) to generate interactivity elements. Interactivity elements may include images, shapes, text, assigned user input functionality, graphics effects, and executable instructions—the combination of which may be used to generate the desired interactivity display on mobile devices. The various embodiments provide mechanisms for broadcasting these interactivity elements to mobile devices in interactivity event signaling messages (IESM) and/or file delivery streams. In order to improve efficiency, the various embodiments also provide mechanisms to broadcast these interactivity elements (e.g., application data, resources [e.g., images, graphics, etc.] and event templates) out-of-band from IESM over file delivery streams, in advance of event timing, to mobile devices. This allows the broadcasted data to be identified and invoked simply by including the resource identifier in the interactivity event signaling message.

In some circumstances, such as when an interactivity event is scheduled at the last minute, the application data and/or resources may need to be broadcast very close in time (i.e., such as a few seconds before) to the start time for an interactivity event. To support such circumstances, the various embodiments provide mechanisms for broadcasting the interactivity event application data (IEAD) and resources and templates in-band, as part of the interactivity event signaling message (IESM). Thus, the various embodiments provide mechanisms for broadcasting the content and resources both in-band and out-of-band.

In various embodiments, templates may be used to reduce the amount of data required in a particular interactivity event signaling message (IESM). In various embodiments, the data required in a particular interactivity event signaling message may be reduced to a template identifier and simple text field that may be imported into the appropriate locations within the identified template. In various embodiments, predefined resources and templates may be downloaded and updated over the air via the broadcast communication system. In various embodiments, mobile devices may select for reception only the required and compatible resources and templates. These templates and resources can be shared across multiple ITV events.

In various embodiments, interactivity events may be shown outside the context of a particular broadcast program or commercial. In various embodiments, interactivity events may be synchronized with a particular broadcast content, such as a TV program or commercial. In order to synchronize interactivity events with particular program and/or advertising content (e.g., an interactive ad), the various embodiments may use the signaling mechanisms to enable the interactivity event to be implemented at an appropriate time. In various embodiments, the signaling messages may be broadcast at different intervals to improve bandwidth utilization while ensuring events are received and implemented on time.

In various embodiments, interactivity events may be assigned a priority. Assigning a priority to the interactivity events enables receiver devices to implement or ignore overlapping interactivity events in accordance with desires of the broadcaster, event provider or content provider. In various embodiments, the signaling mechanisms may be used to update or cancel interactivity events over the air after they have been downloaded. In various embodiments, interactivity events may be targeted to particular set of mobile receiver devices and/or users based upon a wide variety of selection and filtering criteria.

As discussed above, in various embodiments, mobile devices may be configured to select for reception only the required and compatible resources and templates. In various embodiments, receiver devices may be configured to receive just the interactivity event assets (i.e., application data and resources for interactivity events to be displayed on a real-time channel) relevant to a currently monitored real-time channel. In various embodiments, receiver devices may be configured to receive the interactivity event assets relevant to a currently monitored real-time channel, as well as ITV event assets relevant to one or more adjacent channels. An adjacent channel may be defined as a channel adjacent to the currently monitored channel within a program listing or program guide. Thus, the various embodiments enable receiver device to conserve device processing and battery power by receiving information for adjacent channels simultaneously with the information for a currently monitored channel.

In accordance with the various embodiments, a mobile multimedia broadcast system may broadcast multiple real time channels at the same time. In certain situations, as consumers, broadcasters and advertisers demand more and more interactivity events, the demand for interactivity events could exceed the available bandwidth. To accommodate such growth, the various embodiments provide mechanisms for broadcasting a dedicated interactivity signaling flow (ISF) and interactivity resource flow (IRF) per real-time channel. In order to reduce the latency associated with delivering interactivity signaling events and resources, the various embodiments provide mechanisms for using multiple signaling and resource flows simultaneously.

In addition to accommodating growth, the various embodiments provide mechanisms for managing spikes in usage and demand. That is, on certain networks, the amount of bandwidth associated with interactivity event signaling and resource transmissions may vary from hour to hour and day to day. Accordingly, the various embodiments provide a flexible mechanism for delivering interactivity resources to receiver devices in a manner that can expand and adapt to the spikes in usage and demand.

As discussed above, the various embodiments provide a flexible mechanism for delivering interactivity resources to receiver devices. The various embodiments provide a mechanism for accommodating such flexibly by supplying one or more resource file data flows (RFDF) that receiver devices can tune to in order to acquire the resources for scheduled interactivity events. In various embodiments, one or more of these resource file data flows may carry a catalog file that lists interactivity resources and associated filtering information. In various embodiments, resources may be broadcast on multiple data flows. For example, the catalog file may be broadcasted on a first file data flow while other resources are broadcasted on a second file data flow.

As discussed above, in various embodiments, resources and the catalog file may be broadcast on multiple data flows. Multiple flows are particularly useful when the catalog file needs to be sent more frequently than the resources. In such circumstances, receiver devices need a way to determine which broadcast file data flows are carrying interactivity resources for interactivity sequences targeted to particular real-time channels. Receiver devices must make this determination to acquire resources for service bound interactivity events. To acquire resources for unbound interactivity events (i.e., interactivity events which are not tied to particular real-time channels) receiver devices also need to determine which broadcast file data flows are carrying interactivity resources for the unbound interactivity sequences.

In various embodiments, interactivity event signaling messages (IESM) may be sent on multiple data flows. That is, interactivity event signaling messages may be sent on one or more broadcast signaling flows (BSFs) that receiver devices can tune to in order to acquire interactivity signaling for scheduled interactivity events. In these embodiments, receiver devices need a way to determine which broadcast signaling flows are carrying interactivity signaling for interactivity sequences targeted for particular real-time channels. Receiver devices must make this determination to acquire signaling for service bound interactivity events. To acquire signaling for unbound interactivity events (i.e., interactivity events which are not tied to particular real-time channels), receiver devices also need to determine the broadcast signaling flows carrying interactivity signaling for unbound interactivity sequences.

The various embodiments address these needs by providing a mechanism through which broadcast flows carrying interactivity resources and signaling information can be identified to receiver devices in Service System Information (Service SI) overhead information. The various embodiments also enable informing receiver devices of non-broadcast sources for interactivity event resources, such as a unicast server hosting interactivity resources which can be fetched by receiver devices.

Currently, wireless application delivery systems generally require mobile devices to expressly request each application download. Each download request must then be communicated to a server through a unicast network, such as a cellular telephone network or wide-area wireless network. An application server must then process the request and spend the application to the mobile device. This process requires significant processing and bandwidth, and makes current wireless application delivery systems inefficient for delivering applications to a large number of devices simultaneously.

Additionally, current wireless application delivery systems generally require that the mobile devices be informed of the existence of all the applications available for download, be configured (through software) to determine a need for each particular application, and expressly request that the appropriate file be downloaded. This also requires significant bandwidth and further contributes to the inefficiency of current wireless application delivery systems. As a result, the current wireless application delivery systems are ineffective for delivering high-demand and time-critical applications to a large number of recipients at the same time. Time-critical applications are applications that are required to be on mobile devices at a guaranteed and/or specific time. The ability to deliver time-critical application is an important feature in application delivery systems that support user interactivity.

The various embodiments enable mobile receiver devices to be self-contained by broadcasting information about the programs and content that will be broadcast in the future. This information is broadcast through a portion of broadcast transmission stream dedicated to carrying metadata and overhead information about content flows. This portion is separate from the portion of the broadcast transmission that carries the content (referred to herein as "content flow" or "broadcast stream"). The information about the content, or "metadata," enables mobile devices to discover how and when to receive selected content.

The various embodiments disclosed in this application also enable more efficient delivery of time-critical applications. Specifically, the various embodiments use the high bandwidth of mobile multimedia broadcast networks, such as a MediaFLO® network, to deliver applications much more efficiently than the current wireless application delivery systems. The embodiments enable mobile multimedia broadcast networks to "push" applications to receiver devices over only a portion of the available bandwidth, such as the portion of bandwidth used for file delivery services.

The various embodiments enable content providers to deliver files and metadata (making up the applications) to an application server within a broadcast system. The broadcast system may assemble and package the applications for broadcast. Applications that are ready for broadcast may be listed in an electronic catalog. In a first broadcast step, the catalog may be broadcasted to receiver devices as part of the broadcast overhead stream. Then, in a second broadcast step, at a time indicated in the electronic service guide or overhead signaling related to file delivery system, the applications themselves may be broadcast by the mobile multimedia broadcast network. This two step process allows the receiver devices to selectively receive relevant applications over the high bandwidth of a mobile multimedia broadcast network. This also allows applications to be more efficiently delivered to large numbers of devices simultaneously.

In the receiver devices, the listing of applications in the catalog may be monitored or filtered to select those applications that are compatible with the receiver device (e.g., model compatibility), are targeted at the receiver device (e.g., based on targeted selection criteria), are indicated for reception by a user (e.g., by a user making a selection from the electronic service guide), and/or match some user preferences, user demographics, or other user-specific targeting criteria. The selected applications may be received at broadcast times designated by the catalog or overhead signaling and stored in a memory. An application manager module may keep track of the received applications stored in memory, until the applications are selected for activation. Applications may be selected for activation based upon a number of activation signals or criteria. The use of activation signals and/or activation criteria enables timely delivery and execution of the applications, and allows the broadcaster to control the exact time an application is to be activated and/or executed.

In various embodiments, applications may be activated in response to receiving a signal within a real-time broadcast stream. The signal may be used to synchronize the activation of an application with an event in a media program (e.g., a TV program or commercial), such as to provide interactivity events. The capability of activating applications based on a received broadcast signal enables activation of downloaded applications in synchrony with broadcast programs, so that applications may be created to be launched at particular times during a broadcast program. This may be used to present mobile device users with enhanced viewing options, such as causing unusual display effects, providing users with the ability to interact with the program, or enabling users to purchase merchandise featured in a program. This allows broadcasters to control what applications are presented to the user, and enables the users to view only the applications that are relevant to the contents of a particular program. This also allows applications to be created such that they support user interactivity.

In an embodiment, applications may be configured to self-delete after activation, enabling one-time only media synchronized applications. In an embodiment, the application may be activated in response to a state or event within the receiver device, such as a time of day, a geographic location (as detected by a GPS receiver, for example), an operating state, a sequence of events, etc. In an embodiment, users may be informed of reception of one or more applications via a display, and prompted to indicate whether an application should be activated. In this case, the received application may be activated in response to a user input. For instance, if the user chooses to activate an application, the application manager may initiate the instantiation of the application. If the user chooses to not to activate the application, the file may be deleted from memory without ever being activated.

In the various embodiments, content providers can create an interactive application by creating specific application logic, assets, resources and metadata files. The application logic and resource files may be combined and packaged for a specific format. For example, in a Flash executable application, a content provider may compile MXML code with associated application assets into a Shockwave Flash formatted file (SWF). The metadata files may include information regarding the system as well as user requirements. The user requirements may include a list of preferences and/or perquisites for running applications on a particular mobile device. For example, a content provider may provide an XML file with a submitted application that includes information supporting delivery of the application to receiver devices. The XML file may also include information regarding the system (e.g., supported mobile devices) and/or user requirements (e.g., subscribers over 18 years old).

In the various embodiments, content providers may submit their applications to the wireless broadcast distribution system (e.g., a MediaFLO® system) for broadcast to mobile devices. Content providers may also identify a specific schedule or time that each application should be pushed to mobile devices. Content providers may also request a Quality of Service (QoS) for each application broadcast. The QoS may be pre-negotiated between content providers and the broadcast system (e.g., based on application types). The billing aspects for application delivery may be based on level of QoS provided by application delivery on the broadcast channel.

The wireless broadcast system may deliver the applications over-the-air (OTA) based on the negotiated QoS. To deliver the application over the air, the contents may be packaged in a content type agnostic format, encoded for broadcast, and sent through the wireless broadcast system. Applications that are to be broadcast OTA may be advertised in advance in the catalog, which is broadcast to mobile devices in an overhead broadcast stream. In various embodiments, one or more application catalog files may be generated and broadcasted simultaneously. For instance, in one embodiment, the broadcast system may generate and broadcast one or more application catalog files for each carrier in the broadcast network.

The catalog may allow mobile devices to discover a set of applications that will be broadcast in the future. This enables the mobile devices to determine which applications will be available for download via selective reception. In various embodiments, the catalog may be broadcast periodically by the broadcast system. In such cases, the catalog may include a list of applications and associated resources which will be broadcast in the future. The broadcast times and broadcast flows on which each application and resources may be received may be included in file delivery overhead flows. The applications that are to be broadcast may be associated with services (service-bound applications) or may be independent of services (unbound applications). Mobile devices may selectively download (i.e., selectively receive and store) both the applications associated with their subscribed services, as well as the unbound applications.

The catalog may also specify filtering criteria. Mobile devices may use the filtering criteria to select the applications to be received. Examples of such filtering criteria may include, e.g., applications targeted to specific device types or device profiles (e.g., applications targeted to iPhone devices), and applications targeted to specific users (e.g., subscribers to particular services), or types or categories of users (e.g., particular demographic categories). For instance, an application could be targeted to English speakers between ages 18-25, in which case only those mobile devices whose users match this demographic category would elect to receive the application broadcast and store the application in memory.

In various embodiments, mobile devices may selectively receive, from the broadcast system, only the applications that are applicable to them, such as per subscription and/or based on filtering criteria. Once a package has been received by the mobile device, an application manager, operating in the device processor, may verify the integrity of the application. The application manager may confirm that all external resources and assets have been received by the mobile device and are available in memory. Once the application manager verifies that all the necessary resources are present, the application manager may notify the user that a new application is available. This notification may be communicated through a user interface (UI), such as the MediaFLO user interface, or through any other notification method available to the user.

At a future point in time, either at the request of the user or through a triggering system event (e.g., based on an interactivity signaling event broadcast OTA), the application may be invoked and launched. When this happens, the UI may request the executable files, metadata and asset URLs from the application manager. In addition to providing these files to the UI, the application manager may also pass any interactivity event signaling data received from the broadcast system and targeted for the application. The UI may use the metadata to determine which rendering container to use for the application. For example, if the application is an HTML/JS/CSS application, a WebKit engine container may be used to run the application. As another example, if the application is a swf-x-application mime-type, a Flash player may be used. In one embodiment, the application may indicate that it can be deactivated and/or removed entirely from the mobile device at a certain time or after execution (i.e., one-time applications).

The various embodiments enable the automatic generation and delivery of interactive event applications for use in mobile multimedia broadcast networks, such as a Media-FLO® network. The embodiments enable interactivity event providers to efficiently generate new interactivity events by having the generation of the interactivity event application accomplished on a server of the broadcast network or within the receiver devices themselves. Interactivity event providers may generate the event components (e.g., interactivity event application data, event related information and a sequence logic) and provide them to an interactivity production system or interactivity gateway which performs adaptation of the interactivity event information into a suitable broadcast format.

An interactivity application generator may use the interactivity event information to generate interactivity applications. In various embodiments, the interactivity application generator may be hosted in a server within the broadcast headend, or within receiver devices themselves. When the interactivity application generator is hosted within a server of the broadcast system, multiple interactivity applications may be generated as appropriate to support a variety of different targeted receiver devices. Such applications may be identified in their metadata so that receiver devices can selectively receive the compatible version of the interactivity application. The interactivity application metadata can be provided in the interactivity catalog file. When the interactivity application generator is hosted within the receiver devices, only the type of interactivity application that is suitable for the receiver device may be generated.

When the interactivity application generator is hosted within a server of the broadcast system, the mobile multimedia broadcast network may broadcast the generated interactivity event applications to receiver devices over a portion of the bandwidth, such as bandwidth available for file delivery services. When the interactivity application generator is hosted within a mobile device, the interactivity event information and resources may be broadcasted by the mobile multimedia broadcast network. Interactivity event applications and interactivity event metadata that are ready for broadcast may be listed in an electronic catalog which is broadcast to receiver devices as part of the broadcast overhead streams. As discussed above, in the receiver devices, the listing of interactivity event applications in the electronic catalog may be monitored or filtered to select those interactivity event applications that are relevant to the receiver device (e.g., pertain to a monitored channel and are compatible with the device model), are targeted at the receiver device (e.g., based on targeted selection criteria), are indicated for reception by a user (e.g., by a user making a selection from the electronic service guide), and/or match some user preferences, user demographics, or other user-specific targeting criteria.

In the embodiments, content providers can create an interactive event application by creating specific application logic, assets, resources and metadata files making up the application. As described above, the application logic and resource files may be combined into a package for the specific format, and the metadata may include information regarding the system and user requirements in order to run such applications on a mobile device. The content provider may also provide an XML file with the submitted application that includes metadata supporting delivery of the application to receiver devices. The content provider may submit the content elements to make up an interactivity event application to the wireless broadcast distribution system (e.g., a MediaFLO® system) for generation of an interactivity event and broadcast of the associated interactivity application to receiver devices.

The various embodiments may be implemented within a variety of mobile multi-media broadcast systems, an example of which is illustrated in FIG. 1A. A mobile multimedia broadcast network 1, such as a MediaFLO® broadcast network, typically includes a plurality of broadcast transmitters 2 controlled by a mobile broadcast network control center which is referred to herein as a broadcast operation center 4 (or "BOC" in the figures). The broadcast network 1 broadcasts content from the broadcast transmitters 2 as mobile broadcast transmissions 3 for reception by receiver devices 10, such as mobile television receivers, smartphones, cellular phones, personal digital assistants (PDA), interactive game devices, notebooks, smartbooks, netbooks, data processing apparatus, or other such electronic devices. Within the mobile broadcast network control center 4 (also called the broadcast operation center or "BOC") may be one or more servers 6 which may be configured to manage the scheduling of content broadcasts, generation of electronic service guides, catalog messages, and broadcast scheduling messages regarding the content broadcasts, and generation of metadata messages for broadcast via the overhead flow of the multimedia broadcast network 1.

In the various embodiments, one or more content manager servers 6 may also include connections to an external network, such as the Internet 7, through which the content manager server 6 may receive content feeds from content provider servers 8. In various embodiments, one or more servers 6 may be configured to receive content from content provider servers 8, determine information about the received content to be included in metadata, determine a schedule for broadcast of the content in content batches, and generate an electronic service guide (ESG) and other overhead flows for broadcast to receiver devices 10.

In addition to the normal content delivery system, the mobile broadcast network 1 may also include an interactivity server 5 for managing interactivity events for broadcast via the mobile broadcast network 1. In a typical implementation, the interactivity server 5 may receive elements for interactivity events from an interactivity production system server 9, either via a direct network connection or an indirect network connection, such as the Internet 7. The generation of interactivity events in the interactivity production system server 9 may be controlled by or based upon content received from content provider servers 8.

In addition to the mobile multimedia broadcast network 1A, receiver devices 10 may also be configured to communicate via a unicast network 11, such as a cellular telephone network. A typical cellular telephone network includes a plurality of cellular base stations 12 coupled to a network operations center 14, which operates to connect voice and data calls between mobile devices 10 and other network destinations, such as via telephone land lines (e.g., a POTS network, not shown) and the Internet 7. Communications between mobile receiver devices 10 and the unicast network 11 are accomplished via two-way wireless communication links 13, such as 3G, CDMA, WCDMA, GSM, TDMA, and other cellular telephone communication technologies. To facilitate Internet data communications, the unicast network 11 alone will typically include one or more servers 16 coupled to or within the network operations center 14 that provide a connection to the Internet 7. In a further embodiment, the unicast network 11 may be a wireless wide area network such as WiFi, WiMAX, etc. Mobile receiver devices 10 may communicate with the broadcast network 1 via the unicast network 11, such as via an IP data call to a broadcast network server 6 by way of the Internet 7, for purposes of subscribing to broadcast services transmitting user interaction messages to the broadcaster.

In various embodiments and implementations, user interactions with interactivity events may result in messages being communicated back to the broadcast service provider, the content provider or the interactivity content provider. Such response messages, which may convey user votes, merchandise orders, service requests, survey responses, etc., may be transmitted via any data transmission protocol supported by the unicast network 11, such as an IP data call, e-mail, simple message service (SMS), multimedia message service (MMS), and wireless Internet access and messaging.

Figure 1B:
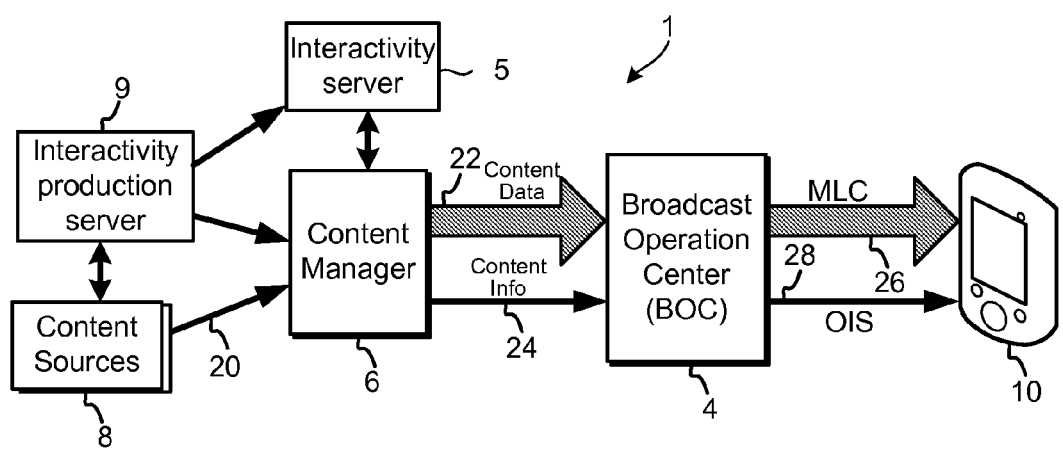
FIG. 1B is an alternative representation of a broadcast communication system block diagram of a forward link only broadcast system.

FIG. 1B illustrates information flows within a broadcast network 1 according to an embodiment. As mentioned above, a broadcast network 1 may receive content (e.g., television programs, websites, serial data feeds, etc.) from a number of content provider servers 8. In various embodiments, content provider servers 8 may send this content to a content manager server 6 over a data network 20 (e.g., the Internet 7). The content manager server 6 may schedule the received content for future broadcast and store the content in a database. The content manager server 6 may also provide content data 22 and content information 24 to the broadcast operation center 4. The broadcast operation center 4 may generate a broadcast signal as a multiplex of information that includes a media logical channel (MLC) 26 and an overhead information service (OIS) channel 28. Receiver devices 10 may receive the multiplex and parse the information contained therein. In various embodiments, receiver devices 10 may separately receive the overhead information service channel 28 and other overhead information streams (e.g., a control channel) and use that information to receive a particular media logic channel 26.

In the various embodiments, information may be transmitted in wireless signals organized into a plurality of superframes. Each superframe comprises signals encoded in frequency and time within a frequency band and within set time boundaries. The encoded signals within each superframe encode a plurality of data packets that communicate the broadcast content along with overhead information used by receiver devices 10 to receive selected content. For example, in the MediaFLO® broadcast system, broadcast transmissions may be organized into one-second superframes spanning a 6 MHz frequency band (for example 716 MHz to 722 MHz). MediaFLO® broadcast signals may be sent on other frequency bands and multiple signals may be sent simultaneously by using multiple distinct frequency bands. Each superframe includes a portion dedicated to the overhead flow and a portion that carries multiple channels associated with content flows. Information within the overhead flow and other overhead streams (e.g., a control channel) informs receiver devices of where within the superframe that particular content flow can be obtained, as well as how many packets are associated with the MLCs of that content flow.

Figure 1C:
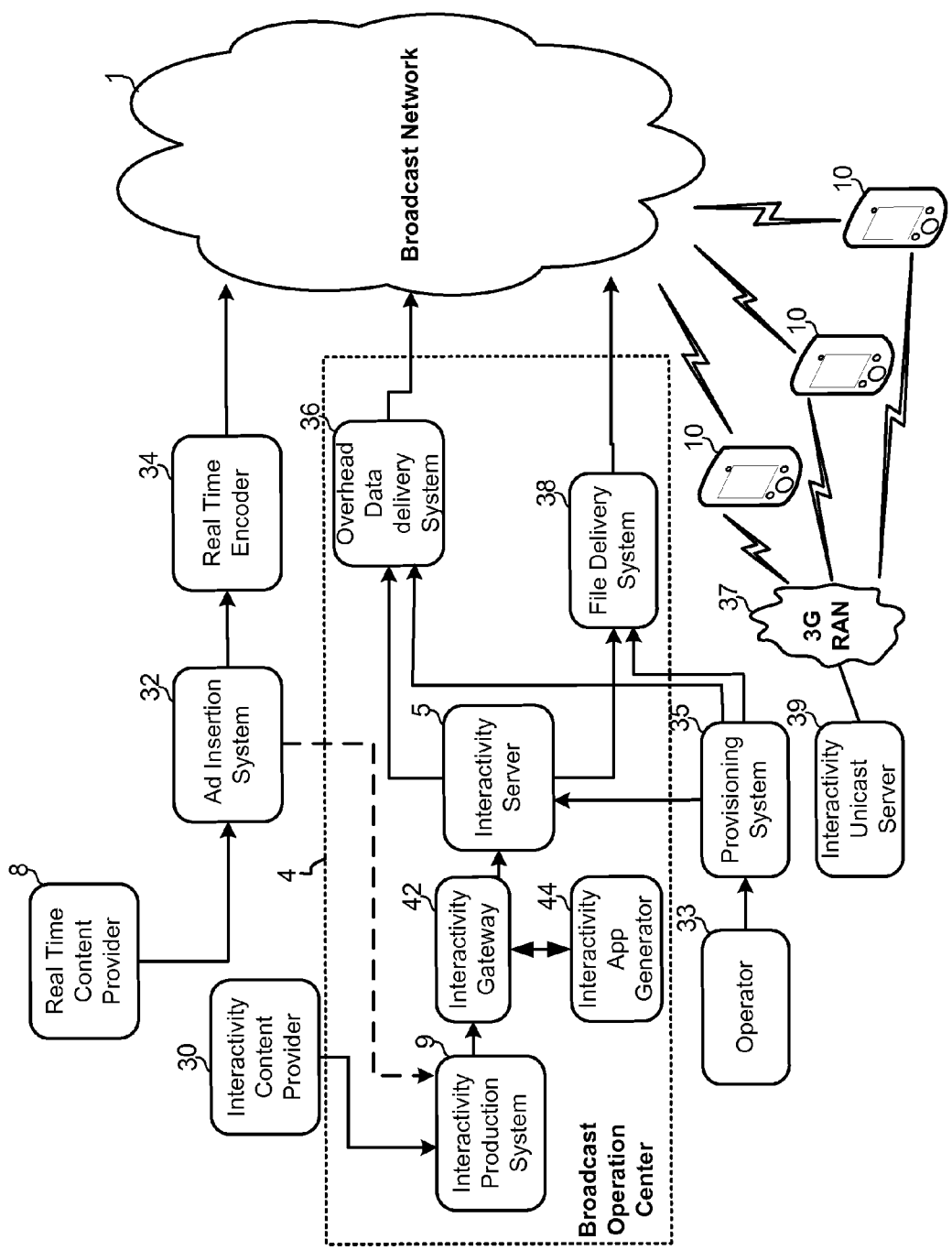
FIG. 1C is a system block diagram of elements of a broadcast communication system illustrating functional modules involved in generating and broadcasting interactivity events according to an embodiment.

FIG. 1C illustrates system functional components on the broadcaster side of a broadcast communication system suitable for implementing the various embodiments for generating and delivering interactivity (ITV) events, associated signaling messages, interactivity resources and templates. Real time content provider servers 8 may send real time content (e.g., audio, video, text, etc.) to the Broadcast Operation Center (BOC) 4. In various embodiments, the broadcast operation center 4 may use an ad insertion system 32 to insert linear ads into the content during specified ad slots. The ad insertion system 32, may be hosted on a server within the BOC 4. Real time content and inserted linear ads may be encoded by a real time encoder 34, which may also be hosted on a server within the BOC 4. Encoded real time content and ads are then transmitted over the broadcast network 1. In various embodiments, the ad insertion system 32 may also provide an interactivity production system server 9 with synchronization timing information (as illustrated by the dashed arrow) about an interactivity event which needs to be played in sync with an ad slot, as discussed in more detail below.

In various embodiments, the ad insertion system 32 and real time encoder 34 may each be hosted on a different server in the broadcast operation center 4. In various embodiments, the ad insertion system 32 and real time encoder 34 may be hosted on the same server in the broadcast operation center 4. In an embodiment, the ad insertion system 32 and real time encoder 34 may be hosted outside of the broadcast operation center 4, as illustrated in FIG. 1C.

Interactivity content providers 30 may supply interactive content in the form of interactive sequences to an interactivity production system server 9. Interactivity content providers 30 may be the same as or different from the real time content provider servers 8. Interactivity event information (IEI) generated in the interactivity production system 9 may be provided to an interactivity server 5 within the BOC 4. The interactivity event information may include interactivity event application data (IEAD), such as the set of information that is displayed to users, the actions or functions associated with particular user inputs/actions, images and display format information, video sequence files, associated interactivity assets, URLs for directing user responses, and other data useful to receiver devices for generating the desired interactivity display. The interactivity application data may include information for user input to be provided using multiple options, such as over SMS, over unicast (IP), via phone call or over the web. The interactivity event information may also include interactivity event metadata, such as the event start time and validity duration/end time (i.e., how long the interactivity event is valid to be displayed to users from start time or a time at which the interactivity event expires and should no longer be displayed to users), the targeted real-time content flows or media services in which the interactivity event should appear, targeted interactivity applications, targeted set of receiver device types, targeted service carriers (e.g., Verizon, AT&T, etc.), and identification of associated or required resources and templates.

In addition to the interactive content, the interactivity content providers 30 may also provide additional information units to the interactivity production system server 9. For interactivity events that need to be played in synchronization with real-time programming (e.g., a TV program or within an ad slot within a TV program), the interactivity content providers 30 may provide interactivity event display start time or other data useful for synchronizing the event to the targeted real-time content.

The interactivity production system may send the interactivity events data associated with the interactivity event sequences to the interactivity gateway 42. The interactivity gateway 42 may adapt the received interactivity event information into a format that is suitable for broadcast. The interactivity event gateway 42 may interface with an interactivity application generator 44 to dynamically generate one or more interactive applications using the received interactivity event information. As described more fully below, the interactivity application generator 44 may dynamically generate interactivity event applications using the sequences and event information provided by the interactivity content provider 30 in order to assemble one or more interactivity event applications. In some cases, multiple interactivity event applications may be generated for a single interactivity event if the targeted devices support different types of applications. For example, for a given interactivity event a first interactivity application can be generated which is Flash executable application (Shockwave Flash formatted file (SWF)), and as a second interactivity event application can be generated which is a web application (HTML5 application). In this example, both types of interactivity event applications would be broadcast and receiver devices would selectively receive the compatible interactivity application. As part of this activity, the interactivity server may adjust interactivity event start times based on end-to-end broadcast system latencies for the real-time service in which the interactivity event is to be displayed. The generated interactivity application may be returned to the interactivity gateway 42 which provides it to the interactivity broadcast server 5. In another embodiment, the interactivity gateway 42 may generate interactivity event application data including interactive elements information (e.g. the interactivity application data may be generated in an XML format by the interactivity gateway). In various embodiments, the interactivity gateway 42 may provide the generated interactivity event application data to the interactivity broadcast server 5 for broadcast to mobile devices.

The interactivity broadcast server 5 may provide required interactivity event application data (IEAD), resources and templates (i.e., data, resources and templates that a receiver device needs to generate the interactivity event) to a file delivery system 38 for transmission out-of-band via the broadcast network 1. In various embodiments, the file delivery system 38 may transmit the interactivity event application data, resources and templates in a file delivery transmission stream. In an embodiment, the interactivity event application data, resources and templates may be transmitted on a file delivery transmission stream that is similar to conventional file delivery transmission systems used to transmit other types of files.

In various embodiments, the interactivity server 5 may use event timing information to request that the file delivery system 38 broadcast resources and templates such that they can be acquired on receiver devices 10 prior to the event start time. In an embodiment, interactivity event application data (IEAD) and resources may be broadcasted just prior to the event start time (e.g., few seconds or minutes before the event start time) in order to conserve broadcast bandwidth.

In various embodiments, the interactivity server 5 may be used to generate interactivity event signaling messages (IESM). These generated interactivity event signaling messages may be provided to the overhead data delivery system 36 for transmission via the overhead information flows via the broadcast network 1. In an embodiment, interactivity server 5 may request overhead data delivery system 36 to broadcast IESM just prior to the event start time (e.g., 5-10 seconds before the event start time) in order to conserve broadcast bandwidth. In various embodiments, the interactivity server 5 may transmit the interactivity event application data (IEAD) and resources in-band, as part of the interactivity event signaling messages (IESM). As discussed above, it is useful to transmit data in-band when there is insufficient time to broadcast the data and resources out-of-band over file delivery system, such as when an interactivity event is scheduled at the last minute.

In various embodiments, an operator 33 may use the provisioning system 35 to identify an association between real-time channels and/or services and signaling flows carrying interactivity event signaling. The operator 33 may specify whether multiple real-time channels share a given signaling flow or whether a separate signaling flow should be used to deliver interactivity signaling for each real-time channel. In an embodiment, the operator 33 may specify a signaling flow for carrying unbound interactivity events. The provisioning system 35 may provide this association to the overhead data delivery system 36, so that interactivity signaling may be delivered on the appropriate signaling flows, which are broadcast by the broadcast network 1.

In various embodiments, an operator 33 may use the provisioning system 35 to identify an association between real-time channels and/or services and resource flows carrying interactivity resources. The operator 33 may specify whether multiple real-time channels share a given resource flow or whether a separate resource flow should be used to deliver interactivity resources for each real-time channel. In an embodiment, the operator 33 may specify a resource flow for carrying unbound interactivity events. The provisioning system 35 may provide this association to the File delivery system 38, so that interactivity resources may be delivered on the appropriate resource flows, which are broadcast by the broadcast network 1.

As discussed above, the provisioning system 35 may be used to identify an association between real-time channels and/or services and signaling flows and resources flows carrying interactivity signaling and resources. The provisioning system 35 may also be used to generate Service System Information (Service SI) messages that are provided to the overhead data delivery system 36 for delivery over the broadcast network 1. These Service SI messages enable receiver devices to determine which resource file data flows (RFDF) and signaling flows contain the resources and signaling for interactivity events. For instance, the Service SI messages may include information on signaling flows and file data flows that carry interactivity information for each real-time channel. In an embodiment, interactivity resources may be obtained from non-broadcast sources, such as an interactivity unicast server 39. In an embodiment, the interactivity unicast server 39 may be accessed via a wireless unicast network 37, such as a 3G cellular network.

Figure 1D:
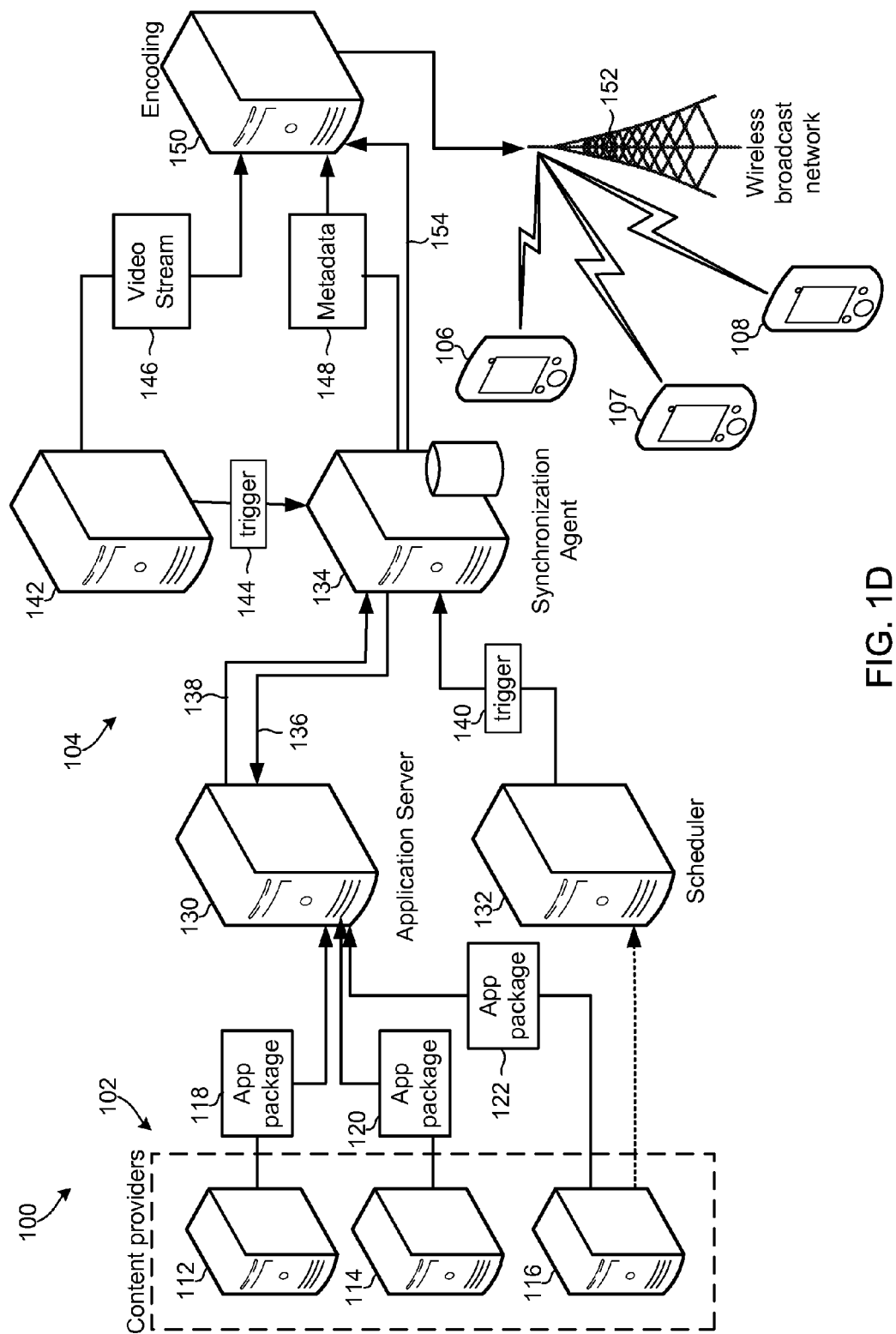
FIG. 1D is alternative representation of a broadcast communication system block illustrating system elements involved in delivering applications to mobile devices via a broadcast communication system according to an embodiment.

FIG. 1D illustrates another example of a communication system 100 suitable for broadcasting applications to receiver devices in accordance with multiple embodiments of the present invention. Content providers 102 may provide the broadcast system with applications that can be downloaded to receiver devices. FIG. 1D illustrates that multiple content providers 112, 114, 116 may each generate application content and create application data, executable scripts and assets (e.g., images, video clips, graphical screens, XML scripts, etc.). The content providers 112, 114, 116 may bundle these files together into application packages 118, 120, 122. The application packages 118, 120, 122 may be transmitted to an application server 130 within the broadcast network 104. The application server 130 may maintain a list of applications available for delivery, and store additional metadata related to each particular application. The application server 130 may package applications based on format. The application server 130 may also package applications into a desired format.

In an embodiment, content providers 112, 114, 116 may provide the broadcast network 104 with scheduling information. For example, FIG. 1D illustrates that a content provider 116 may provide scheduling data to a scheduler server 132 enabling applications to be pushed to receiver devices 106, 107, 108 at a particular time in the future. Thus, a content provider 116 may contribute to, and have control over, the synchronization of particular applications and broadcast content.

A synchronization agent server 134 within the broadcast network 104 may control the broadcasting of application packages based upon a schedule. For instance, application packages may be scheduled to be broadcast at times of low bandwidth utilization, such as late at night. Application packages may also be scheduled to be broadcast at specific times, such as times specified by the scheduling data provided by the content provider 116.

Periodically, the synchronization agent server 134 may request application packages for broadcast from the application server 130 (arrow 136). The application server 130 may return the requested application packages (arrow 138) to the synchronization agent server 134. The synchronization agent server 134 may pass the application packages to an encoding server 150 (arrow 154). The encoding server 150 may encode the packages into a proper format for broadcast on the wireless broadcast network 152.

The synchronization agent server 134 may also determine the time for broadcasting the received applications based upon a trigger 140 received from a scheduler server 132. The scheduler server 132 may send the trigger 140 based on the broadcast schedules specified by one or more of the content providers 116. The synchronization agent server 134 may also determine the time for broadcasting applications based upon real-time broadcast status triggers 144 provided by a broadcast control server 142. The real-time broadcast status trigger 144 may indicate a time (or time slot) within a video stream 146 in which applications should be activated.

In various embodiments, the broadcast network 104 may broadcast synchronization metadata 148. The synchronization metadata 148 may enable activation of application packages on receiver devices 106, 107, 108 so that they are in synchrony with video streams 146. To support this capability, the broadcast control server 142 may provide the real-time broadcast status trigger 144 to the synchronization agent server 134, the trigger 144 indicating a time (or time slot) within a video stream 146 in which previously broadcasted applications should be activated. In response to receiving the real-time broadcast status trigger 144, the synchronization agent server 134 may generate synchronization metadata 148 for encoding the application packages in the encoding server 150 and broadcasting the application packages on the wireless broadcast network 152. Such synchronization metadata 148 may be transmitted in the form of an interactivity event signaling message (IESM) transmitted within an overhead information flow of the broadcast network 152. A description of interactivity event signaling messages and systems and methods for managing such messages are disclosed in more detail below.

In response to receiving this synchronization metadata 148, receiver devices 106, 107, 108 may be prompted to activate an indicated application stored in memory. The synchronization metadata 148 may allow the application activation to be synchronized with the broadcast stream. This, in turn, may allow the application's functionality to be scheduled so that it corresponds to particular events or points within a broadcast program. The synchronization of the application's functionally with specific events and/or points in a broadcast program allows the broadcast network 104 to support user interactivity by allowing content providers 102 to write time-critical and interactive applications.

In various embodiments, the interactivity event signaling message may also be used to send application data, images, executable scripts and assets (collectively application data). In an embodiment, the same flow may be used to send the interactivity event signaling message and the corresponding application data. In an embodiment, application data may be broadcast to the receiver devices 106, 107, 108 in the background through a file delivery framework. In this embodiment, the receiver devices 106, 107, 108 do not need to be turned on to begin the download process, and large files may be sent to the receiver devices 106, 107, 108 in advance. In another embodiment, the application data may be datacast to the receiver devices 106, 107, 108. In the various embodiments, when an interactivity event is scheduled to occur or devices receive an interactivity event signaling message, the receiver devices 106, 107, 108 may check their memory for the application data, pull the application data from the memory and begin the activation and/or execution process.

Figure 2:
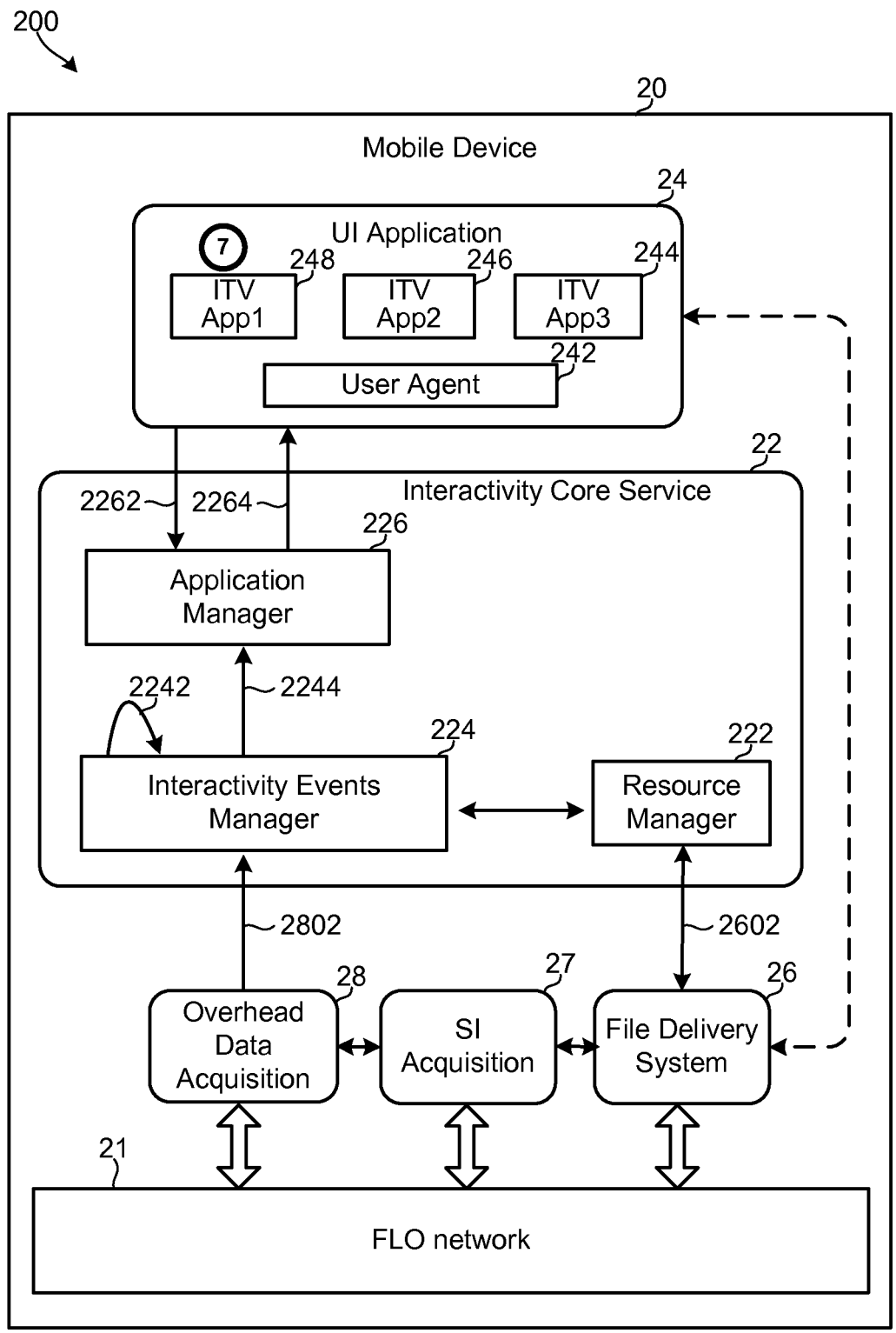
FIG. 2 is an example software architecture diagram of a mobile receiver device suitable for use with the various embodiments.

FIG. 2 illustrates functional components that may be implemented within a receiver device 10 suitable for implementing the various embodiments. Software modules of a receiver device 10 may be organized in a software architecture 20 similar to that illustrated in FIG. 2. Broadcast transmissions may be received by a receiver device physical layer and processed by a broadcast receiver module, such as a FLO network module 21. Video and audio streams received by the FLO network 21 may be processed by a media receiver module (not shown). File transfer streams received on the FLO network 21 may be provided to and processed by a file delivery system module 26, which functions to receive file packets and direct them to appropriate modules and applications within the device software architecture 20. Overhead data streams may be passed to an overhead data acquisition module 28, which functions to process overhead data packets and direct received metadata and overhead data to appropriate modules within the device system architecture 20.

A service system information acquisition (SI Acquisition) module 27 may acquire the Service System Information (Service SI) message data from the overhead data streams, and forward this information to the file delivery system module 26 and overhead data acquisition module 28. The file delivery system module 26 may use the Service SI message data to determine flow IDs for file data flows carrying interactivity resource data. Likewise, the overhead data acquisition module 28 may use the Service SI message data to determine which signaling flows are carrying the relevant interactivity signaling data.

FIG. 2 also illustrates that to support interactivity events, the device software architecture 20 may include an interactivity core service 22 which serves as core module between the user interface (UI) applications 24 and the FLO network 21 for receiving, managing and storing interactivity events. The user interface application module 24 may include a number of interactivity applications 244, 246, 248, and a user agent 242. The user agent 242 may support the functionality of routing interactivity event signaling messages to a targeted set of interactivity applications.

The interactivity cores service module 22 may include a resource manager module 222, an interactivity events manager module 224, and an application manger module 226, as well as other functional modules executing on the receiver device processor. Broadcast files for resources and templates intended for use in interactivity events may be received by the file delivery system module 26 and passed to a resource manager 222 within the interactivity core service 22. The resource manager 222 may store received resources and templates in memory, which may be indexed and organized to facilitate recall and use of such files for use in generating displays and user interfaces. These displays and user interfaces may be used by the user interface application module 24 to show the received interactivity events to the users of the receiver device.

In various embodiments, the overhead data acquisition module 28 may selectively receive (e.g., based upon filters and corresponding applications) the interactivity event signaling messages (IESM) from an overhead flow and pass them to the interactivity events manager module 224. The interactivity events manager module 224 may request the overhead data acquisition module 28 to acquire interactivity event signaling messages for interactivity applications which are loaded on the device. To enable this, interactivity applications 244, 246, 248 may register with the application manager module 226 when the applications are downloaded or launched on the receiver devices 10, 106, 107, 108. The acquired interactivity event signaling messages may be passed to the appropriate targeted interactivity applications (244, 246 or 248) based on application identifier filtering information received in the signaling message.

Figure 3A:
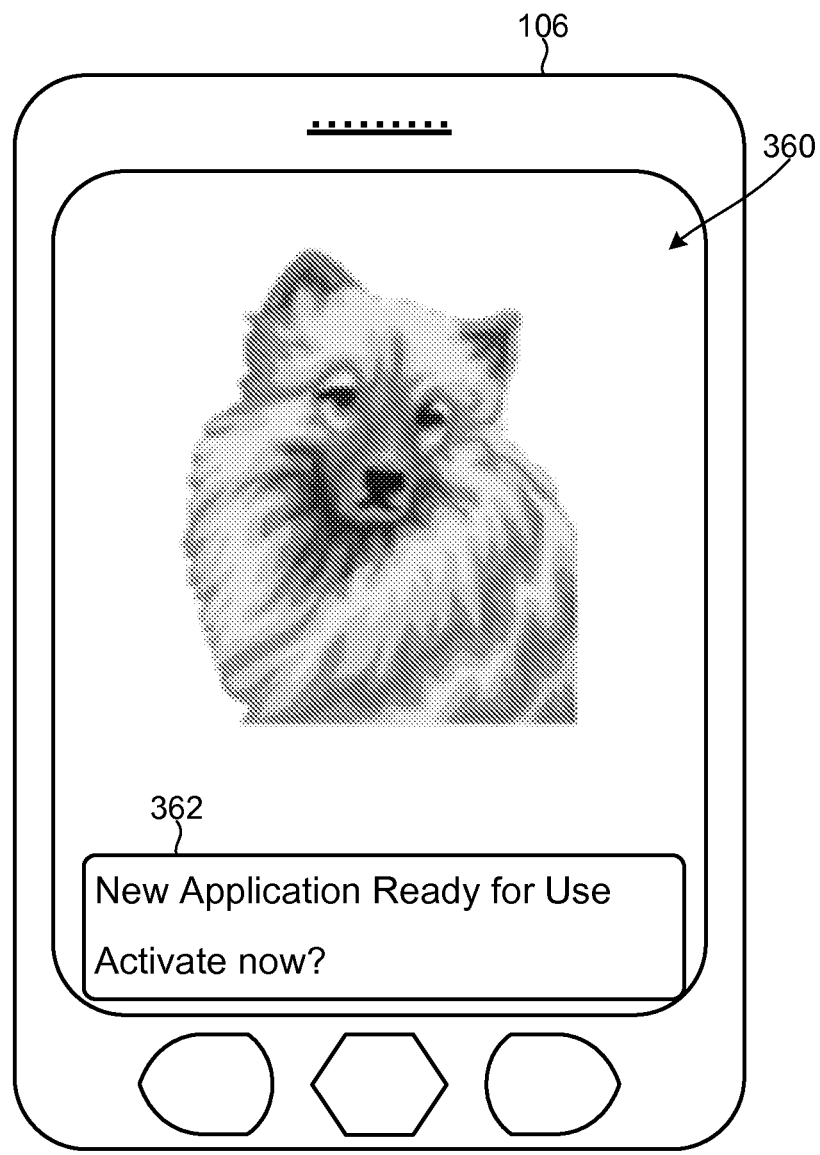
FIG. 3A is an illustration of a user interface display that may be presented in response to reception of the application according to an embodiment.

On the receiver devices 10, 106, 107, 108, user notification of received applications may be accomplished in a variety of forms, an example of which is illustrated in FIG. 3A. In this example, a receiver device 106 showing real-time content on the display 160, may generate a pop-up or banner 162 within a portion of the display. The pop-up or banner 162 may include a simple textbox notifying the user of the availability of the new application. The pop-up or banner 162 may prompt the user to press a button or an icon on a touchscreen to activate the application. As part of the prompt, users may also be invited to indicate whether the new application should be deleted from memory. In another embodiment, the received interactivity application on the device may be triggered and activated based on the IESM received over the broadcast network without explicit user activation.

Figure 3B:
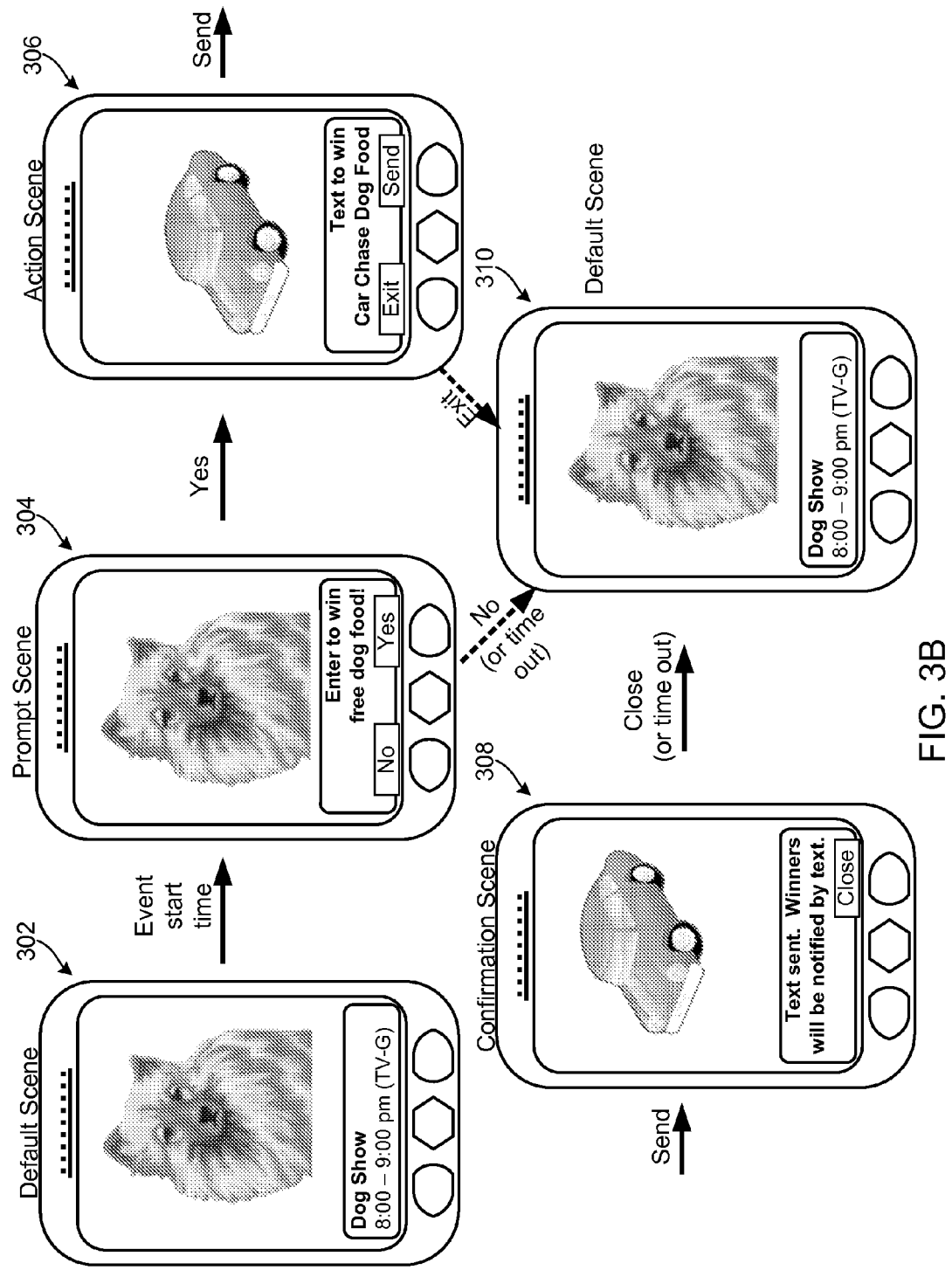
FIG. 3B is an illustration of a sequence of presentation displays illustrating elements of an interactivity event according to an embodiment.

As discussed above, interactivity events and interactivity event applications may also be assembled in the form of a sequence of images, videos, on-screen displays and user prompts, which can be defined individually and then assembled into an interactivity event application by the interactivity application generator 44 or into interactivity event application data (e.g. in XML format) by the interactivity gateway 42. An example interactivity event featuring a click-to-SMS interactivity sequence and associated displays is illustrated in FIG. 3B. In this example, a default scene (shown in image 302) may be a real-time program being received on a particular channel (e.g., a dog show program as illustrated). In the background, the receiver device may receive an interactivity event application or application data and be ready to implement it at the appropriate event start time. That event start time may be received subsequently in an interactivity event signaling message. At the event start time, the interactivity application on the receiver device may generate a prompt scene as the start to the interactivity event, as illustrated in image 304. In this example, the prompt scene includes a text or banner display appearing over the real-time program and including virtual buttons to enable the user to indicate a desire (or not) to participate in the interactivity event. In this example, the user is being offered an opportunity to enter a contest for free dog food. By pressing a button (or virtual button) associated with either "Yes" or "No," the user can either elect or decline to participate in the contest.

If the user presses the button associated with "Yes" in response to the prompt scene 304, indicating an intent to participate, the interactivity event application operating on the receiver device may display an action scene as shown in image 306. In this example, an image or video associated with the contest may be presented along with informational text. In this example, the user is prompted to send an SMS message to enter the contest. A button function provided by the interactivity application may automate the response, so that the user can participate merely by pressing a button (e.g., the button associated with the displayed "Send" user option). In this example, the interactivity event application is configured to send an SMS message to a programmed SMS address to indicate that the user is entering the contest in response to the user pressing the button associated with the "Send" user option. The SMS address may be programmed as part of the interactivity application or application data. This example also illustrates how the interactivity event application may provide the user with the opportunity to exit the application, such as by pressing a button associated with the "Exit" user option.

If the user presses the button associated with "Send" in response to the action scene 306, the interactivity event application may be configured to display a third display image comprising a confirmation scene 308. In this example, the confirmation scene includes a display associated with the contest or confirmation of user action, along with the text indicating to the user that the user's action has been implemented. In the illustrated example, this confirmation text informs the user that the contest entry message has been sent and that winners will be notified by text message. The confirmation scene portion of the interactivity application may also include user input functionality to enable the user to close the confirmation scene and return to the default scene 310, such as the real-time program being watched.

FIG. 3B also illustrates how an interactivity event application can be configured to provide different outcomes depending upon a user's action. For example, if the user presses the button associated with "No" in the prompt scene 304, the interactivity event application may be configured to return to the default scene 310. Further, if the user fails to take any action within a certain amount of time (referred to herein as a "scene timeout" time), the interactivity event application may be configured to automatically return to the default scene 310. Similarly, if the user presses the button associated with "Exit" in the action scene 306, the interactivity event application may be configured to automatically return to the default scene 310. Similarly, the confirmation scene 308 may also terminate after a predetermined scene timeout time.

Figure 3C:
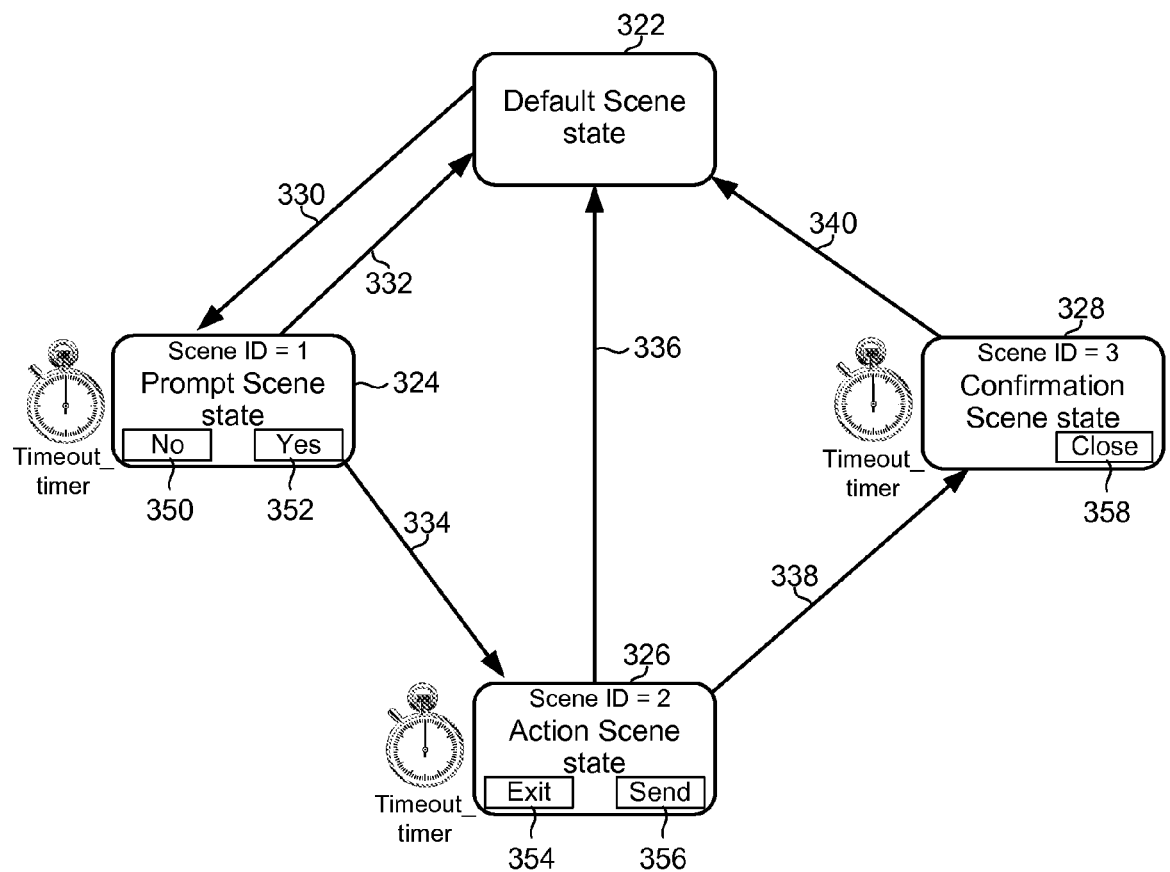
FIG. 3C is a display state diagram illustrating display states and transitions corresponding to the sequence of presentation displays in the interactivity event illustrated in FIG. 3B.

By organizing interactivity event applications into a sequence of scenes, user option buttons and associated functionality, such applications can be dynamically generated by an interactivity application generator. An example of how an interactivity event application can be assembled by the interactivity application generator is illustrated in FIG. 3C which shows the four displays or scene states corresponding to the interactivity event application illustrated in FIG. 3B. The interactivity event application may be configured to begin from the default scene state 322, which may be a real-time program or channel being monitored by the receiver device. The interactivity event application may be triggered in response to a received interactivity event signaling message and monitor the device system clock to determine when the current time equals the event start time. Alternatively, the interactivity event application may be activated at the event start time by a module in the receiver device (e.g., an interactivity events manager 242 as described above with reference to FIG. 2). At the event start time the interactivity event application may transition to the prompt scene state 324 in state transition 330. As described above, the prompt scene state 324 may include a particular set of display images and text, identified in this example as scene ID 1, and user input functionality, such as user input button options for the selections of "No" 350 and "Yes" 352. In this example, if a user input corresponds to the "No" 350 option, or if the timeout timer expires, the interactivity event application may return to the default scene state 322 and terminate in state transition 332.

If a user input corresponds to the "Yes" 352 option, the interactivity event application may be configured to transition to the action scene state 326 in state transition 334. As described above, the action scene state 324 may include a particular set of display images and text, identified in this example as scene ID 2, and user input functionality, such as user input button options for the selections of "Exit" 354 and "Send" 356 as shown in this example. In this example, if a user input corresponds to the "Exit" 354 option, or if the timeout timer expires, the interactivity event application may return to the default scene state 322 and terminate in state transition 336.

If a user input corresponds to the "Send" 356 option, the interactivity event application may be configured to transition to the confirmation scene state 328 in state transition 338. As described above, the confirmation scene state 324 may include a particular set of display images and text, identified in this example as "scene ID=3", and user input functionality, such as user input button option for the selection of "Close" 358 for ending the interactivity event application as shown in this example. In this example, if a user input corresponds to the "Close" 358 option, or if the timeout timer expires, the interactivity event application may return to the default scene state 322 and terminate in state transition 340.

The examples illustrated in FIGS. 3A-3C are only one example of how interactivity events may be assembled from component data (e.g., displaying scenes and text) and simple logic scripts (e.g., user input button functionalities, addresses for executing particular user choices, timeout and default settings, and scene sequence selections). Such components may be generated individually by an interactivity content provider and sent to the interactivity production system along with sequencing information or metadata that can be used by the interactivity application generator to assemble the complement parts into an application that functions in a manner such as illustrated in FIG. 3C. Thus, the various embodiments enable interactivity content providers to generate interactivity events with as much complexity and content as they may desire by providing discrete components linked in a sequence tied to simple logic choices, with the assembly of the applications being accomplished dynamically by the interactivity application generator 31. In another embodiment, a static interactive application on the device may already have interactive scene sequence logic built in to reduce complexity. In that case, the interactivity scene information will be broadcast as part of interactivity application data which will be used by the interactivity application on the device.

Figure 4:
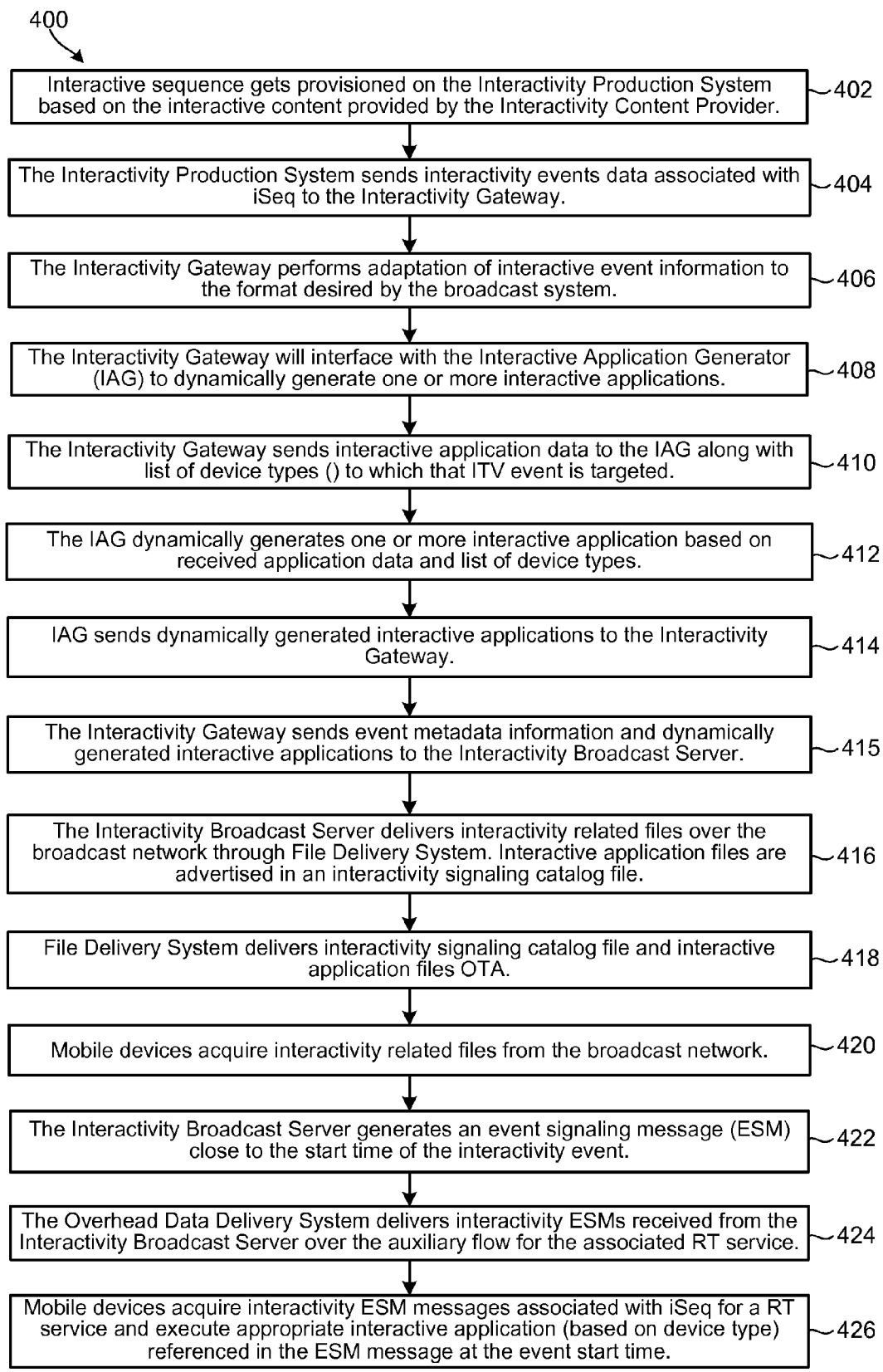
FIG. 4 is a process flow diagram of an embodiment method that may be implemented in a broadcast network server for automatically generating an interactivity event application and broadcasting it to receiver devices according to an embodiment.

FIG. 4 illustrates an embodiment method 400 for preparing and broadcasting interactivity event signaling messages so they can be received and processed by receiver devices. In method 400 in step 402, interactivity content providers may supply interactive content and/or interactivity event information (IEI) to the interactivity production system (IPS) for generation of interactivity event signaling messages. The interactivity event information supplied to the interactivity production system may include event metadata, such as event start time, validity duration/end time, targeted real-time services, targeted interactivity applications, filtering criteria, target carriers, target device types, and necessary or associated resources and templates. In the various embodiments, the ingestion of interactivity content in the interactivity production system may be accomplished manually by an operator (e.g., using a provisioning interface on the interactivity production system), or via a programming interface with an interactivity content provider or real-time content provider. Interactivity content may also be ingested from an outside ad network (e.g., Google Ad network) using a programming interface into the interactivity production system.

As mentioned above, the interactivity event information supplied to the interactivity production system may include video files, sound files, display text, menu selection text and functionality, response URLs, scene sequencing and branching information, and event metadata (e.g., event start time, validity duration/end time, targeted real-time services, targeted interactivity applications, target carriers, target device types, and necessary or associated resources and templates). Interactivity application data may also be provided in step 402, such as the information that may be displayed to users, images and graphics shown to users and the associated actions expected from users, such as functionality to be assigned to particular user interface buttons or touchscreen interface icons. Also as part of step 402, information regarding event display start times with respect to real-time content may be specified to enable synchronization of interactivity events with real-time content streams or advertisements. For interactivity events created for a linear ad, events may be associated with a linear ad slot in step 402. A linear ad slot specifies an ad slot time window. The event start time for such events may be computed by the interactivity production system based on a timing trigger received from the ad insertion system, as described above with respect to step 408.

In step 404, the interactivity production system (IPS) may provide information regarding event display start times with respect to real-time content. Providing information regarding event display start times with respect to real-time content enables the system to synchronize interactivity events with real-time content streams or advertisements. In various embodiments, the event display start time may be computed by the interactivity production system based on a timing trigger received from the ad insertion system, as described with respect to step 408, discussed below.

Also in step 404, the interactivity production system (IPS) may send the assembled interactivity event information (such as event metadata and event application data) associated with the interactivity event to an interactivity server or gateway within the broadcast operations center. In step 406, the interactivity server or gateway may perform adaptation of the interactivity event information (i.e., interactivity resources and/or template files associated with an interactivity event) or otherwise render it in the proper format for broadcast via the broadcast system. For example, interactivity event information may include video in the form of JPEG files. In order to render this content suitable for broadcast by a mobile broadcast system (e.g., FLO TV®), the interactivity gateway may need to change the image size, frame rate and data format so that it is compatible with the broadcast encoders system. In step 408, the interactivity gateway may interface with the interactivity application generator (IAG) to dynamically generate one or more interactivity applications. This may involve the interactivity gateway providing the properly formatted files required to the interactivity application generator in step 410, as well as providing a list of device types to which the interactivity event application is to the targeted. This step 410 may also involve the interactivity gateway providing event metadata and other system data to the interactivity application generator.

In step 412, the interactivity application generator may dynamically generate one or more interactive applications based upon the received application data and the list of device types. As described above with reference to FIG. 3C, this process may involve assembling the interactivity elements and sequence logic into an executable application. In step 414, the interactivity application generator may send the dynamically generated interactivity applications to the interactivity gateway. In step 415, the interactivity gateway may send the event metadata information and dynamically generated interactivity applications to the interactivity broadcast server.

It should be noted that, in various embodiments, steps 410-415 may be replaced by the interactivity gateway itself generating interactivity application data in proper required format based on interactivity elements information received from the IPS. In these embodiments, the interactivity gateway may then send the generated application data, event metadata information and interactivity resources information to the interactivity broadcast server.

In step 416, the interactivity broadcast server may deliver the interactivity related files (including interactivity applications, application data and resources) to the file delivery system for broadcast delivery to receiver devices. Interactivity related files may be advertised in an interactivity signaling catalog file as part of step 416. In step 418, the file delivery system delivers the interactivity signaling catalog file and interactivity event related files over the air. In step 420, mobile devices may acquire the interactivity event application files/application data and other interactivity resources and template files from the broadcast network. In step 422, the interactivity broadcast server may generate an appropriate interactivity event signaling message (IESM) and provide the message to the overhead data delivery system for broadcast as part of the overhead data stream. This interactivity event signaling message may specify the reliability and quality of service (QoS) required for delivery and be broadcast close to the start time of the interactivity event.

In step 424, the overhead data delivery system broadcasts the interactivity event signaling message received from the interactivity broadcast server on an overhead flow with the reliability and quality of service specified by the interactivity server. To ensure that the interactivity event signaling message is timely received by receiver devices, it may be broadcast as high-priority overhead data. In various embodiments, the interactivity event signaling message may be provided to the overhead data delivery system in step 422 and broadcast in step 424 before the interactivity event is to start, and may continue to be broadcast throughout the duration of the interactivity event so that receiver devices tuning into the targeted real-time content may also promptly implement and display the interactivity event.

In step 426, receiver devices within the broadcast coverage area acquire the interactivity event signaling message from the overhead flow for a real-time service and execute the appropriate interactivity application (based upon the particular receiver device type) referenced in the interactivity event signaling message at the event start time indicated in that message. The ESM may provide reference to the application data file and resource files for each device type to which interactivity event is targeted.

To support the implementation of server-generated interactivity event applications and/or device generated interactivity event application, the interactivity event signaling message data schema may be formatted as illustrated in FIGS. 14A-16C. In particular, the message data schema may include a list of device profiles for which the interactivity event should be executed, including information such as an identifier for the resource containing dynamically generated interactivity applications for each associated device profile. The interactivity application resource ID will be used by the received device to execute appropriate interactivity application to display interactivity on that device.

As discussed above, in an embodiment, interactivity event applications may be generated dynamically within the interactivity application generator 31 within the BOC 4. This embodiment is described below with reference to FIG. 5A. In this embodiment, generated interactivity event applications are broadcast as applications (e.g. over file delivery system) which can be received and implemented by receiver devices, as described below with reference to FIG. 8 through 24D. In another embodiment described below, interactivity event applications may be generated/implemented within the receiver devices themselves based upon broadcasted interactivity application data and metadata.

Figure 5A:
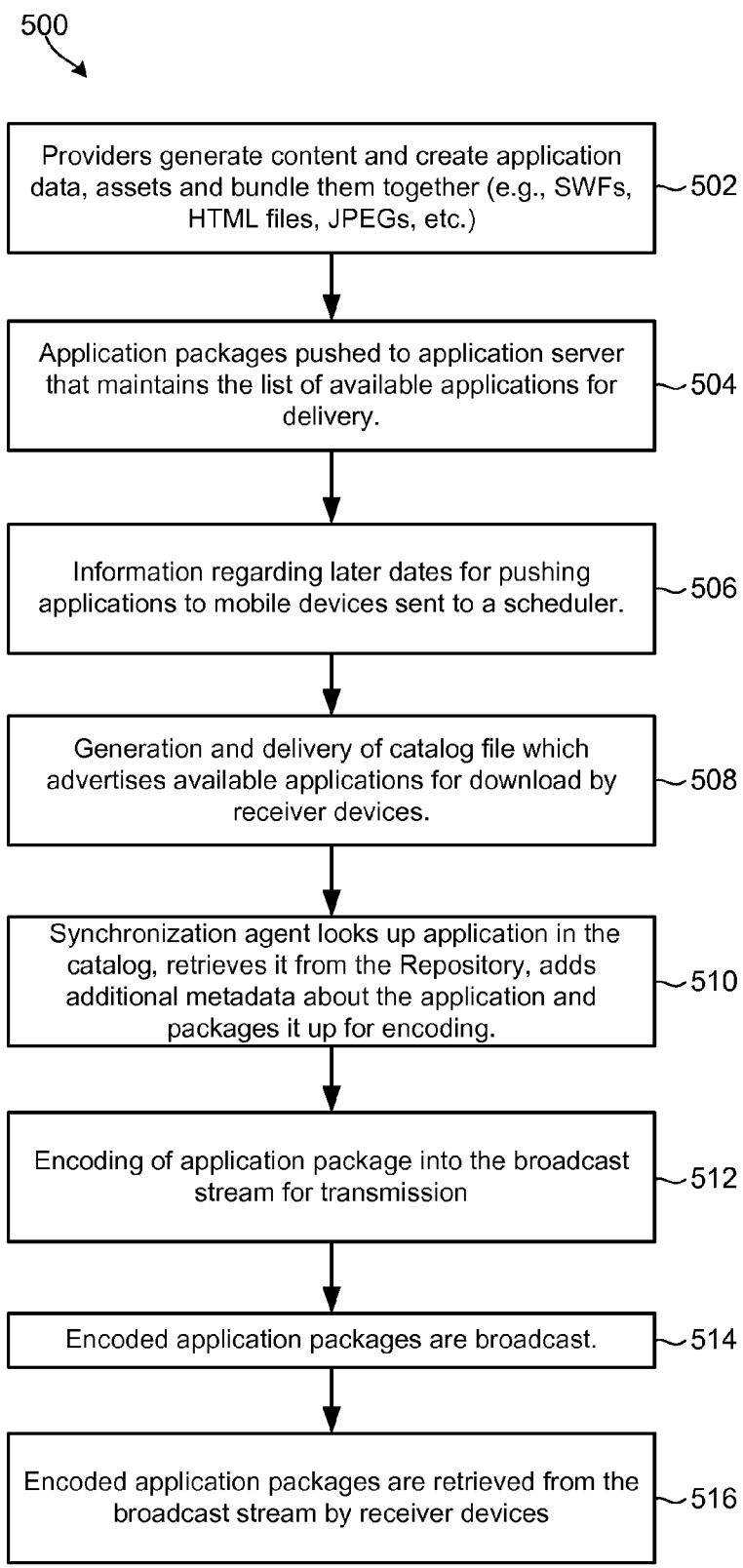
FIGS. 5A-5C are a process flow diagrams of embodiment methods that may be executed within an application server of a broadcast system for compiling and preparing application packages and interactivity events for broadcast.

FIG. 5A illustrates an embodiment method 500 for delivering the interactivity applications and associated metadata to receiver devices via the broadcast system. Such delivery mechanisms may also be used for delivering interactivity event data, resources and templates used by receiver devices to implement interactivity events, as well as generate interactivity event applications. In step 502 of method 500, content providers and/or the interactivity application generator may generate application content and create application data, assets, files and other executable elements, and bundle them together into an application package. Such application packages may include HTML files, XML scripts, JPEG images, text files, and shockwave files, to name but a few of the types of content that may make up application packages. In step 504, application packages may be passed to an application server within the broadcast network. In step 506, content providers may send information regarding requested future dates for the broadcast of particular applications to a scheduler server. In step 508, the application server may generate a catalog file which advertises available applications for download by receiver devices, and provide this to the encoding server for encoding and broadcast via the wireless broadcast network. The application server may coordinate with a synchronization agent server or a broadcast scheduler in order to identify the date and time at which specific application packages will be broadcast. The data and time of application broadcast may be indicated in overhead flow carrying file delivery schedules. The application catalog file may also indicate the broadcast stream on which the application packages may be received.

In step 510, a server may retrieve application packages from the application server, add additional metadata about the application, and package the application and metadata for encoding. For example, in various embodiments, a synchronization agent may look up an application in the catalog, retrieve it from the repository, add additional metadata about the application, and package it up for encoding in step 510. In step 512, the encoding server encodes the application package into a suitable format for inclusion within the broadcast stream. As part of the encoding process, application packages may be broken up into data packages which are encoded into data packets and superframes. In step 514, the encoded application packages are then broadcast via the wireless broadcast network. In step 516, the encoded application packages are retrieved from the broadcast signal by receiver devices.

Figure 5B:
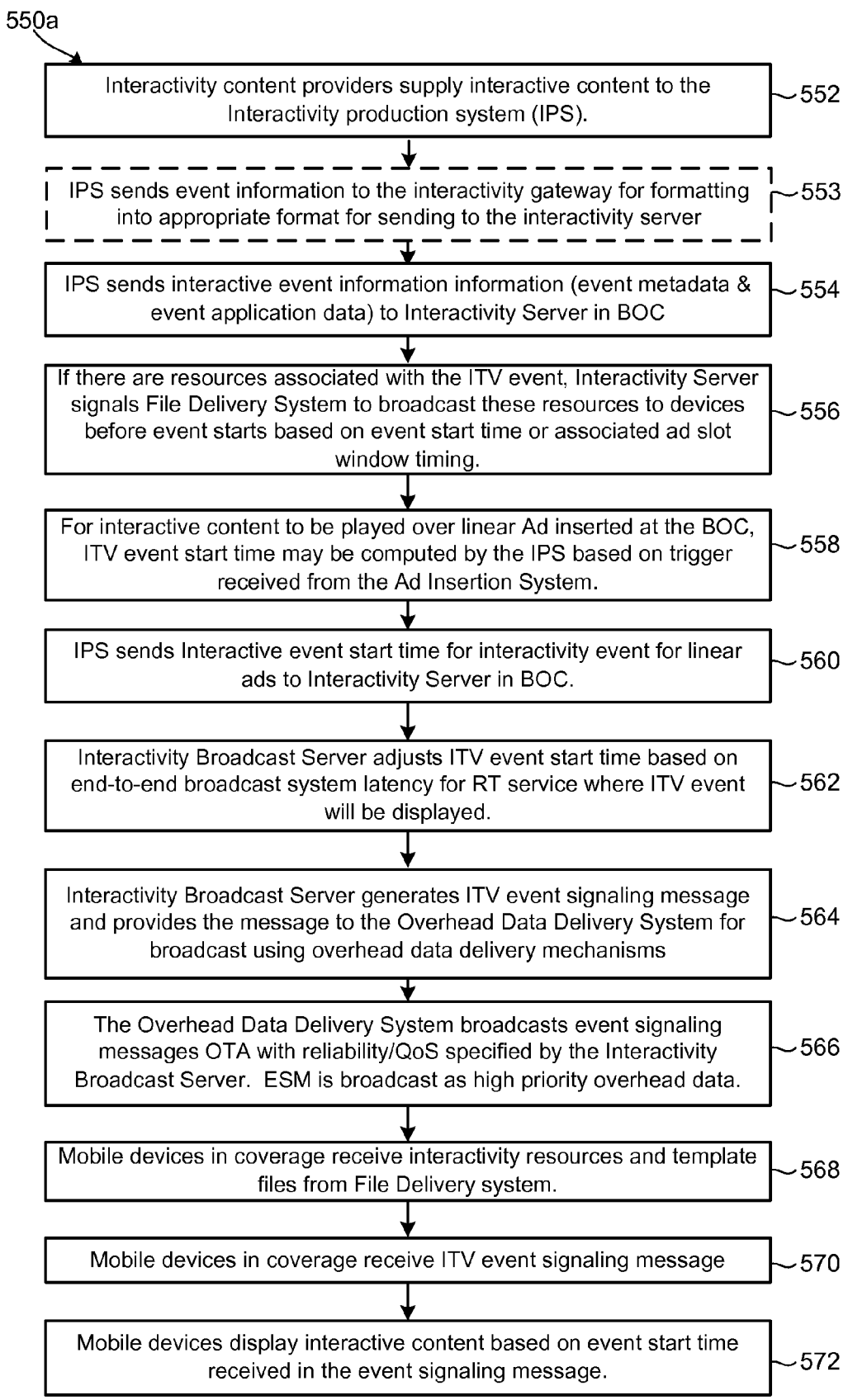

FIG. 5B illustrates an embodiment method 550a for preparing and broadcasting interactivity event signaling messages (IESM) that receiver devices can use to implement interactivity events. In method 550a, in step 552, interactivity content providers may supply interactive content and/or interactivity event information (IEI) to the interactivity production system (IPS) to generate the interactivity event signaling messages. The interactivity event information supplied to the interactivity production system may include event metadata, such as event start time, validity duration/end time, targeted real-time services, targeted interactivity applications, target carriers, target device types, and necessary or associated resources and templates. In the various embodiments, the ingestion of interactivity content in the interactivity production system may be accomplished manually by an operator (e.g., using a provisioning interface on the interactivity production system), or via a programming interface with an interactivity content provider or a real-time content provider. Interactivity content may also be ingested from an outside ad network (e.g., Google Ad network) using a programming interface into the interactivity production system.

As discussed above, in step 552, interactivity content providers may supply interactive content and/or interactivity event information (IEI) to the interactivity production system (IPS). In various embodiments, in step 552, the interactivity production system may also be provided with interactivity event application data (IEAD). This interactivity event application data may include information that will be displayed to users, images and graphics shown to users and the associated actions expected from users. The associated actions expected from users may include functionality to be assigned to particular user interface buttons or touchscreen interface icons. In step 552, interactivity production system may also associate interactivity events created for linear ads with a linear ad slots. These linear ad slots specify an ad slot time window in which the interactive ad is to be displayed.

Also as part of step 552, the interactivity production system (IPS) may provide information regarding event display start times with respect to real-time content. Providing information regarding event display start times with respect to real-time content enables the system to synchronize interactivity events with real-time content streams or advertisements. In various embodiments, the event display start time may be computed by the interactivity production system based on a timing trigger received from the ad insertion system, as described with respect to step 558, discussed below.

In various embodiments, in step 553, interactivity production system (IPS) may send event information to the interactivity gateway, which formats the data into appropriate format for sending to the interactivity server. In step 554, the interactivity production system and/or interactivity gateway may send the assembled interactivity event information (such as event metadata and event application data) to an interactivity server within the broadcast operations center. For interactivity events displayed over linear ads, the interactivity production system may send event information to the interactivity server. The event information may be sent to the interactivity server over multiple signaling messages, based on triggers received from the ad insertion system.

In step 556, the interactivity server may signal the file delivery system to broadcast any interactivity resources (including assets and application data) and/or template files associated with the interactivity event such that these files may be received by receiver devices before the event starts. As mentioned above, in various embodiments, to conserve bandwidth, the interactivity event application data and resources may be broadcast prior to the event start time (e.g., few seconds or minutes before the event start time). Thus, in various embodiments, the interactivity server may be configured to request delivery of interactivity resources and template files ahead of the event start time. In this manner, necessary resources and templates can be broadcast in advance of the interactivity event so that those receiver devices which have not previously downloaded the necessary resources and/or templates can do so in time to be ready to implement the forthcoming interactivity event. In various embodiments, the interactivity server may request delivery of interactivity resources and template files based on the event display start time and/or the ad slot window time. In various embodiments, interactivity event application data (IEAD), resources and templates may be broadcast out-of-band using the file delivery service of the broadcast network, such as in an interactivity event resource file delivery stream, which can enable better use of broadcast bandwidth than if interactivity event application data are transmitted in-band as part of the interactivity event signaling message (IESM).

In step 558, the interactivity event start time may be computed by the interactivity production system (IPS) based on trigger information that may be received from the interactivity content provider or from the ad insertion system. For example, interactivity events which are to be presented over linear ads inserted by the broadcast operations center may not be provided with exact start time during step 552. In such cases, the interactivity production system computes the appropriate start time based on trigger information received from the ad insertion system.

In step 560, the interactivity production system (IPS) may send a computed event start time for an interactivity event for linear ads to the interactivity server (via Interactivity gateway). In step 562, the interactivity server may adjust the interactivity event start time based on the end-to-end broadcast system latency time for the targeted real-time service (i.e., the real-time content in which the interactivity event is intended to appear). This adjustment ensures that interactivity events will be played in the desired synchronization with the real-time content.

In step 564, the interactivity server may generate an appropriate interactivity event signaling message (IESM) and provide the message to the overhead data delivery system for broadcast as part of the overhead data stream. As part of the information provided with the interactivity event signaling message, the interactivity server may specify the reliability and quality of service (QoS) required for delivery of the interactivity event signaling message over the broadcast system.

In step 566, the overhead data delivery system broadcasts the interactivity event signaling message (IESM) on an overhead flow with the reliability and quality of service specified by the interactivity server. To ensure that the interactivity event signaling message is timely received by receiver devices, it may be broadcast as high-priority overhead data. In various embodiments, the interactivity event signaling message may be provided to the overhead data delivery system in step 564 and broadcast in step 566 before the interactivity event is to start. In various embodiments, the interactivity event signaling message may be broadcast throughout the duration of the interactivity event. This allows receiver devices tuning into the targeted real-time content to promptly implement and display the interactivity event.

In step 568, receiver devices within the broadcast coverage area may receive the interactivity resources and template files associated with the interactivity event from the file delivery system. In step 570, receiver devices within the broadcast coverage area may receive the interactivity event signaling message (IESM) from the overhead flow. In step 572, the receiver devices may implement the interactivity event by displaying the content based on the event start time received in the event signaling message.

In various embodiments, interactivity event signaling messages (IESMs) for a particular event may be sent in a non-uniform manner over the mobile broadcast network. By transmitting interactivity event signaling messages at different rates, such as depending upon the time remaining before the event start time, over the air bandwidth utilization may be optimized while providing a desired level of confidence the interactivity event signaling messages will be received in time by most receiver devices. For example, interactivity event signaling messages may be broadcast more frequently just before the interactivity event start time (e.g., once every second) for an event to ensure that most of the receiver devices acquire the messages in time to activate the event. Interactivity event signaling messages may be delivered less frequently (e.g., once every 3-10 sec.) well before the interactivity event start time to reduce the amount of bandwidth allocated to such messages. Interactivity event signaling messages may also be broadcast frequently during entire event validity period so that receiver devices which come into the coverage associated with the interactivity event after event start time can acquire interactivity event signaling messages and display the interactivity. Interactivity event signaling messages may be broadcast periodically (e.g., once every 5 sec.) during the event validity period. Since the broadcast of interactivity event signaling messages during an event is to enable receiver devices tuning into a content flow or coming into the coverage area during that time to begin displaying the interactivity event, the broadcast frequency may be reduced (e.g., once every 5 seconds) because there is a latency (typically of about 5 seconds) associated with the device acquiring the flow data and getting ready to display the content.

Figure 5C:
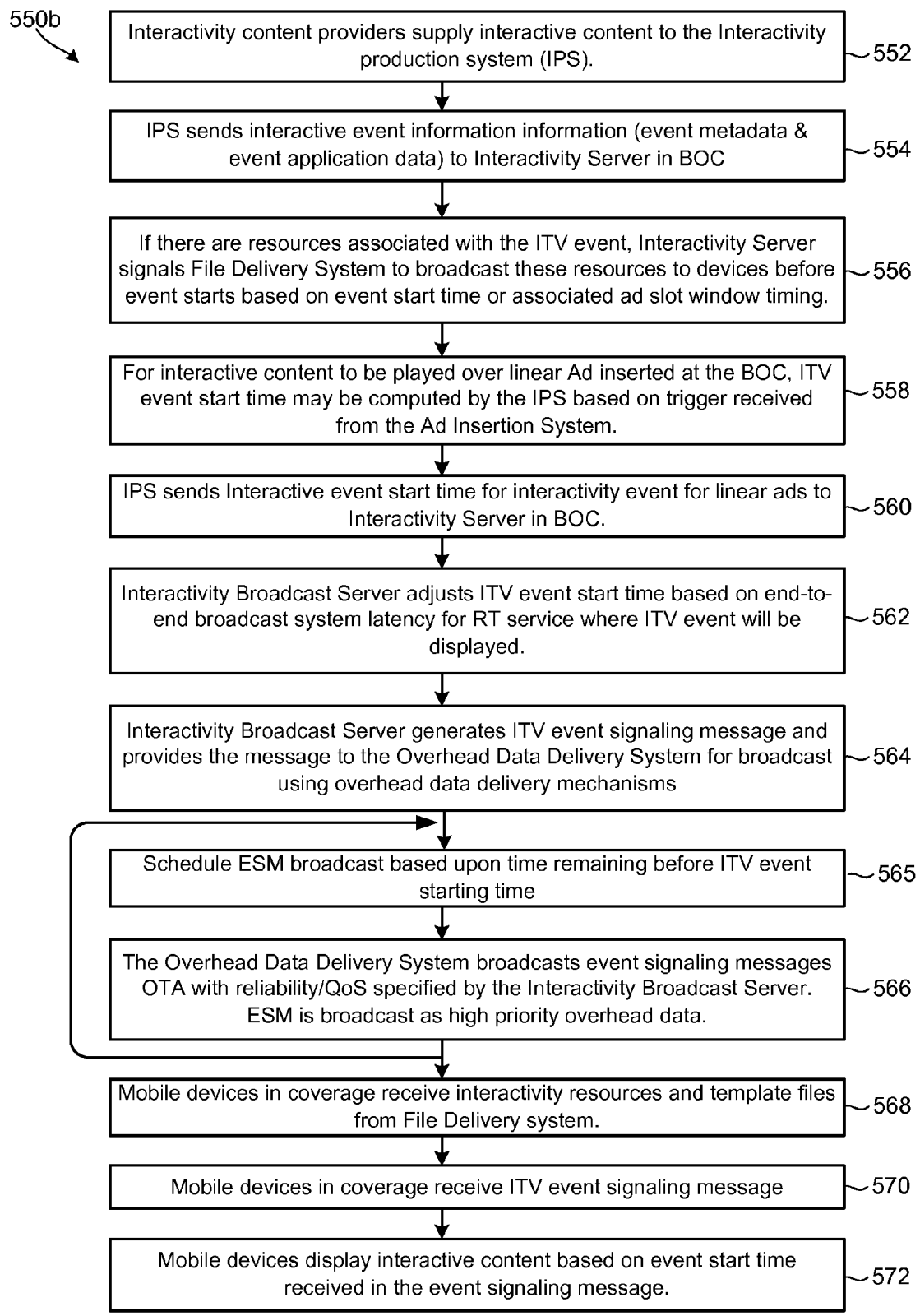

As discussed above, interactivity event signaling messages (IESMs) for a particular event may be sent in a non-uniform manner. This is demonstrated in FIG. 5C, which illustrate an embodiments method 550b similar to method 550a, described above with reference to FIG. 5B. In method 550b, in step 564, the interactivity server generates an interactivity event signaling message and provides the message to the overhead data delivery system for broadcast as part of the overhead data stream. In step 565, the broadcasting of the interactivity event signaling message is scheduled based upon the time remaining before the interactivity event begins and/or ends. In step 565, the broadcast time of the interactivity event signaling message is periodically adjusted until the event is completed. In step 566, the overhead data delivery system broadcasts the interactivity event signaling message on an overhead flow. While the interactivity event signaling message is being broadcast, the broadcast time may be periodically adjusted, as illustrated by step 565, until the event is completed. In the various embodiments, this non-uniform approach to interactivity event signaling message delivery may be implemented to save over the air bandwidth consumption, as discussed in more detail further below.

Figure 6:
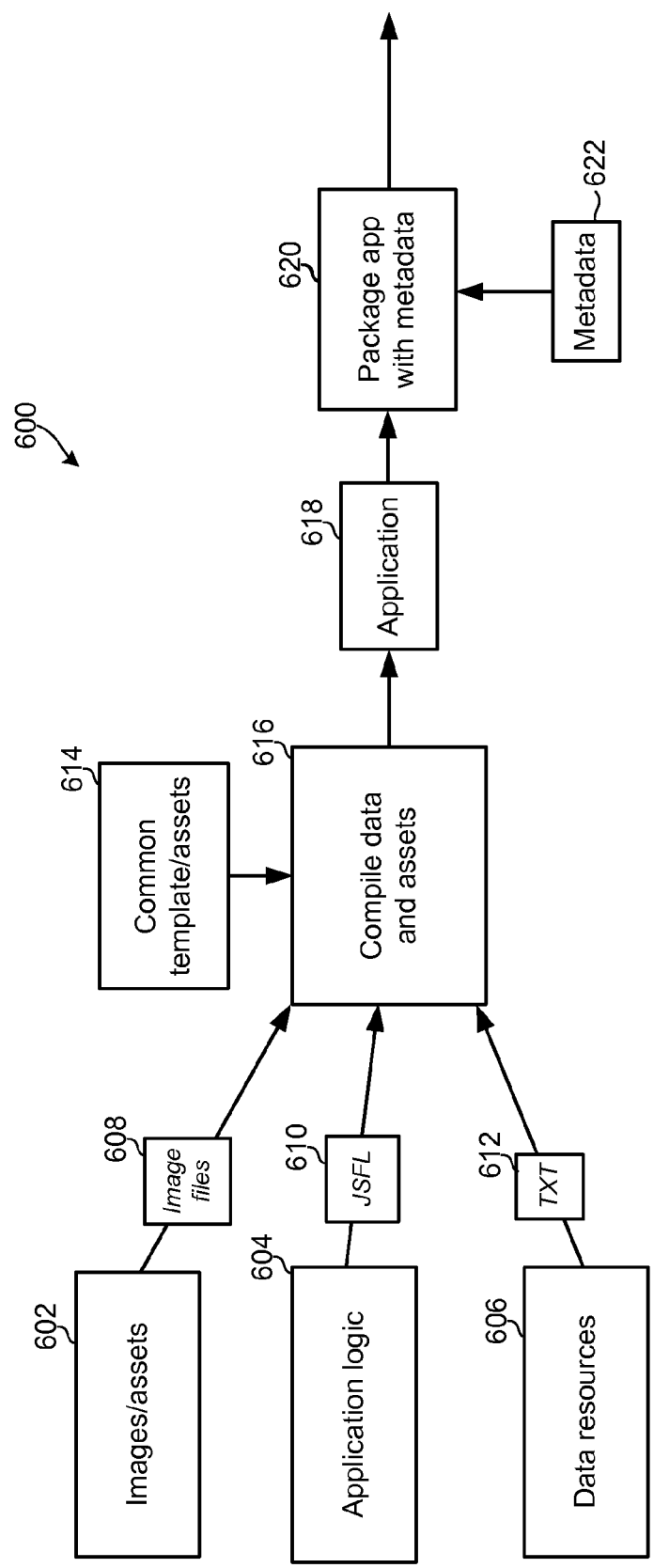
FIG. 6 is a flow diagram illustrating how various files may be assembled into application packages suitable for broadcast according to an embodiment.
Figure 7:
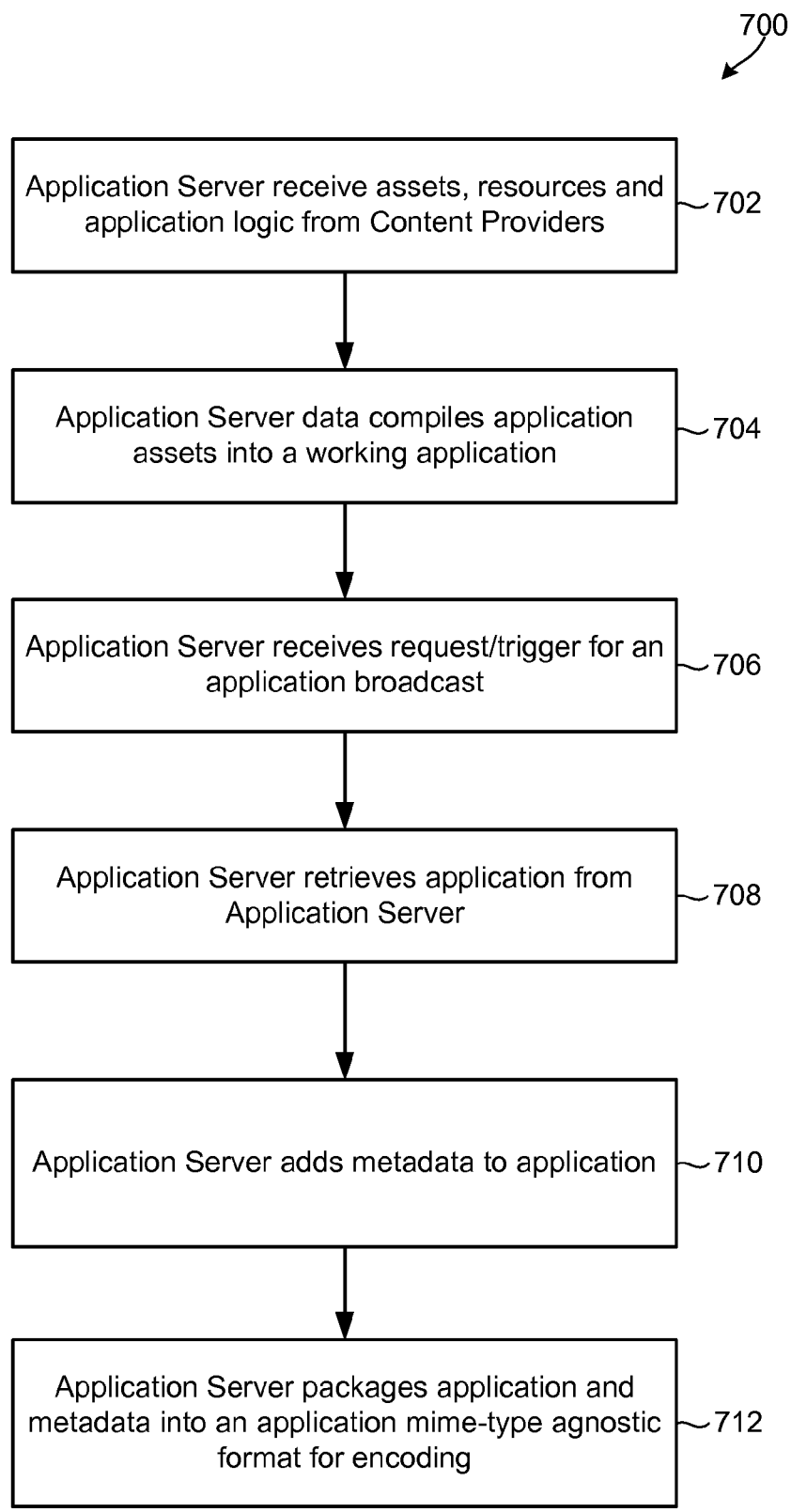
FIG. 7 is a process flow diagram of an embodiment method that may be executed within an application server of a broadcast system for compiling and preparing application packages for broadcast.

FIG. 6 illustrates examples of data flows among system modules during the process of assembling application elements into packages and preparing the packages for broadcast. FIG. 7 illustrates an example method 700 for preparing the application packages for broadcast, that may be implemented within the application server 130 illustrated in FIG. 1D. As discussed above with reference to FIG. 1D, content providers 102 may provide the various application elements that make up an application package to the application server 130. The application server 130 may compile these application elements into an application package suitable for delivery over the broadcast network. FIG. 6 illustrates that these application elements may include images and similar assets 602, application logic, such as executable scripts 604, and data resources 606 such as text and numbers. Image assets 602 may be provided in the form of image files 608. Application logic 604 may be provided in the form of XML, HTML, and JSFL files 610. Data resources 606 may be provided in the form of text or XML files 612.

Referring to FIG. 7, in step 702 of method 700, the application server may receive the image assets 602, data resources 606 and application logic 604 from the content providers 102. In step 704 the application server may compile the application assets into a working application 618. As part of compiling application elements, the application server 130 may call upon common templates and software assets 614, such as display layout templates, standard flash modules, standard XML scripts, etc., and incorporate these common elements into the working application. Alternatively, common templates and software assets may be specified in metadata associated with the working application to enable receiver devices to call such common templates and software assets from their own memory. As an example, the application server 130 may build a Flash application using assets and MXML data that may be compiled into a shockwave flash (SWF) or Adobe Integrated Runtime (AIR) executable files. This may be done by generating a ZIP or AIR formatted bundle. As a second example, the application server 130 may compile a Web application (HTML) by accepting HTML/CSS/JS files and generating an html file that contains the proper URLs for all resources when launched in a browser and turning all binary resources into base64 strings. This process may require taking all relevant data files and creating a WebArchive formatted bundle file. The result of this process is an application 618 which may be stored in a data store or repository.

When the application server 130 receives a request/trigger for an application for broadcast, step 706, such as from the synchronization agent server 134, the application server 130 may retrieve the requested application from data storage in step 708. In step 710, the application server may add metadata 622 to the application 618 to form an application package 620 including the metadata necessary for reception by receiver devices. In step 712, the application server 130 may package the application and metadata into an application mime type agnostic format suitable for encoding and/or delivery over the wireless broadcast network 152.

Figure 8:
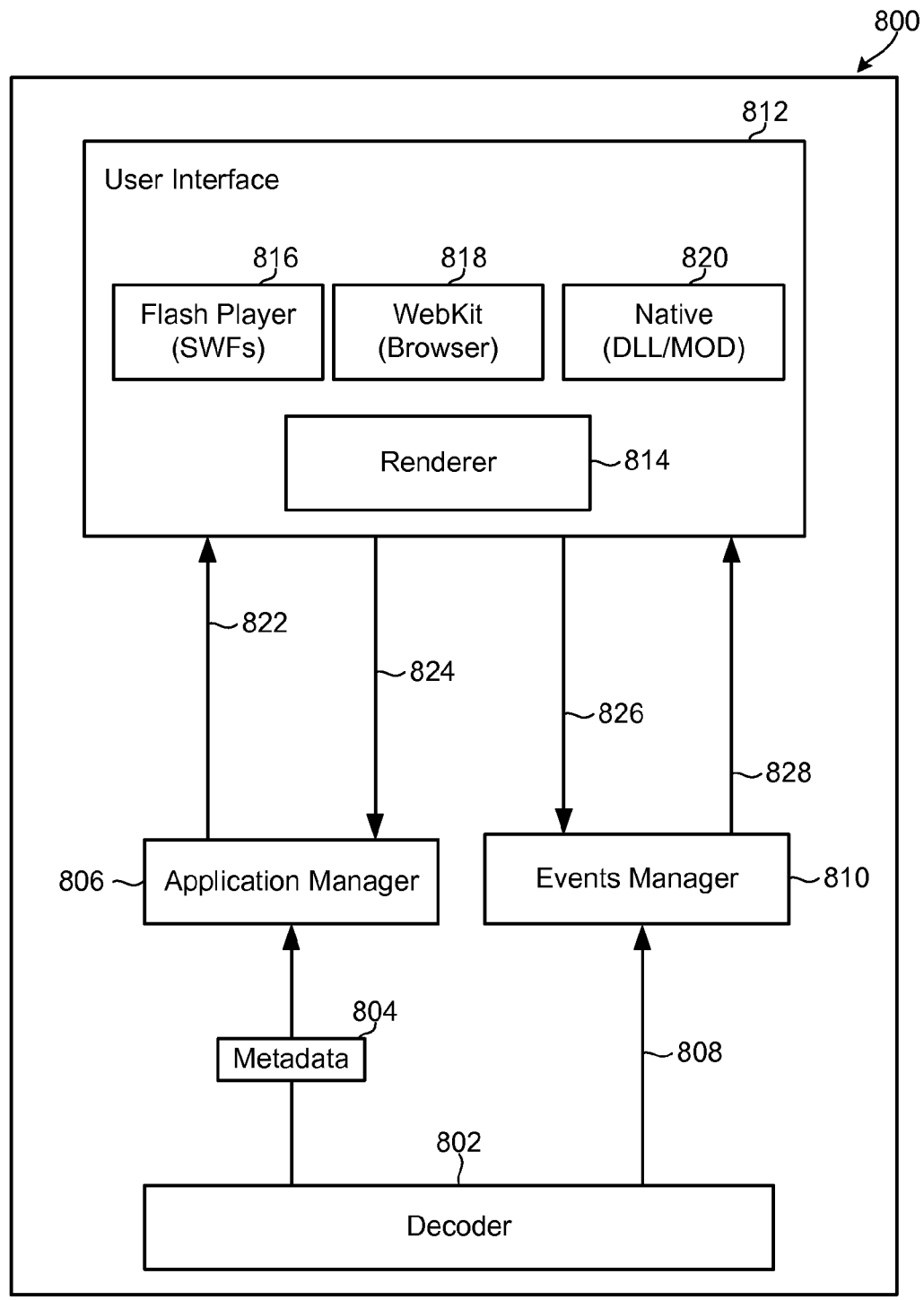
FIG. 8 is another example software architecture diagram of a mobile receiver device suitable for receiving broadcast applications in accordance with the various embodiments.

FIG. 8 illustrates an alternate software architecture 800 in which the receiver devices may be configured to support the application packages assembled in methods 600 and 700. Specifically, FIG. 8 illustrates that an application manager module 806 may directly manage the reception of applications via the broadcast network. FIG. 8 also illustrates the software architecture of a receiver device may also include a decoder 802 which receives data and instructions from the broadcast network stream and decodes the information into a format that can be understood by other modules. Applications and metadata 804 may be passed by the decoder 802 to the application manager 806 which manages applications before they have been implemented. A user interface module 812 may include the software components required to execute and render applications, such as a renderer module 814, a flash player 816, a browser or web kit 818 and native processes 820 (e.g., DLL and MOD). Additionally, the software architecture 800 may include an events manager module 810 which coordinates with the user interface 812 to coordinate the timing of activation of downloaded applications.

The user interface 812 may interface with the application manager 806 and events manager 810 to obtain particular application and event information. For instance, applications that are under the control of user interface 812, may register with the applications manager, as shown by communications arrow 824. Registering applications may indicate to the application manager that updates received by the receiver device that are related to the application should be passed to the user interface 812. For example, a Facebook application may register with the application manager (arrow 824) so that subsequent Facebook messages and updates received over the broadcast channel will be passed automatically to the Facebook application via the user interface 812.

The events manager 810 may communicate with the user interface 812, as shown by arrow 828, to control the start and stop times of interactivity application activations. For example, if an application is intended to function during a particular advertisement, the event manager 810 may send a start message 828 to the user interface 812 at a point where the application should begin, and a stop message 828 at a point where the application should end.

In various embodiments, and depending upon the nature of the application or interactivity event that is running, users may be invited to make selections or provide feedback. The feedback may include information that may be valuable to content providers, such as responses to survey questions or responses to particular interactive applications. Such user interactions may be communicated in a message 826 to the events manager 810, which may in turn log the responses for later reporting to the broadcaster or another party. In addition, since mobile media broadcast receiver devices may be configured with mechanisms that periodically report user viewing habits and selections, existing mechanisms can also be used to report statistics and specific user selections in response to running applications. The user interface 812 may also register with the events manager 810 over communication 826 to receive real-time data events and updates to an application.

Figure 9:
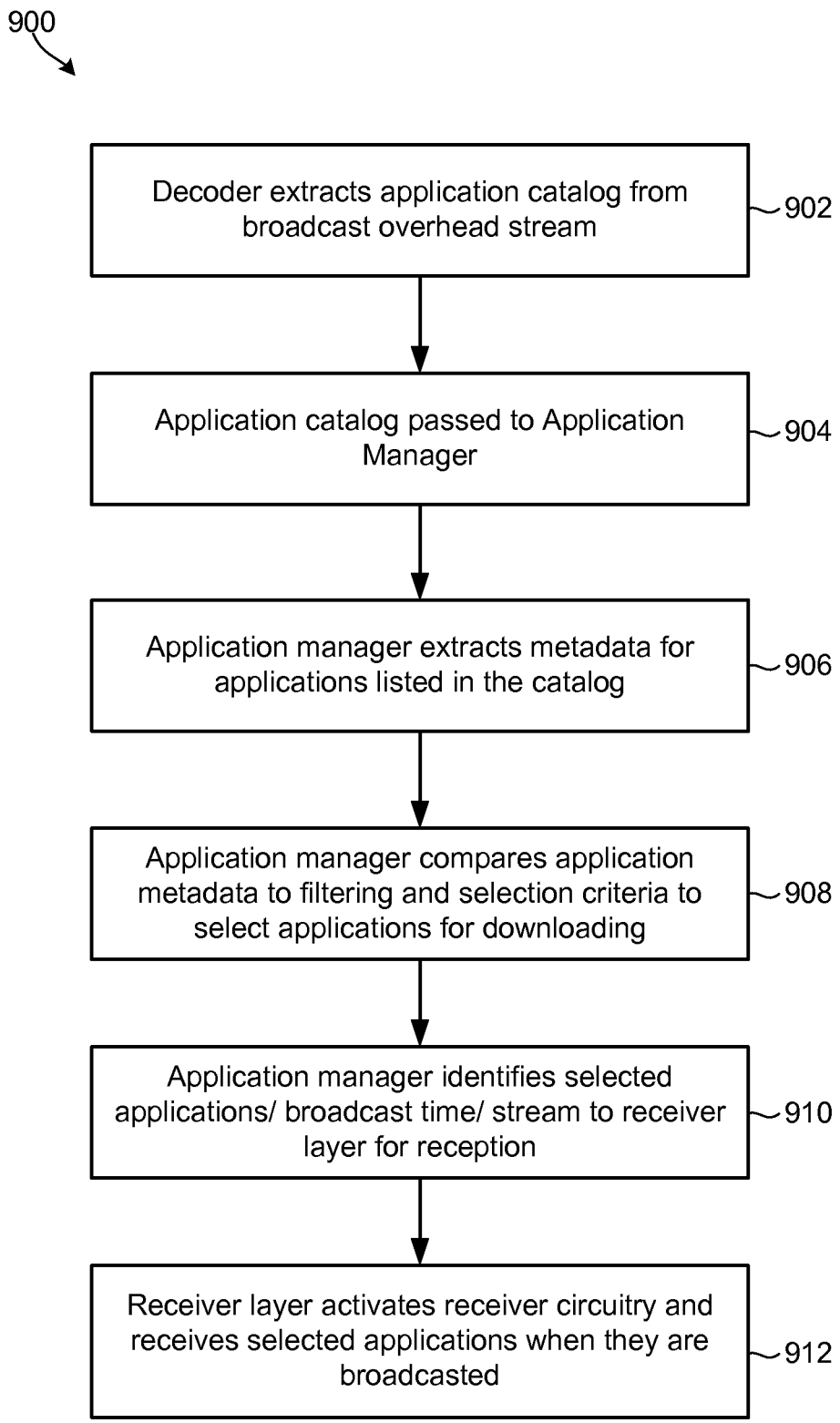
FIG. 9 is a process flow diagram of an embodiment method that may be implemented in receiver devices for selecting applications for download from a broadcast application catalog.

As mentioned above, receiver devices may select applications for reception from the broadcast stream based upon a catalog or other information included in a broadcast overhead stream. FIG. 9 illustrates an example method 900 that may be implemented in a receiver device for selecting application packages for reception from the broadcast stream based on information contained in such a catalog message. In step 902 of method 900, the decoder 802 may extract an application catalog from a broadcast overhead stream, and in step 904 pass the application catalog to the application manager 806. In step 906, the application manager may extract metadata for applications listed in the catalog. In step 908 the application manager may compare the extracted application metadata to filtering and selection criteria known to the receiver device to select appropriate applications for downloading. Such filtering and selection criteria may be any of a variety of information useful for identifying applications that are particularly relevant to, and compatible with, the receiver device (e.g., model number, carrier identifier, geographic area, service plan, resident applications, etc.), as well as applications and interactivity events targeted to the device user (e.g., user gender, age bracket, affiliations, viewing habits, preferences, requested services, etc.).

In step 910, the application manager may identify selected applications for reception, as well as their broadcast times and the broadcast streams over which the application packages may be received, and provide this information to the broadcast receiver layer for reception. It should be noted that the broadcast time and broadcast stream information may be received from a file delivery overhead message. The receiver layer may include both a physical layer and a network layer. In step 912, the receiver layer uses the information received from the application manager to determine when to activate the receiver circuitry in order to receive the selected applications from the broadcast stream.

Figure 10:
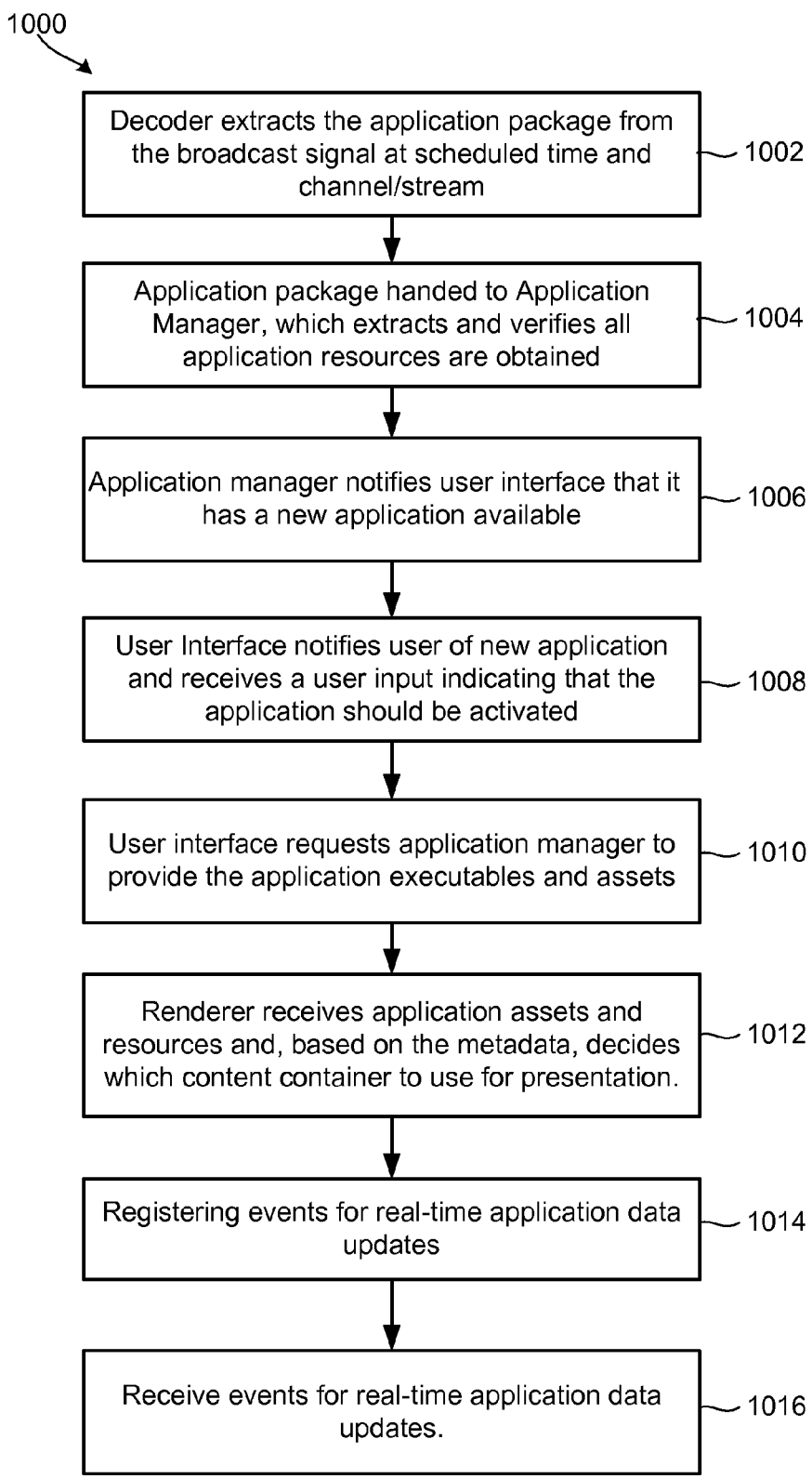
FIG. 10 is a process flow diagram of an embodiment method that may be implemented in receiver devices for activating an application after it has been received.

Received applications may be activated based on user actions. FIG. 10 illustrates an example method 1000 that may be implemented in a mobile device to process received applications. In step 1002 of method 1000, the decoder 802 extracts the application package from the broadcast signal at the scheduled time and channel or stream. In step 1004, the received application package is handed to the application manager 806, which extracts and verifies that all application resources have been obtained. As part of step 1004, the application manager 806 may also recall from memory any common templates or software assets specified, but not included, within the application package. In step 1006, the application manager 806 may notify the user interface 812 that it has received a new application that is available for implementation (illustrated by arrow 822). In step 1008, the user interface 812 may generate a UI display that notifies the user that a new application has been received. The user interface 812 may also prompt the user to indicate whether the application should be launched. As part of step 1008, the user interface may await a user input indicating that the application should be activated. If the user indicates that the application should be activated, in step 1010, the user interface 812 requests the application manager 806 to provide the application executables and assets (illustrated by arrow 824). In step 1012, the renderer 814 receives the application assets and resources (illustrated by arrow 822) and, based on the metadata, decides which content container (e.g., flash player 816, web kit 818, or native script 820) to use for presentation. For example, if the application is a twitter application that has a shockwave file mime type, the renderer may decide to use the flash player container 816.

As part of implementing an application, in step 1014, the user interface 812 may register for interactivity events related to real-time application data updates (illustrated by arrow 826). Thereafter, in step 1016, the user interface may receive events for real-time application updates via the events manager 810 (illustrated by arrow 828).

Once applications are received and verified, the user interface 812 may inform the user of the receiver device of the application's availability. This is illustrated in FIG. 3A, which shows a receiver device 106 presenting a video program 160 with a user notification 162 informing the user of a newly received application.

While the user notification illustrated in FIG. 3A is a single application notice, more sophisticated user interfaces may be provided. In an embodiment, multiple applications may be downloaded, and a menu notification may be presented to the user, enabling the user to select multiple applications for activation. In this manner, multiple applications may be downloaded by receiver devices, such as while a receiver device is charging, and then presented to the user in a menu interface similar to a catalog or an online application store, the difference being that the applications are already cached in memory. In this embodiment, users may select the applications they wish to implement by touching an icon on a touchscreen interface or selecting applications using device buttons. Selected applications are then implemented as described above, while non-selected applications may be deleted from memory at some point in time. As part of this user interface catalog of downloaded applications, users may be presented with the option of deleting applications from memory.

In a further embodiment, user selections and rejections of downloaded applications may be used by the receiver device to learn about the user's preferences. In this manner, over time the receiver device can develop filtering or selection criteria to enable the device to select or auto subscribe to applications or types of applications for download that are more likely to match the user's preferences.

Figure 11:
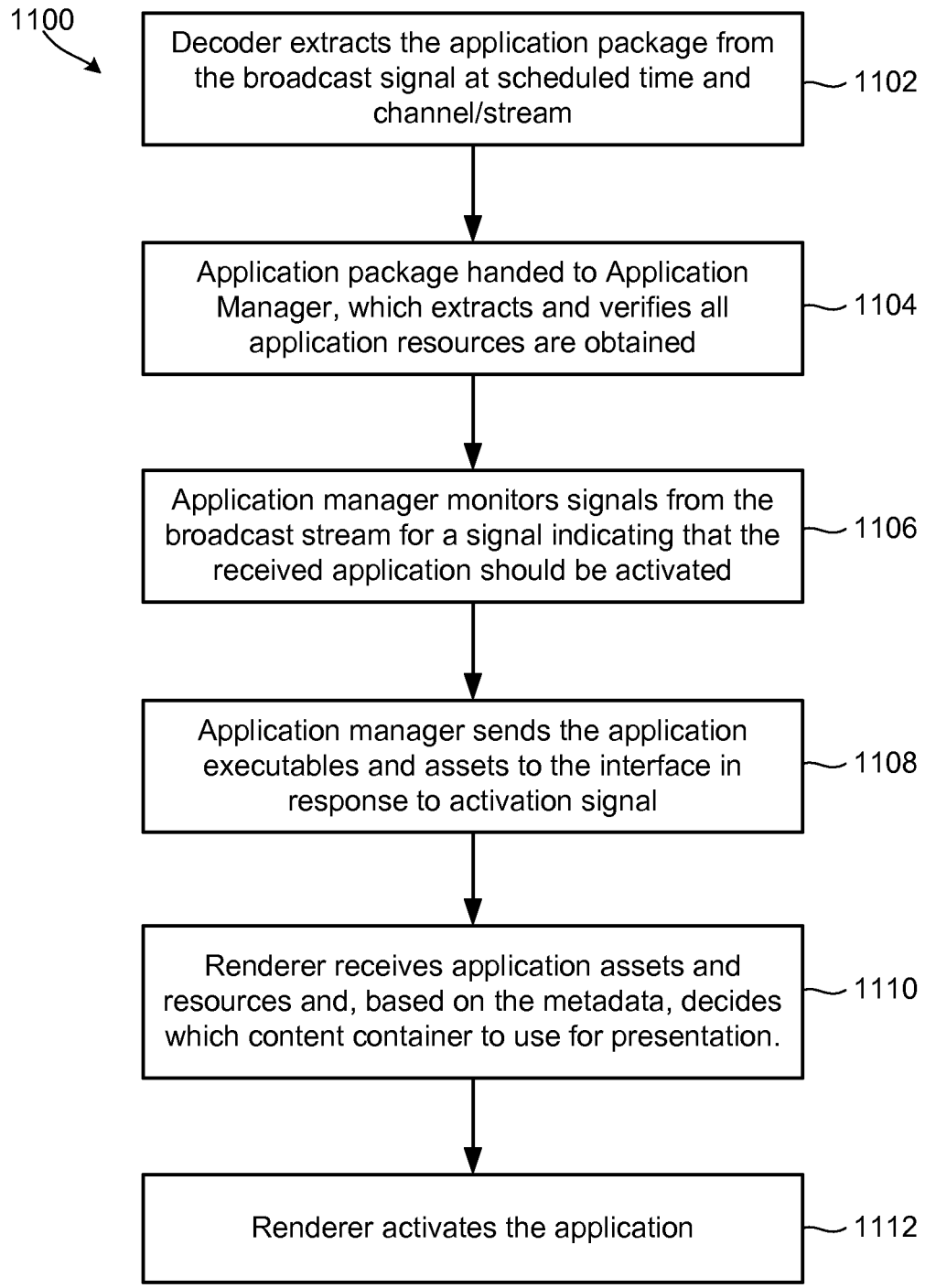
FIG. 11 is a process flow diagram of another embodiment method that may be implemented in receiver devices for activating an application after it has been received.

In the various embodiments, received applications, such as interactivity event applications, may be automatically activated based on signals received within the broadcast stream so as to synchronize the application functionality with real-time broadcast content. FIG. 11 illustrates an example method 1100 that may be implemented on receiver devices to enable such synchronized application activation. In step 1102 of method 1100, the decoder 802 extracts the application package from the broadcast signal at the scheduled time and channel or stream. In step 1104, the received application package is handed to the application manager 806, which extracts and verifies that all application resources have been obtained. As part of step 1104, the application manager may also recall from memory any common templates or software assets specified but not included within the application package. In step 1106, the application manager monitors signals from the broadcast stream for a signal indicating that the received application should be activated. Such a signal to activate the application may be received in the form of metadata 804 within a broadcast overhead stream. Alternatively, the events manager 810 may monitor the broadcast stream for an event signaling message (ESM) indicating that the received application should be activated. Formats for such event signaling messages are disclosed below.

In response to receiving a signal to activate the application, the application manager 806 may send the application executables and assets to the user interface in step 1108. In step 1110, the renderer 814 may receive the application assets and resources (arrow 822) and, based on the metadata, decide which content container (e.g., flash player 816, web kit 818, or native script 820) to use for presentation. In step 1112, the renderer may then activate the application. The application may be activated such that it is synchronized with the real-time content being displayed on the receiver device or at some other specific time identified in the interactivity event metadata or signaling message.

As in more detail below, event signaling messages that are broadcast over the air in advance of the actual start time of the interactivity event may be modified, updated or terminated. This may be accomplished by broadcasting a second event signaling message that includes the same event ID, an updated event version number, and an event status indicator. There may be a number of reasons that an application provider may desire to cancel a synchronized application activation event after it has been broadcast. For example, an application activation event may be canceled due to changes in the content programming or events occurring in real time. For example, application providers may broadcast two alternative applications associated with the outcome of a sports event. The application providers may then cancel the application activation that is not relevant to the outcome.

Figure 12:
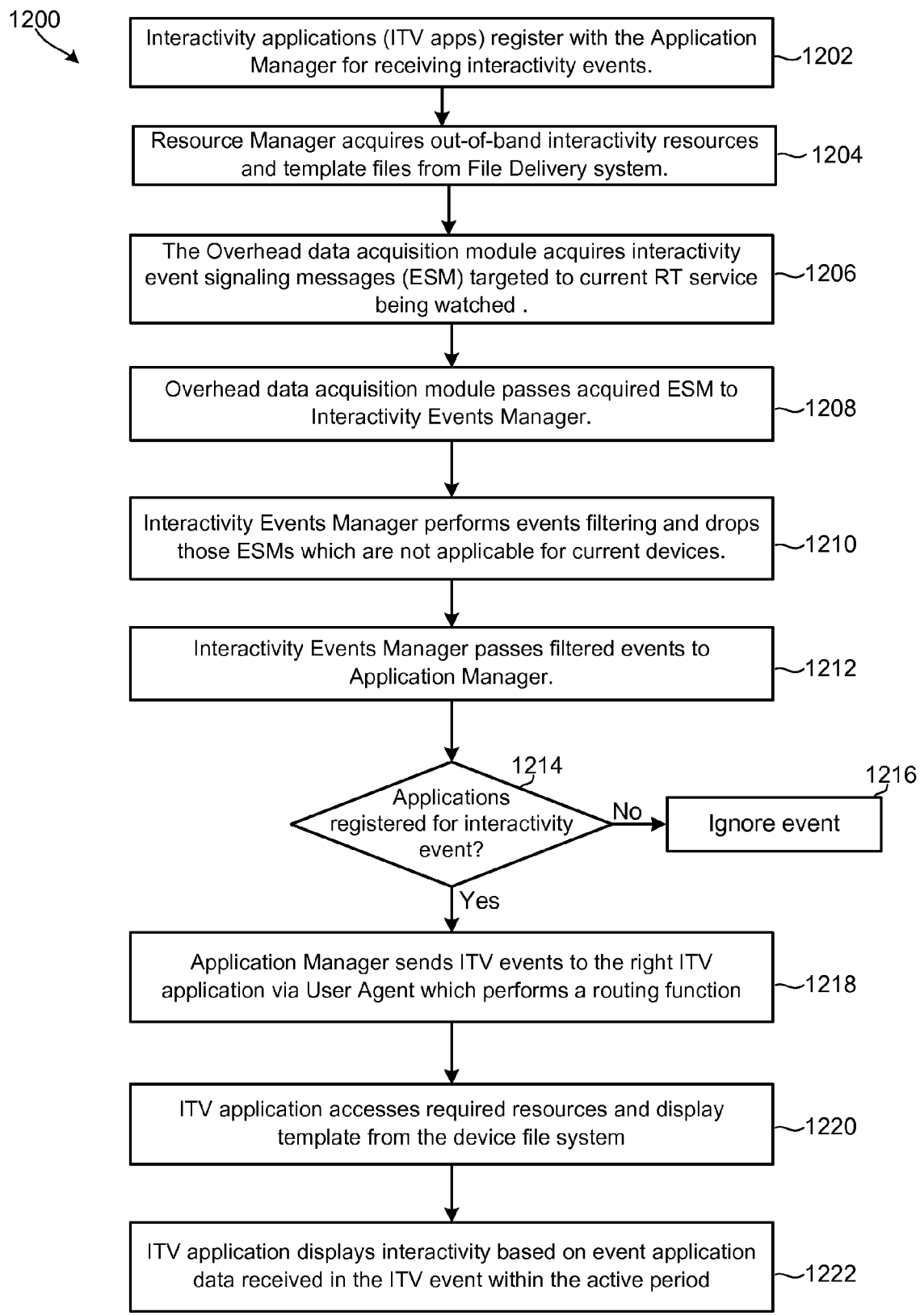
FIGS. 12 and 13 are process flow diagrams of embodiment methods for receiving and processing interactivity event signaling messages within a mobile device.

As discussed above, the interactivity broadcast server 5 may provide required interactivity event application data, resources and templates (i.e., data, resources and templates that a receiver device needs to generate the interactivity event) to a file delivery system 38 for transmission. The interactivity broadcast server 5 may also generate interactivity event signaling messages which are provided to the overhead data delivery system 36 for transmission via the overhead information flows via the broadcast network 1. FIG. 12 illustrates an example method 1200 that may be implemented in receiver devices for receiving and processing the interactivity event signaling messages generated and broadcasted according to the embodiment described above with reference to FIG. 4.

FIG. 12 illustrates an example method 1200 for receiving and processing interactivity event signaling messages (IESM) in receiver devices. In method 1200 in step 1202, interactivity applications active on a mobile device may register with the application manager in order to receive interactivity events. In an embodiment, interactivity applications may register to receive one or more types of interactivity events. Registration of the interactivity applications with the application manager is illustrated by arrow 2262 in FIG. 2.

As discussed above, interactivity applications may register with the application manager to receive one or more types of interactivity events. For example, interactivity applications may register their application identifier (ID) with the application manager so that the application manager can ensure that interactivity events specifying that application ID will be received and processed. The application manager may accomplish this by passing the application ID to the overhead data acquisition module functioning in the receiver device processor. The overhead data acquisition module may selectively receive the interactivity events for registered application IDs from overhead flows received from the FLO network. The overhead data acquisition module may also use the registered application IDs as filtering criteria for selectively processing interactivity events. In various embodiments, interactivity applications may also register an additional mime type for the interactivity event application data. In these embodiments, the interactivity applications will only receive events which have application data with the registered mime types. In various embodiments, the interactivity applications may use other methods to request specific interactivity events be received from the broadcast channel overhead flow such as issuing the requests based on unique event names, unique event types, etc. In an embodiment, interactivity event application data (IEAD) that is transmitted out of band may be received from the file delivery flow and stored in memory of the receiver device until the interactivity event is scheduled to begin.

In step 1204, the resource manager module may acquire interactivity resources and template files related to interactivity events from the file delivery system, as per the logic and method described below with reference to FIG. 23A. In step 1206, the overhead data acquisition module may acquire an interactivity event signaling message (IESM) from the broadcast overhead flow. The overhead data acquisition module may filter interactivity event signaling messages based upon a variety of criteria, such as the real-time channel to which the receiver device is currently tuned, receiver's device profile, target carrier etc. That is, in an embodiment, the overhead data acquisition module may be configured to only acquire those interactivity event signaling messages which are targeted to the current real-time service being monitored and other matching filtering criteria. In other embodiments, interactivity event signaling messages that are not tied to a real-time service (e.g., unbound interactivity event signaling messages) may be acquired at any time, regardless of which real-time services are being watched, provided that the interactivity event signaling messages satisfy other filtering criteria, such as device type, targeted carrier, user demographics, etc.

In step 1208, the overhead data acquisition module may pass the acquired interactivity event signaling messages (IESMs) to the interactivity events manager. This is illustrated in FIG. 2 by the arrow 2802. In step 1210, the interactivity events manager may perform event filtering and drop (i.e., not save) or not receive any interactivity event signaling messages that are not applicable to the receiver device or to the current state of the device. The interactivity event manager may also determine if a mandatory resource or template required to play the interactivity event has already been downloaded from the resource manager in step 1204. In an embodiment, the interactivity event will not be played if the mandatory resource or template is not available at the interactivity event time. In an embodiment, the interactivity events manager may perform the event filtering based on target criteria included in the interactivity event signaling message.

In step 1212, the interactivity events manager may pass filtered interactivity events to the application manager. The application manager may determine if there are any interactivity applications already registered to receive the received interactivity event at step 1214. This determination may be based upon the application ID, mime type for the event application data, event name, event type, or similar information included within the interactivity event signaling message (IESM). If the received interactivity event does not match any registered interactivity application (i.e., determination step 1214="No"), the received event may be ignored in step 1216.

If one or more of the interactivity applications registered with the application manager to receive interactivity events matches the received interactivity event signaling message (i.e., determination step 1214="Yes"), in step 1218 the application manager may send the interactivity event to the appropriate interactivity application via the user agent within the user interface. In an embodiment, the user agent may perform the function of routing interactivity events to the correct interactivity application.

In step 1220, an interactivity application receiving an interactivity event may access the required resources and templates from the device file system, and use these resources and/or templates to assemble or generate the required interactivity display and functionality. In step 1222, the interactivity application may display the interactivity content based upon the event application data that was received in the interactivity event signaling message.

Since some interactivity events may overlap in time, receiver devices may be configured to determine which of two or more overlapping events should be displayed and when. Performing this determination in the receiver device may simplify scheduling and formatting on the broadcast side, and enable receiver devices to manage overlapping events that may occur from device-unique events (e.g., movements between reception areas, switching of channels and device information related to targeting criteria). For example, some receiver devices may match targeting criteria for two (or more) interactivity events which overlap in time, while most receiver devices will not match both (or more) criteria. Selecting among the two or more targeted interactivity events in the receiver device enables interactivity event suppliers and the broadcaster to generate targeted events without having to worry about deconflicting events for a minority of devices that match more than one criteria. To enable receiver devices to select among conflicting interactivity events in a manner preferred by interactivity event suppliers or the broadcaster, interactivity events may be assigned priority values which may be included within the interactivity event signaling message.

Figure 13:
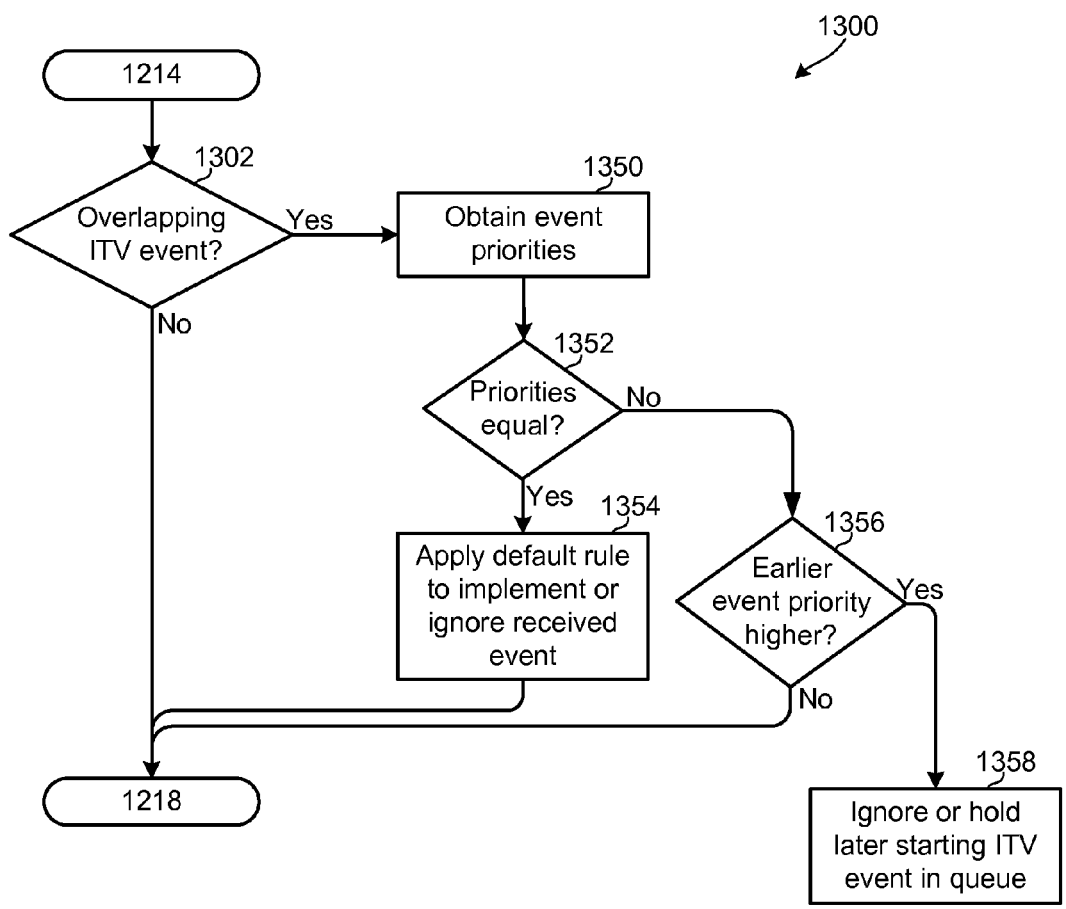

FIG. 13 illustrates an example method 1300 that receiver devices may implement for responding to overlapping interactivity events based upon a set priority value. Method 1300 supplements method 1200, which is described above with reference to FIG. 12, adding steps that may be implemented between steps 1214 and 1218.

As discussed above, in step 1214, the application manager may determine if there are any interactivity applications already registered to receive the received interactivity event. If the receiver device processor determines that applications are registered for the received interactivity event (i.e., determination step 1214="Yes"), in determination step 1302 of method 1300 of FIG. 13, the processor may determine whether the received interactivity event overlaps with another previously received interactivity event. If there is no overlap with a previously received interactivity event (i.e., determination step 1302="No"), the processor may proceed to step 1218 as described above with reference to FIG. 12. However, if the received interactivity overlaps another interactivity event (i.e., determination step 1302="Yes"), the processor may obtain the event priorities for each of the overlapping events from the interactivity event signaling message in step 1350.

In determination step 1352, the processor may compare the event priorities to determine whether they are equal. If the event priorities are equal (i.e., determination step 1352="Yes"), the processor may apply the default rule to either implement or ignore the later starting interactivity event in step 1354. In an embodiment, the default rule may be that the later starting interactivity event preempts the earlier starting interactivity event. In this case, the latter starting interactivity event will be implemented at its start time. In another embodiment, the default rule may be that latter starting interactivity events do not preempt earlier starting events. In this case, the latter starting interactivity event may be ignored (step 1216 in method 1200) or maintained in a queue to be activated when the earlier starting interactivity event ends (i.e., when the earlier starting interactivity event validity time expires).

As discussed above, in determination step 1352, the processor may compare the event priorities to determine whether they are equal. If the interactivity event priorities are not equal (i.e., determination step 1352="No"), in determination step 1356, the processor may determine whether the earlier starting interactivity event (which may be a currently active interactivity event in some circumstances) has a higher priority. If the earlier starting interactivity event has a lower priority than the later starting event (i.e., determination step 1356="No"), the processor may process the received later starting interactivity event for normal functioning by proceeding to step 1218 as described above with reference to FIG. 12. If the earlier starting interactivity event has a higher priority than the later starting event (i.e., determination step 1356="Yes"), the processor may ignore or hold the later starting interactivity event in a queue to be activated when the earlier starting interactivity event terminates, step 1358. If more than two overlapping interactivity events are received, the processor may implement steps similar to those illustrated in method 1300, to determine which interactivity event to implement at any given time.

The above mentioned priorities, and the pre-emption logic used by the device to select interactivity events could impact the user experience. For this reason, in an embodiment, the pre-emption logic used by the device may be controlled by a config/provisioning parameter stored in memory on the receiver device. This configuration parameter may allow the users of the receiver device to have greater control over the device, the displayed content, the interactivity functions of the system. For example, users may elect to ignore second arriving or lower priority interactivity events in the event of a conflict so as to avoid the annoyance of an interactivity event starting in the middle or running for too brief a period to be comprehended.

Figure 14A:
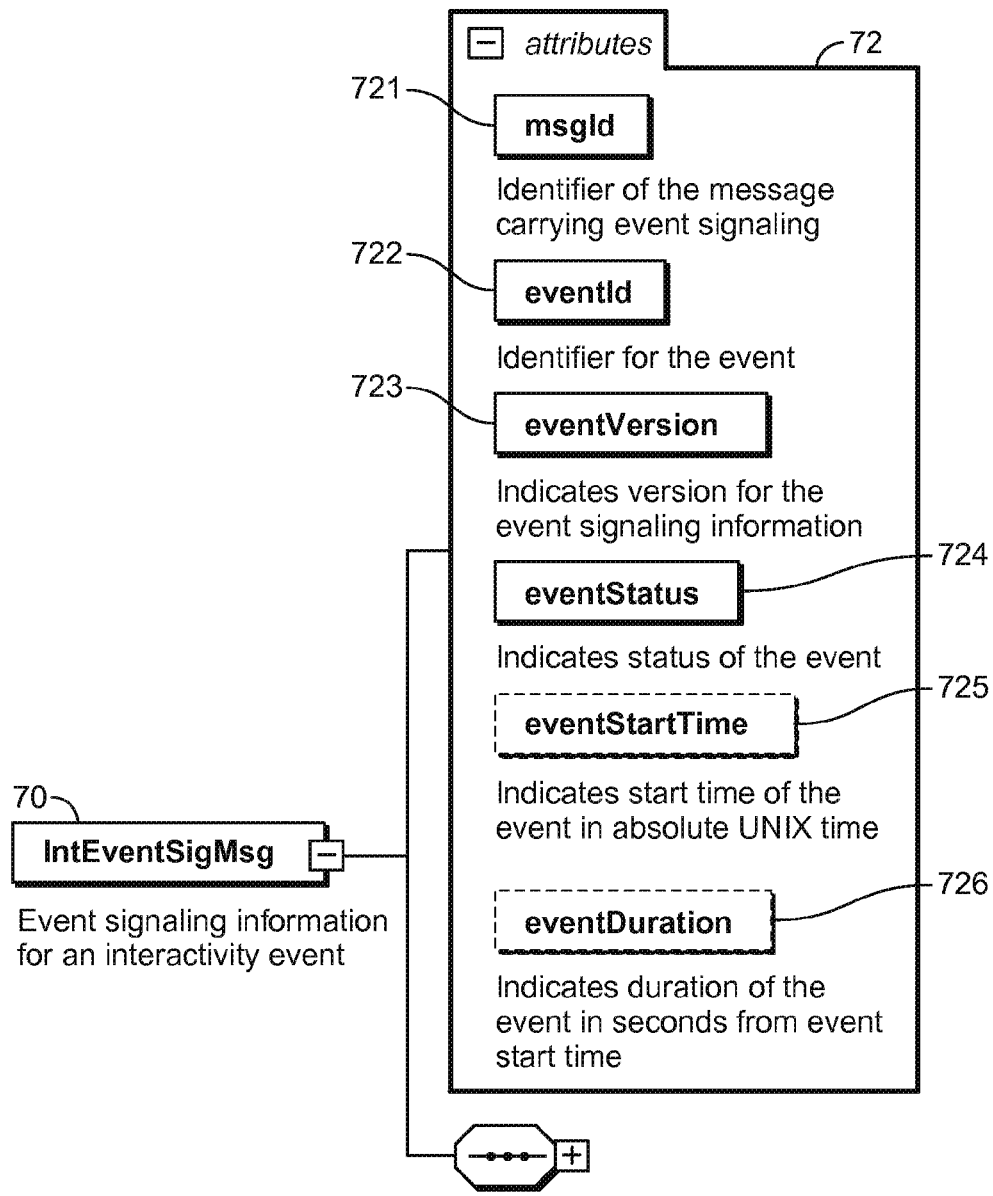
FIGS. 14A-16C illustrate example interactivity event signaling message data schema suitable for use with an embodiment.

FIGS. 14A-16C illustrate example data schema suitable for use in an interactivity event signaling message (IESM) according to the various embodiments. Referring to FIG. 14A, an interactivity event signaling message 70 may include attributes data 72 which may include a message identifier 721, an event identifier 722, an event version number 723, an event status 724, an event start time 725 and an event duration or termination time 726. The message identifier 721 may identify the message carrying the event signaling information. The event identifier 722 may provide a unique identifier for the specific interactivity event. The event version number 723 may indicate the version of the interactivity event signaling message, thereby enabling receiver devices to determine whether they have already received the particular signaling message. The event status 724 field may indicate a status of the interactivity event, such as to indicate whether event is currently active or stopped. In an embodiment, the event status 724 field may be updated to indicate that an event is already stopped and therefore should not be displayed on receiver devices. The event start time 725 field may indicate the start time for the event in a form that the receiver device can understand, such as in an absolute UNIX time format. The event duration or termination time 726 may indicate the duration of the event in seconds from the event start time (provided in data field 725). Alternatively, the event duration or termination time 726 may indicate a termination time in a form that the receiver device can understand, such as in absolute UNIX time form.

Figure 14B:
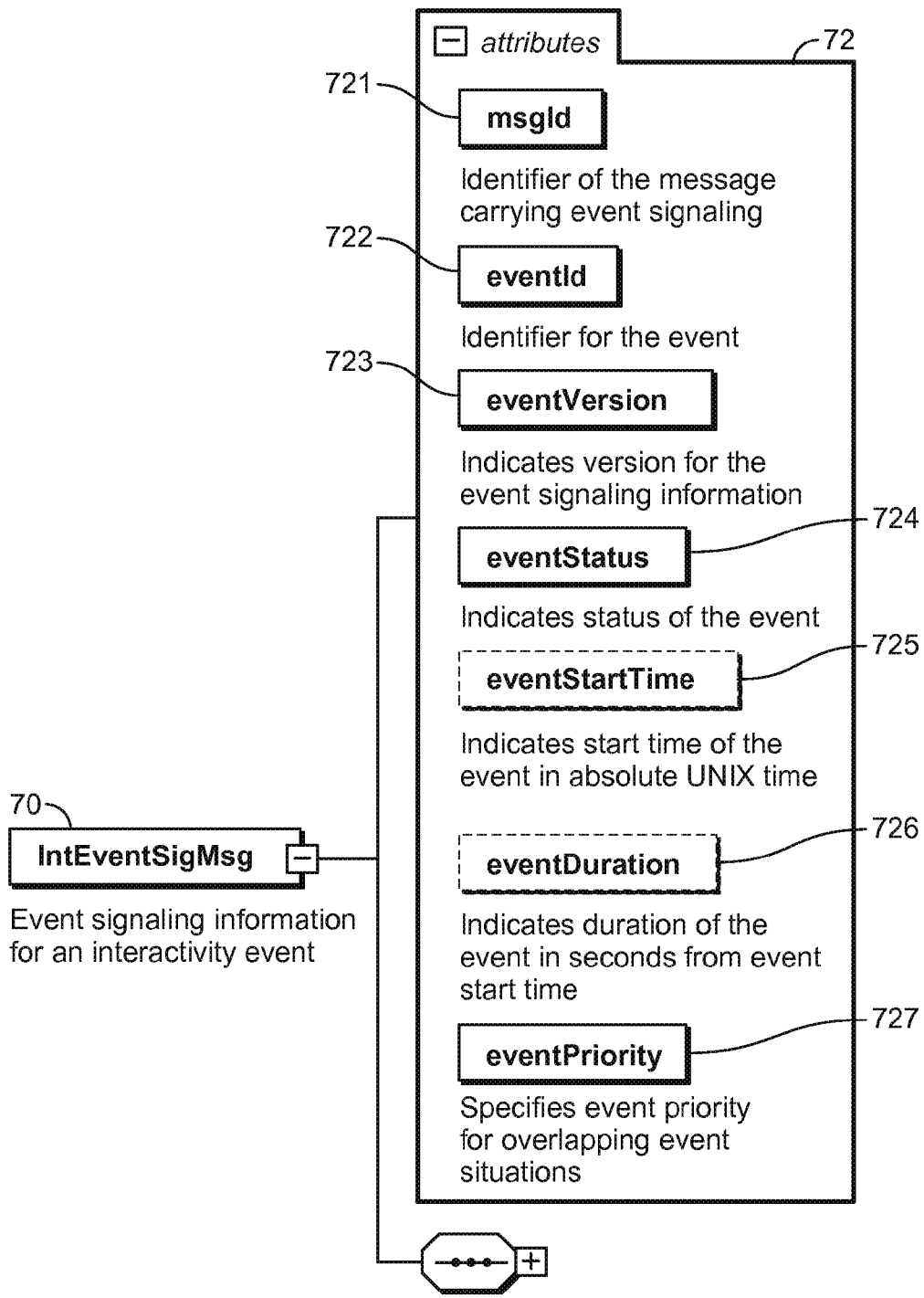

FIG. 14B illustrates an example data schema for an interactivity event signaling message (IESM) that supports receiving multiple interactivity event signaling message via event priorities, as discussed above with reference to FIG. 13. Specifically, FIG. 14B illustrates that an interactivity event signaling message 70 may have an event duration 726 element that indicates the duration of the event in seconds. In an embodiment, the event duration 726 may indicate the number of seconds from the event start time 725. The interactivity event signaling message 70 may also include an event priority field 727 that specifies the event priority for overlapping event situations where two or more interactivity event signaling messages overlap, as discussed above with reference to FIG. 13.

Figure 15:
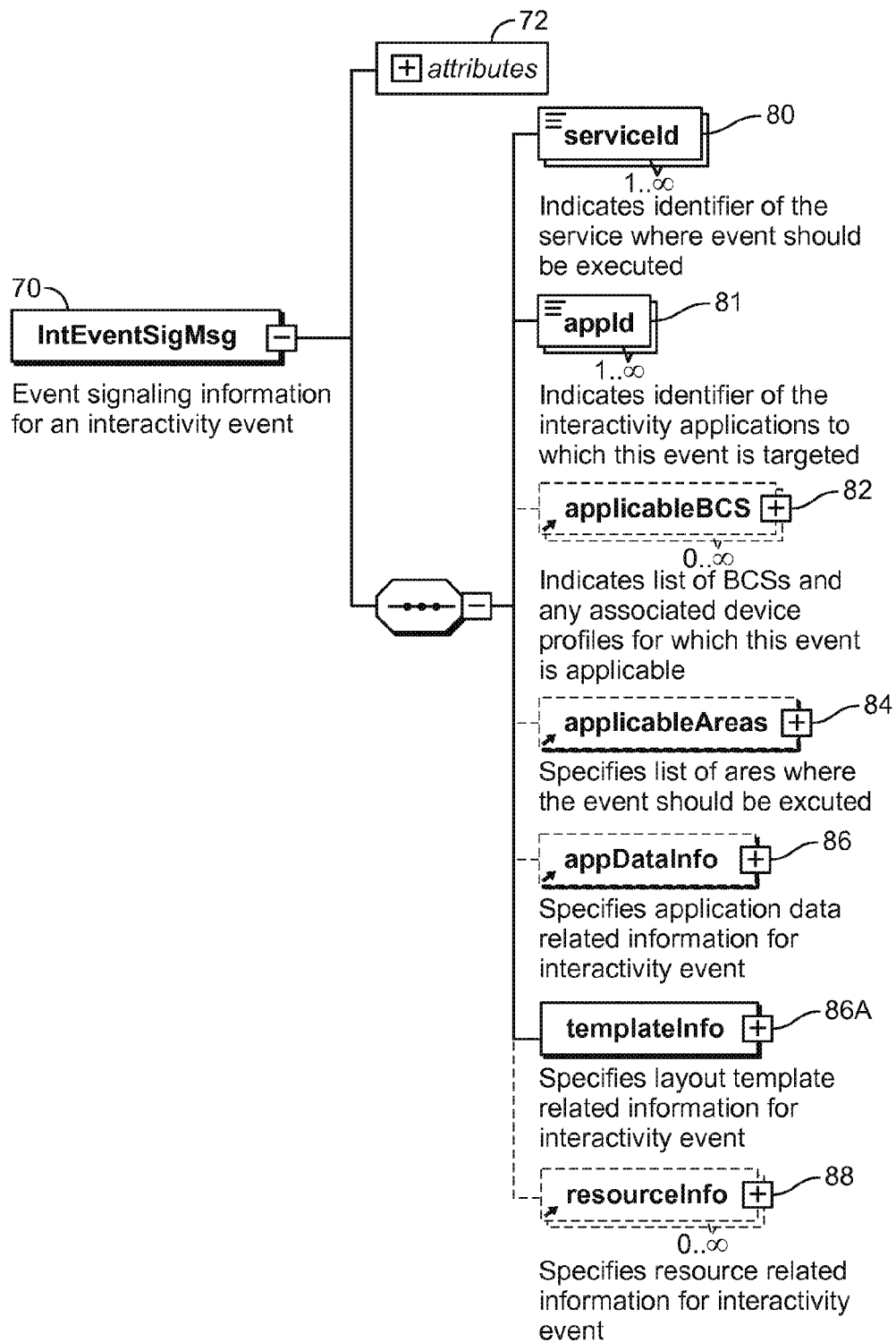
Figure 16A:
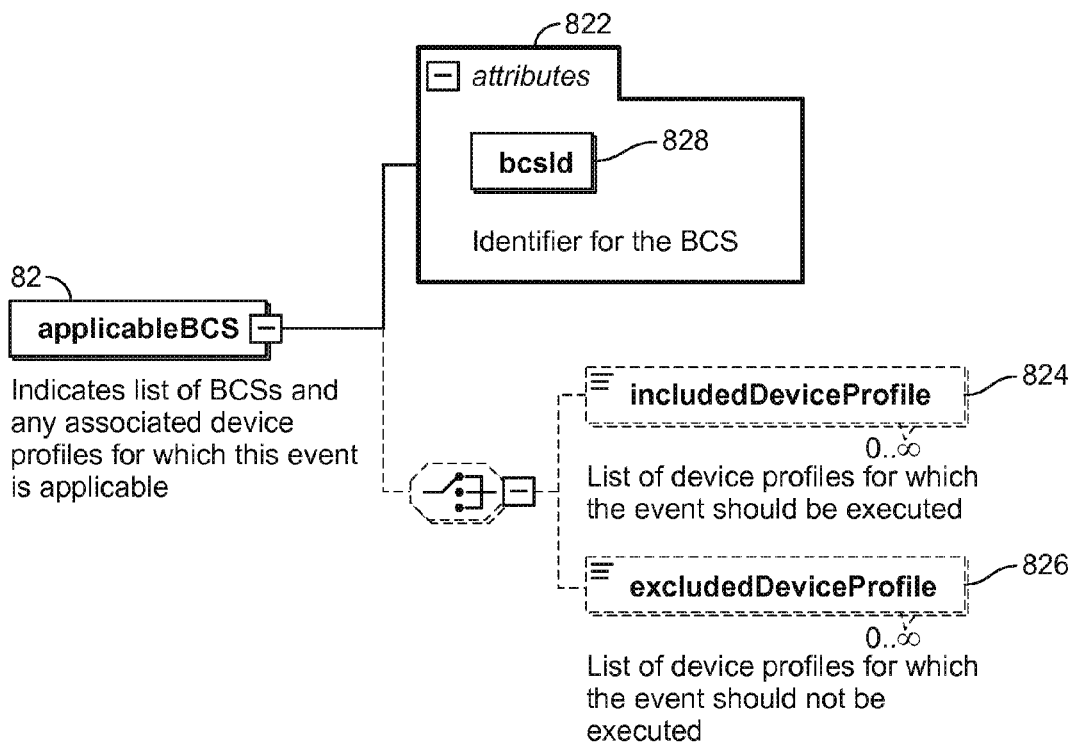
Figure 16B:
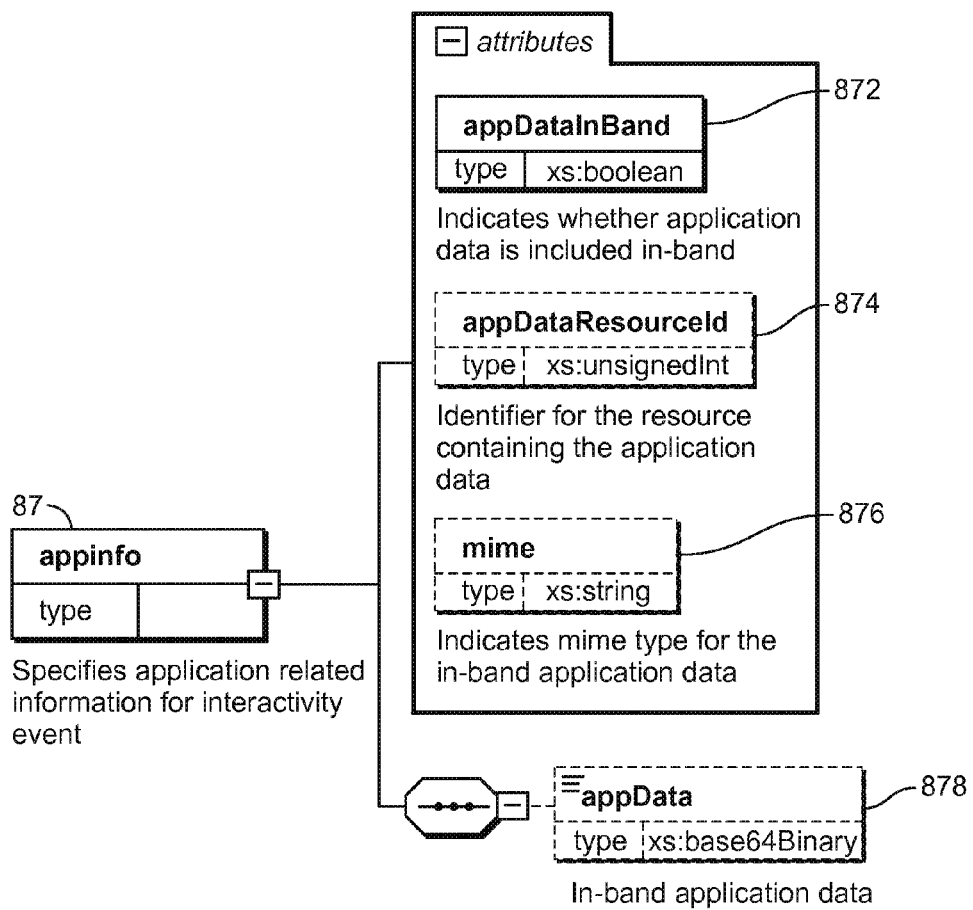
Figure 16C:
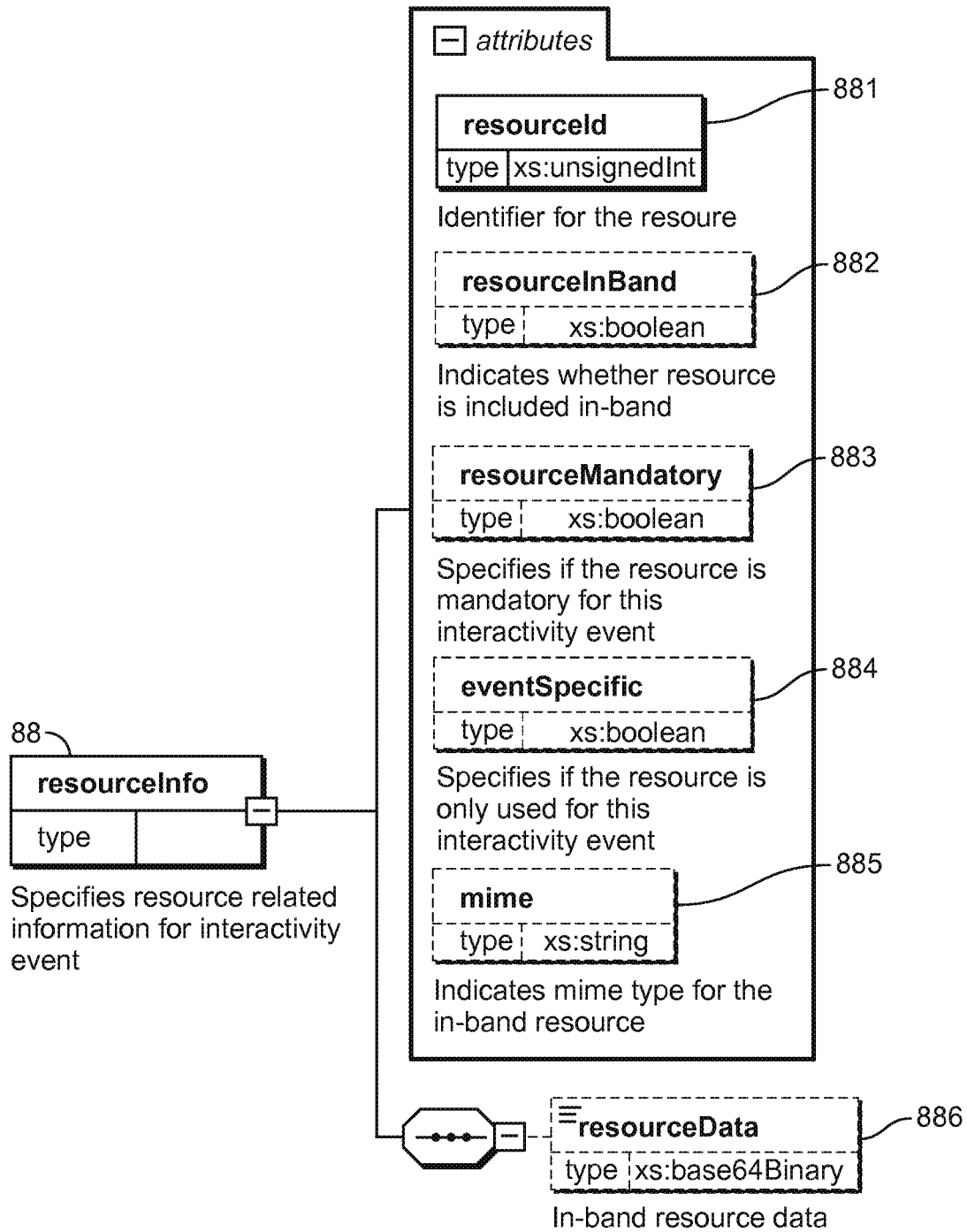

FIGS. 15 and 16A illustrate example data schema for an interactivity event signaling message (IESM) that enable in band delivery of the interactivity event application data, resources and templates. To enable out of band delivery of interactivity event application data, resources and templates, the interactivity event signaling data schema carries identifiers for these resources, assets and templates as illustrated in FIGS. 16B and 16C. It should be noted that, in various embodiments, a single generic schema may be used to support both in-band and out-of-band delivery of event application data, resources and templates.

Referring to FIG. 15, an interactivity event signaling message 70 may include a service identifier 80 that provides identifiers of one or more services where the interactivity event should be displayed, such as the targeted real-time service. An interactivity event signaling message 70 may also include an application identifier 81, which may include identifier for the one or more interactivity applications to which the event is targeted. The application identifier 81 may be compared to application IDs received from interactivity applications registering with the application manager, as described above. In various embodiments, the interactivity event signaling message 70 may also include an applicable billing and customer service providers (BCS) 82 which may list the BCSs (e.g. VZW or AT&T) and associated device profiles for which the interactivity event is targeted e.g., targeting event to all devices on Verizon BCS.

FIG. 15 illustrates that an interactivity event signaling message 70 may also include an applicable areas data field 84 which may list areas where the interactivity event should be executed/displayed. These areas may be defined in terms of geographic coordinates, an identifier of an accessed transmitter, infrastructure area identifiers defined by broadcast network or other type of geographic information so that the interactivity event is executed only if the receiver device is currently located within the identified applicable area. For example, in a MediaFLO network, applicable areas can be identified by wide-area operation infrastructure identifier (WOI ID) and/or local-area operation infrastructure identifier (LOI ID).

In various embodiments, the interactivity event signaling message 70 may also include application data information 86, which may specify application data related information for the interactivity event. The application data information 86 may include a resource identifier for the file carrying application data or may include the application data in-band in the event signaling message. An interactivity event signaling message 70 may also include template information 86A, which may specify template data related information for the interactivity event. The template information may include a template identifier for the pre-downloaded layout template data or may include the template data in-band in the interactivity event signaling message (e.g., for a short notice event using a new template). An interactivity event signaling message 70 may also include resource information 88, which may specify resource related information for the interactivity event. Such resource information 88 may identify required resources that the receiver device should recall from memory in order to implement/display the interactivity event.

FIG. 16A illustrates that the applicable BCS 82 may include attributes 822, such as an identifier for the BCS 828, an included device profile 824, and an excluded device profile 826. The included device profile 824 may list device profiles for which the interactivity event should be executed, while the excluded device profile 826 may list device profiles for which the event should not be executed. In an embodiment, only one of either the included device profile 824 or excluded device profile 826 may be present in the applicable BCS 82.

As mentioned above, interactivity event data, resources and templates may be broadcast either in-band as part of an interactivity event signaling message or out-of-band in a file delivery data flow in advance of the interactivity event delivery. Broadcasting event application data, resources and templates out-of-band can save on the bandwidth required to implement interactivity events. As discussed above, to enable out of band delivery of interactivity event application data, resources and templates, the interactivity event signaling data schema carries identifiers for these resources, assets and templates as illustrated in FIGS. 16B and 16C.

Referring to FIG. 16B, the application information 87, which specifies application related information for an interactivity, may include attributes such as application data in band attribute 872 which indicates whether application data is included in band, an application data resource attribute ID 874 which may identify the resource containing the application data, and a mime type attribute 876 which indicates the mime type for the in band application data. In addition, the application information may include application data 878 which provides the in band application data. If the application data is delivered out-of-band, the application data resource attribute ID 874 identifies the identifier of the file resource carrying the associated application data.

Referring to FIG. 16C, the resource information 88 within the interactivity event signaling message 70 may include a number of attributes and resource data 886. The attributes may include a resource ID attribute 881 which provides an identifier for the resource, a resource in band attribute 882 which indicates whether the resource is included in-band, a resource mandatory attribute 883 which specifies whether the resource is mandatory for the particular interactivity event, an event specific attribute 884 which specifies that the resource is only used for this particular interactivity event, and a mime type attribute 885 which indicates the mime type for the in band resource. If the resource is provided in band (as indicated in the resource in band attribute 882), the resource data 886 will include the identified resource data.

In an embodiment, interactivity events that are broadcast over the air in advance of the actual start time of the interactivity event may be modified, updated or terminated after their initial broadcast. The message schema illustrated in FIGS. 14A-16C enable such updates and termination with data fields, such as the message ID 721, event ID 722, event version 723, and event status 724. There may be a number of reasons why an interactivity content provider may desire to cancel an interactivity event after it has been broadcast. For example, an interactivity event may be canceled due to changes in the content programming or events occurring in real time. For example, interactivity content providers may broadcast two alternative interactivity events associated with the outcome of a sports event and then cancel the interactivity event that is not relevant to the outcome. Using these mechanisms, an interactivity content provider could broadcast in advance interactivity events which would enable viewers to order memorabilia appropriate for the team winning the Super Bowl, and then cancel the interactivity event corresponding to the losing team. In this manner, an interactivity event may be immediately displayed on the receiver devices to enable viewers to purchase memorabilia for the winning team without the delay that would otherwise be required to create and broadcast the interactivity event after the outcome was known.

When a decision is made to stop or cancel an interactivity event, a corresponding interactivity event signaling message may be broadcast which updates or replaces the previously broadcast event signaling message and indicates that the event is canceled or stopped. For example, the interactivity event signaling message may indicate in the event version 723 a new version number so that receiver devices will recognize it as an updated signaling message, and indicate in the event status 724 that the event has been canceled. It should be noted that since the only information required to terminate an interactivity event are the attributes identifying the event ID 722, the event version 723, and the event status 724, the interactivity event signaling message required to terminate an event may be very brief, reducing the amount of bandwidth required for such termination signaling. When the interactivity events manager on the receiver device receives the updated interactivity event signaling message indicating that the event has been canceled, it may delete that interactivity event from memory if it has not yet started. If the interactivity event has already started, then the interactivity events manager may signal the application manager to stop the event. The application manager may send an interactivity event stop signal to the interactivity application signaling the application to terminate and/or cancel the interactivity being displayed. In a similar manner, previously broadcast interactivity event signaling messages may be updated, such as to identify additional resources or templates, or modify some of the metadata or application data associated with the event.

In a further embodiment, interactivity event signaling messages may be configured and processed by receiver devices to accommodate overlapping interactivity events. As discussed above with reference to FIG. 12, in a variety of implementations and programming situations two or more interactivity events presented on a single content flow could overlap in time (i.e., their validity times could overlap). Another example of such a situation is a real-time broadcast program or content flow including a voting interactivity event (e.g., voting for a preferred entertainer, music video or song) that also includes interactivity events associated with advertisements. In this example, the voting interactivity event might include a user interface display for prompting and receiving user vote inputs, while the advertisement interactivity event might be an on-line ordering user interface to enable users to purchase the item being advertised. In some overlap circumstances, the broadcaster or programming/content provider may want the first activated interactivity event to be interrupted by a second (and third, etc.), such as to present the advertising interactivity event. In other overlap circumstances, the first appearing interactivity event should not be interrupted by subsequent interactivity events, such as when the first interactivity event is a high priority event. In circumstances in which two or more interactivity events are scheduled to begin simultaneously or nearly simultaneously, there may be a mechanism by which receiver devices can determine which interactivity event to present, such as method 1300 described above with reference to FIG. 13.

As discussed above with reference to FIG. 13, to enable receiver devices to determine which of two or more overlapping interactivity events should be displayed to users, interactivity event signaling messages may include a priority value. FIG. 14B illustrates a system information data schema for an interactivity event signaling message 70 that includes an eventPriority 727 value as part of the message attributes. In this embodiment, the interactivity head end system may assign a priority to each interactivity event. In an embodiment, if the interactivity head end system does not assign a particular priority, all interactivity events may be assigned a default priority (e.g., low priority). Further, the receiver devices may be configured with interactivity logic to determine how to treat two or more overlapping interactivity events, such as always interrupting a current event by a later starting event of the same priority, or never interrupting a current event by a later starting event of the same priority. In this manner, broadcasters programming/content providers may control whether a first starting interactivity event is preempted by a later starting overlapping interactivity event by setting the priority of either the first or second priority events communicated in the interactivity event signaling message.

The example method 1300 described above with reference to FIG. 13 enables receiver devices to determine how to handle overlapping interactivity events according to the particular circumstances of the events, their priorities and user settings. For example, in an implementation in which the default priority setting for interactivity events is low priority and receiver devices are configured with logic to activate a later starting interactivity event when two events have the same priority, if a receiver device receives overlapping events with same priority, the receiver device will show the interactivity events in their start time order. If multiple same priority events are scheduled to start at the same time, then the receiver device may display the interactivity events in their acquisition order (i.e., in the order that the first interactivity event signaling messages were received). When an interactivity event terminates, if a second interactivity event of the same priority is still valid (based on the event's validity time), the second interactivity event may be displayed to the user.

In various embodiments, an operator can manually assign a higher priority to an interactivity event if the intention is to display that event over (i.e., preempt) other default priority interactivity events. Alternatively, the priority may also be assigned based on some business logic programmed at the head end system. Multiple levels of priority may be assigned to interactivity events by the head end system, such as numerical values from 0 to 9. An interactivity event signaling message data schema that include an event priority value is discussed above with reference to FIG. 14B.

As discussed above, to reduce the amount of data that must be transmitted at the time that an interactivity event signaling message is broadcast, and to enable more robust displays within a given broadcast bandwidth, interactivity events may use resources and templates that are broadcast and stored on receiver devices in advance. Such resources and templates may also include standardized displays, layouts, images, and functionality that can be used in multiple events and multiple types of events. In this manner, an interactivity event signaling message may specify one or more resources and templates to be implemented by the receiver device, and provide the data that is to be associated with the particular template implementation. For example, a simple standard template may provide a banner with formatted text positioned along the bottom of the display for text that is provided in the interactivity event signaling message. By specifying the banner template ID and including ASCI text data, an interactivity event signaling message comprising a small amount of data can generate a stylized text banner display.

In the various embodiments, resources and templates may be used to enable the system to implement a nearly unlimited number of functions. Examples of resources include software modules, APIs, flash scripts and XML scripts. Examples of templates include banners, boarders, images, user interface images and user input definitions. Resources and templates may be preloaded onto receiver devices, such as part of an OEM configuration, and deployed and updated over-the-air. A more detailed description for how resources and templates may be transmitted and updated over the air is provided below with reference to FIGS. 22-24D.

Figure 17:
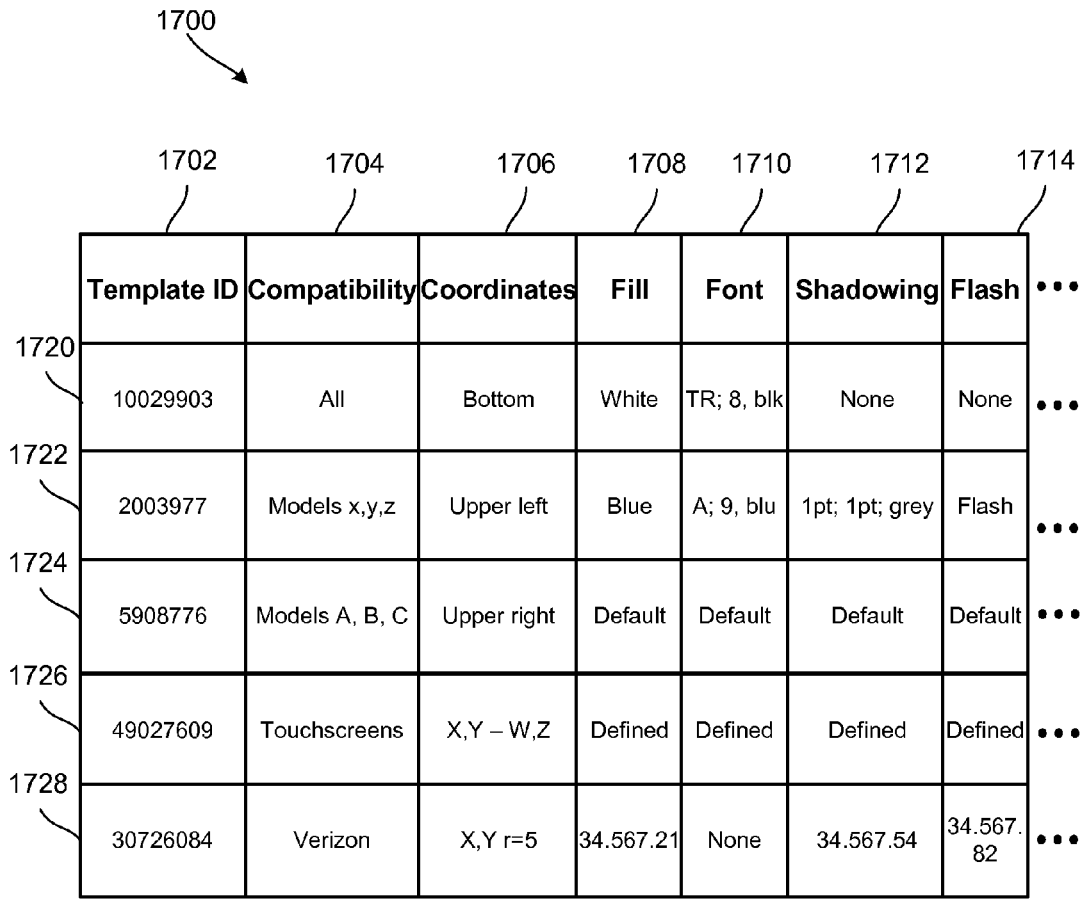
FIG. 17 is an example data structure of interactivity event templates suitable for use with an embodiment.

Templates may be structured using any known data structure, including XML scripts, C code data definitions, html scripts, and data tables, an example of which is illustrated in FIG. 17. For example, a template data table 1700 may store a plurality of templates 1720-1728, with each template made up of a plurality of data fields. For example, a template may include a template ID data field 1702, a compatibility or applicability data field 1704, a display coordinates data field 1706, a shape color or fill data field 1708, a text font data field

1710, a shadowing effects data field 1712, and a graphics functionality or flash data field 1714, to name just a few. The data fields illustrated in FIG. 17 are provided as examples of the type of information that may be implemented in a template, and it is envisioned that templates may include many more features and elements than shown in this figure.

A template identifier 1702 provides a convenient reference for referring to a particular template, such as for downloading or updating the template to receiver device memory, as well as for identifying the use of the template in an interactivity events signaling message. A compatibility or applicability data field 1704 may be useful for identifying particular types of receiver devices or interactivity applications for which the template is applicable. In this manner, receiver devices may filter out templates broadcast via the mobile broadcast system so that only those templates which are compatible with or applicable to the receiver device are received and stored in memory.

A template may include a number of characteristic data fields 1706-1714 defining how data may be presented in an interactivity event display. For example, the template may specify a particular location for text or images, the color or pattern of fill to be applied to the shape, a font (e.g., style and size) in which received data is to be presented, and any enhancements or graphical features to be applied, such as shading, flash, shadows, etc. In this manner, a wide variety of different graphical presentations of information can be implemented in interactivity events from relatively small interactivity event signaling messages by specifying within the message a particular template and including the data to be used in the template.

In addition to display layout and rendering information, template files may also specify functionality that should be implemented within interactivity events, particularly functions or routines that should be executed in response to various user inputs. A user interactivity event may involve the user expressing a preference, such as by voting, ordering merchandise, responding to a survey, etc., which will typically require receiving or transmitting information to the broadcast network, the interactivity content provider, the content provider, or another party, such as an advertiser. As mentioned above, such communication of user input information may be accomplished via the unicast network 11 (see FIG. 1A) using a variety of data messaging technologies and protocols, such as an IP data call, e-mail, SMS message, MMS message, and accessing a webpage on the Internet. In order to minimize the amount of information that must be included in the interactivity event signaling message, the communication method or protocol, address, data format, and other signaling specifications may be identified in the template file. For example, a template useful for voting events may specify that various user inputs corresponding to different user voting selections are transmitted to particular message destinations in an appropriate format for reception. For example, the template may specify that user inputs are transmitted to a designated IP address via one of an IP data call, an e-mail, an SMS message, an MMS message, and/or by accessing a webpage on the Internet.

As discussed above, templates may be broadcast in advance of an interactivity event, and may also be included in configurations provided at the device OEM or by the service carrier. Templates may be broadcast and updated during times of day when users are unlikely to be viewing content, such as between the hours of 2 AM and 6 AM, so as to make use of available bandwidth. Also, templates may be broadcast in the background so that users are unaware when templates are being downloaded or updated. As mentioned above, templates may be transmitted via the file delivery service of a mobile broadcast system.

Figure 18:
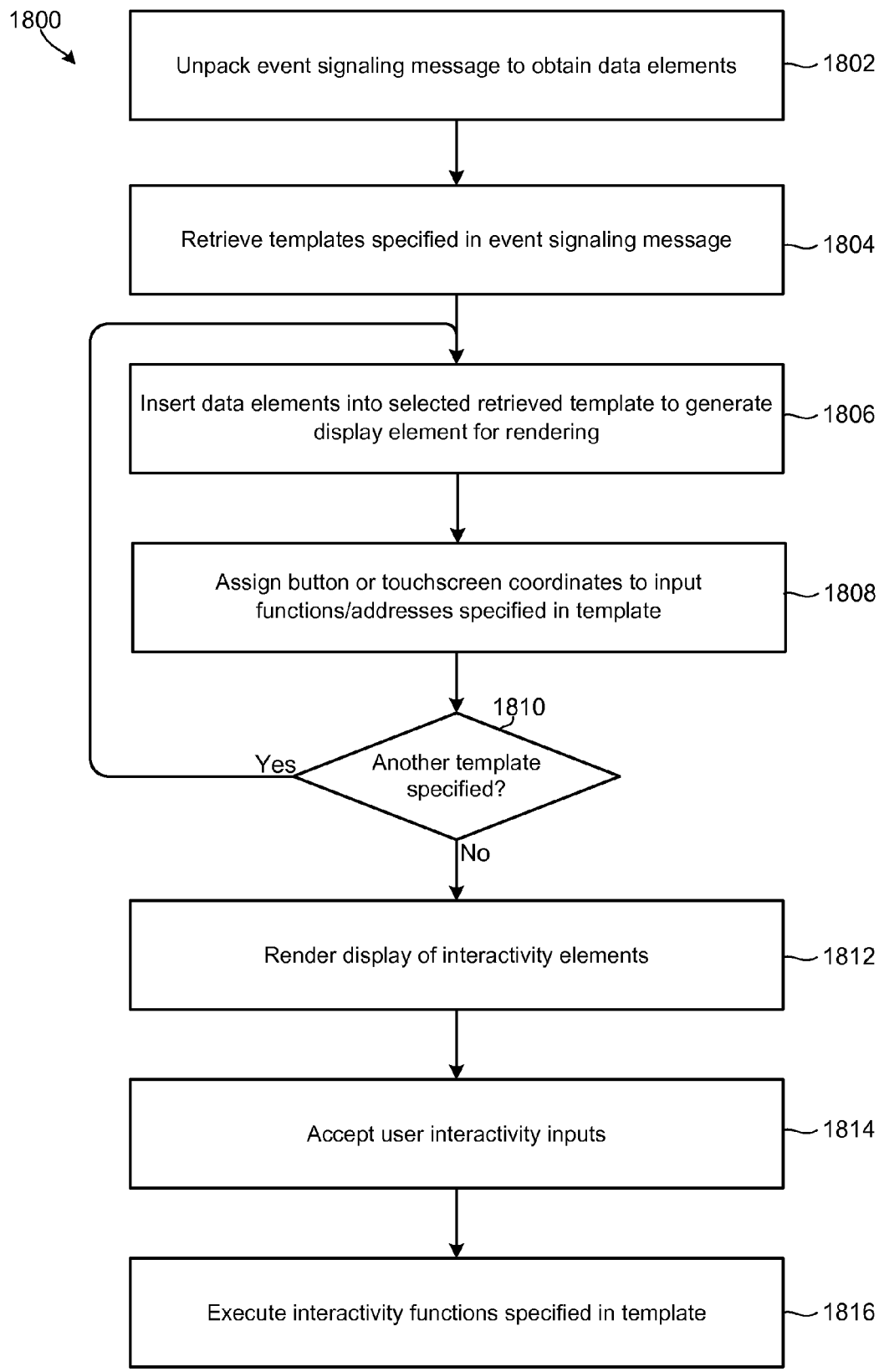
FIG. 18 is a process flow diagram of an embodiment method for implementing an interactivity event using an interactivity event template.

FIG. 18 illustrates an example method 1800 that may be implemented in receiver device processors for executing an interactivity event using a template. In method 1800 in step 1802, a receiver device processor receiving an interactivity event signaling message may unpack the message to obtain the various data elements, including an identifier for one or more templates (e.g., a template ID). This unpacking of the interactivity event signaling message may be accomplished by the interactivity events manager module operating on the processor as described above. In step 1804, the interactivity events manager may retrieve from the resource manager or resource memory any template specified in the event signaling message. In step 1806, an interactivity application may insert data elements received in the interactivity event signaling message into the retrieved template to generate display elements for rendering. In step 1808, the interactivity application may assign button or touch screen coordinates to particular input functions or addresses specified in the template. In this manner, the interactivity event may be configured to receive and process user inputs consistent with the particular interactivity event, with the particular button or touch screen icon being defined in the template.

As discussed above, multiple templates may be implemented in a single interactivity event. Accordingly, in determination step 1810, an interactivity application may determine whether another template is specified in the signaling message. If another template is specified in the signaling message (i.e., determination step 1810="Yes"), the interactivity application may insert data into the next template to generate a display element for rendering by returning to step 1806. When all specified templates have been implemented (i.e., determination step 1810="No"), the interactivity application may transfer the generated display elements to a display driver for presentation on the receiver device display in step 1812. With the interactivity display presented, a processor on the receiver device may standby to accept the user interactivity inputs at step 1814, and in step 1816, the processor may execute whatever interactivity functions are associated with received user inputs as specified in the template and in the application data or executable script included in the interactivity event signaling message.

Figure 19:
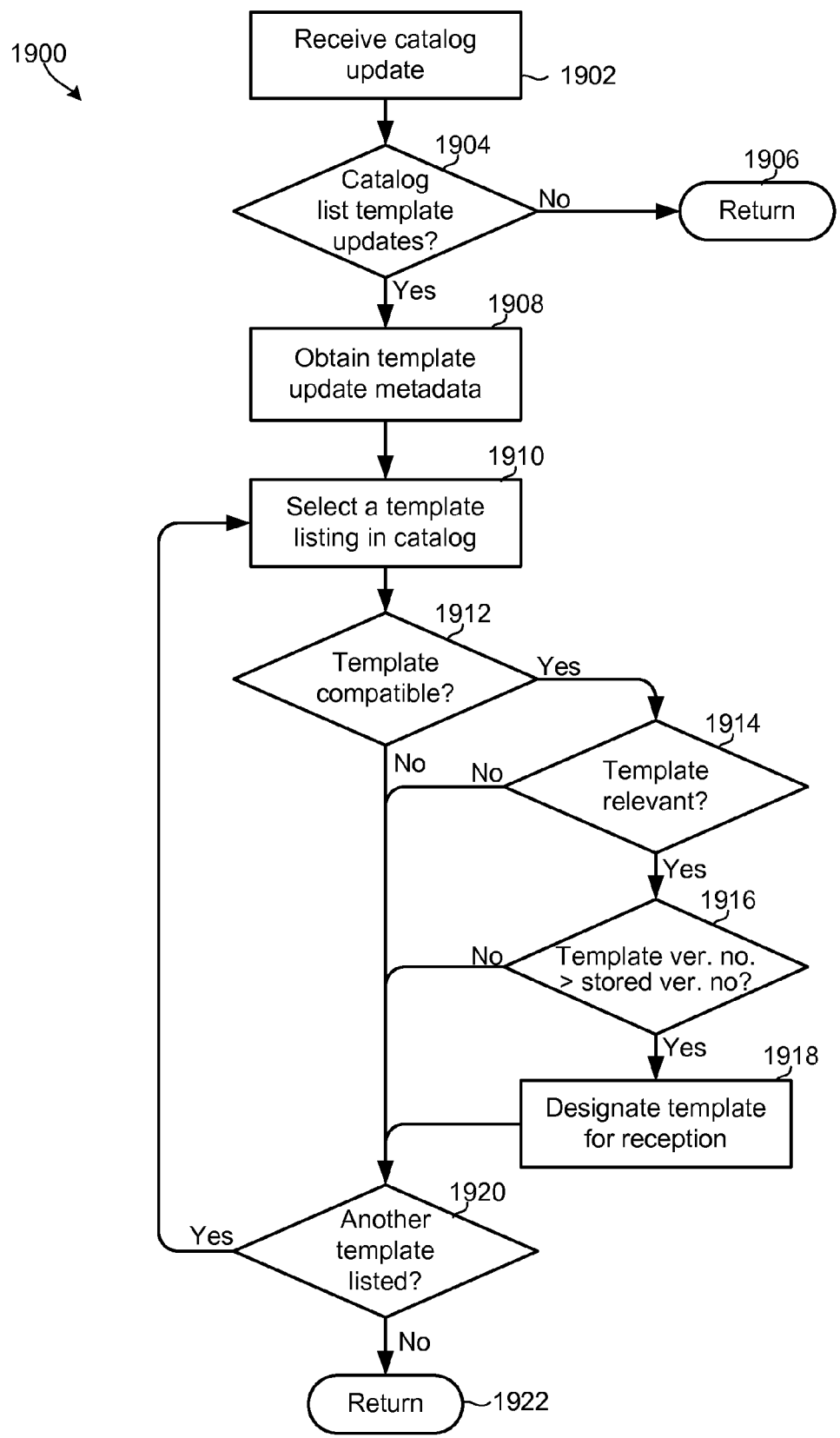
FIG. 19 is a process flow diagram of an embodiment method for identifying interactivity event templates in an electronic service guide catalog for reception and update via a broadcast network.

As mentioned above, templates may be downloaded and updated over the air, an example method 1900 for which is illustrated in FIG. 19. In method 1900 in step 1902, a receiver device may receive an electronic catalog update from the broadcast system. The electronic catalog may be transmitted on an overhead flow or may be transmitted as a file on the file delivery system. In determination step 1904, a processor of the receiver device may determine whether the received electronic catalog lists any template updates. If no template updates are listed (i.e., determination step 1904="No"), the processor may return to normal processing of the received electronic catalog in step 1906. If one or more template updates are listed in the received electronic catalog (i.e., determination step 1904="Yes"), the processor may obtain metadata associated with the template updates from the electronic catalog in step 1908. In step 1910, the processor may select a first template from the template listing in catalog, and in determination step 1912 determine whether the template is applicable to or compatible with the receiver device. This determination enables the receiver device to avoid downloading templates which are incompatible with or not applicable to the receiver device. If the template is determined to be compatible (i.e., determination step 1912="Yes"), the processor may perform further filtering, such as determining whether the template is relevant to any registered interactivity application in determination step 1914. If the template is determined to be relevant to one or more registered interactivity applications (i.e., determination step 1914="Yes"), the processor may determine whether the listed template is a newer version than one already stored in memory, such as by determining whether the template version number listed in the catalog is greater than the version number of the template stored in memory in determination step 1916. If the listed template version number indicates it is a newer version than that stored in memory (i.e., determination step 1916="Yes"), the processor may designate the listed template for reception at its indicated broadcast time in step 1918. After designating the template for reception in step 1918 or upon determining that the template is incompatible (i.e., determination step 1912="No"), irrelevant (i.e., determination step 1914="No") or is not a newer version than that stored in memory (i.e., determination step 1916="No"), the processor may determine whether another template is listed in the catalog in determination step 1920. If another template is listed (i.e., determination step 1920="Yes"), the processor may return to step 1910 to select the next template for evaluation. Once all templates listed in the catalog have been evaluated (i.e., determination step 1920="No"), the processor may return to normal processing of the received electronic catalog in step 1922.

Figure 20A:
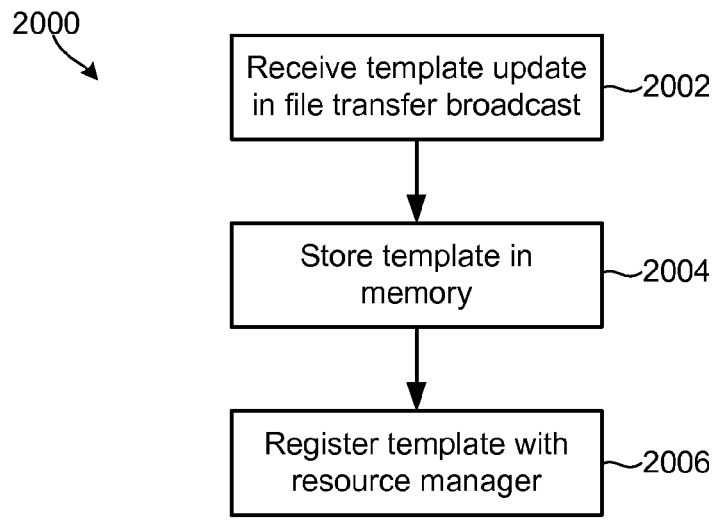
FIG. 20A is a process flow diagram of an embodiment method receiving and storing an updated interactivity event template.

FIG. 20A illustrates an example method 2000 which may be implemented on a receiver device for receiving templates and template updates over the air. When a template listed in the catalog has been designated for reception, this information may be conveyed to the file system module which may monitor the file delivery flow at the time indicated in the electronic service guide, catalog or another file delivery overhead flow to receive the designated template, step 2002. In step 2004, a received template may be stored in memory. In step 2006, a received and stored template may be registered with the resource manager so that the resource manager can retrieve the template as part of the process of executing an interactivity event. Alternatively, the resource manager may receive the template from the file system module and store it in memory in a location indexed by the resource manager.

Figure 20B:
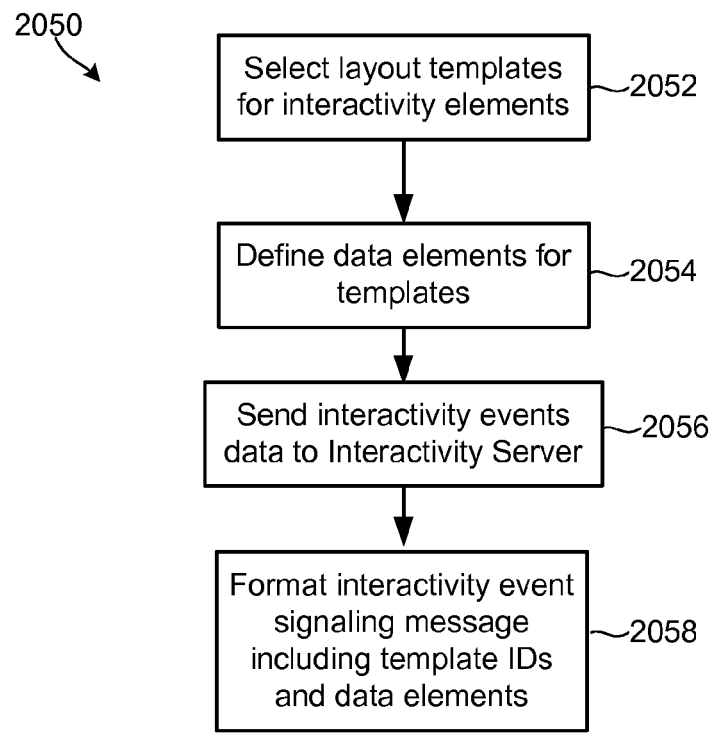
FIG. 20B is a process flow diagram of an embodiment method for generating an interactivity event using an interactivity event template for transmission via a broadcast network.

FIG. 20B illustrates an example method 2050 by which an interactivity production system may use templates as part of the process of generating interactivity event signaling messages. In step 2052, an operator using an interactivity production system may select one or more layout templates for use in defining interactivity elements to be displayed on receiver devices. The operator may then specify or define data elements to be inserted into the selected templates in step 2054. In an embodiment, the interactivity production system may provide a user interface which prompts the operator for the particular type and format of data required for selected templates. In step 2056, the interactivity production system may then forward the interactivity event information along with template IDs and metadata to the interactivity server. In step 2058, the interactivity server may then format the interactivity event signaling message by including the template ID and designated data elements in the proper format so that they can be received and interpreted by receiver devices as described above.

As mentioned above, an embodiment may enable interactivity events to be directed to particular groups of receiver devices or even individual receiver devices based upon a variety of filtering criteria that may be specified in the event signaling message. As illustrated in the example message schema shown in FIGS. 14A-16C, targeting or filtering criteria may be included in a number of data fields which the receiver devices can then use to determine whether a particular interactivity event is designated for them. For example, the message schema shown in FIGS. 14A-16C enables targeting of interactivity events based upon services, carriers (BCS), device types, interactivity applications and geographic areas. Additional targeting criterion may be included in interactivity message elements to enable targeting of events to individuals based upon demographic information, (e.g., the owner's gender, age bracket, etc.), service level or subscriptions, group affiliations, etc. Targeted interactivity events may be filtered at a number of stages, including when interactivity event signaling messages are obtained from the overhead flow, when they are processed by the interactivity events manager, and when they are processed by the applications manager. In this manner, user interactivity content may be narrowly targeted to users for which such content is particularly relevant or effective, thereby increasing the economic value of such services to content providers.

Figure 21A:
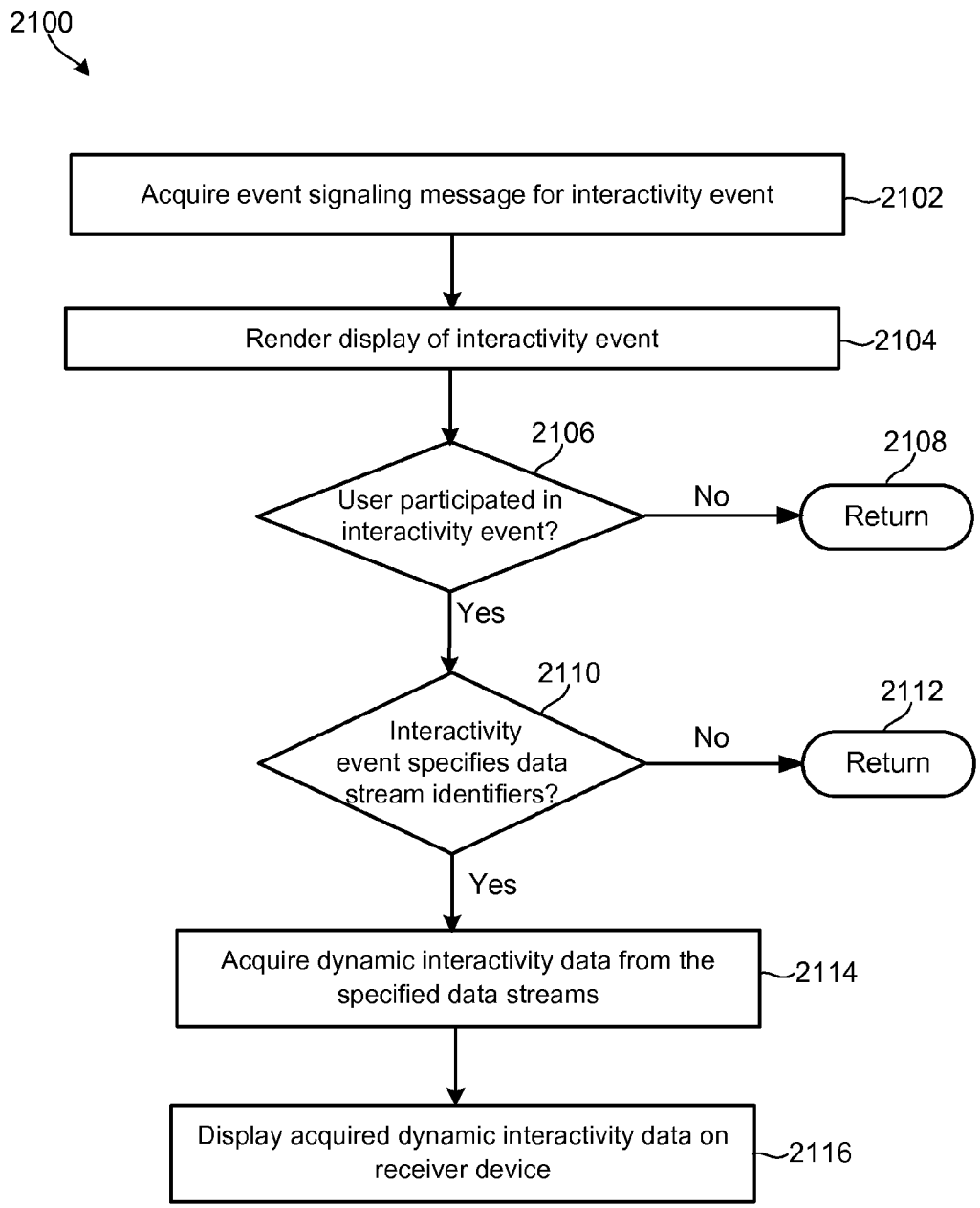
FIGS. 21A and 21B are process flow diagrams of embodiment methods for receiving additional data related to interactivity events on receiver devices based upon user participation in interactivity events.
Figure 21B:
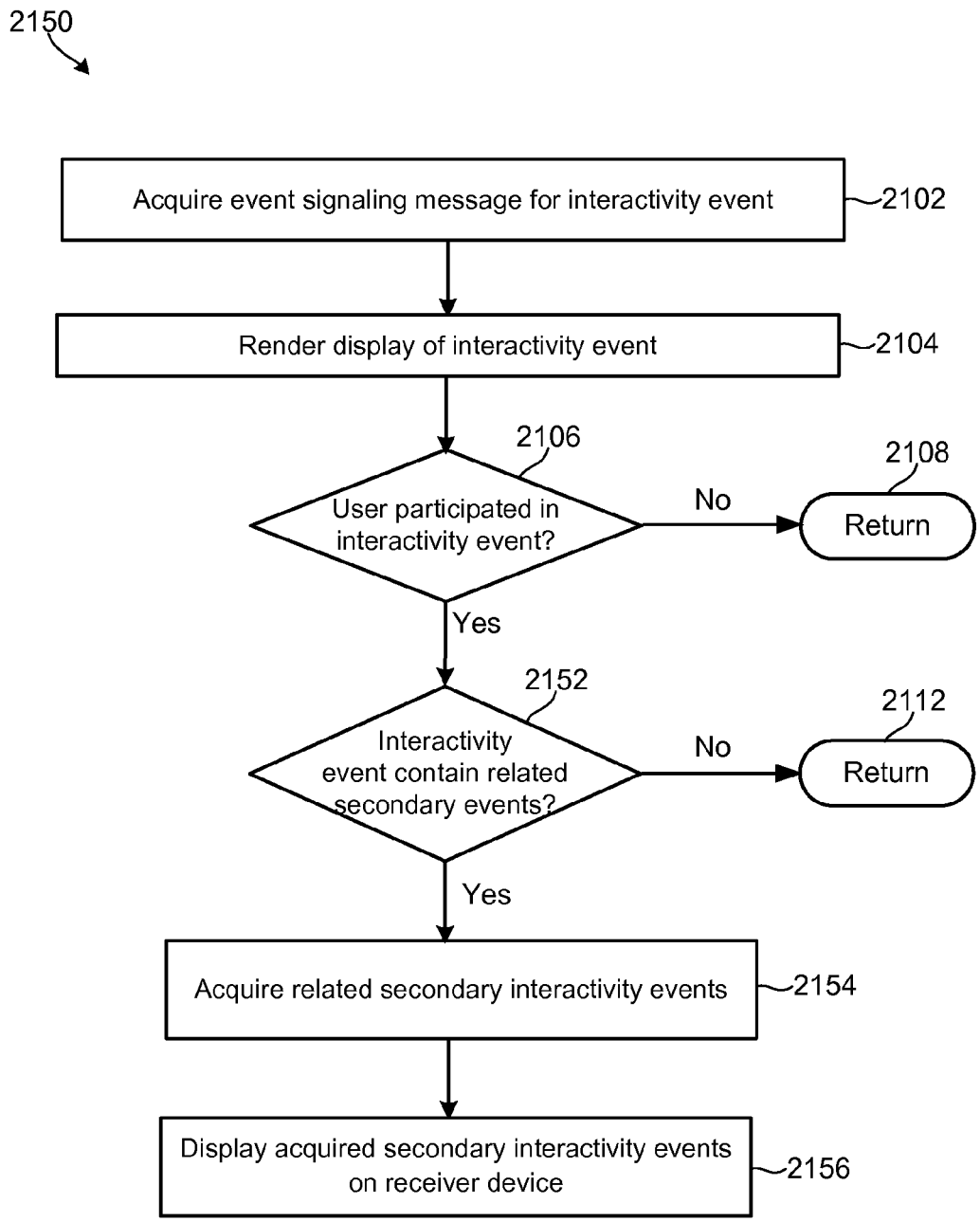

In a further embodiment illustrated in FIGS. 21A and 21B, the various interactivity event signaling mechanisms may be used to support dynamic interactivity information updates over the broadcast channel. In such embodiments, interactivity events may enable users to vote for various things, such as programming selections, favorite politicians, favorite entertainers, ad hoc viewer surveys, etc., with user inputs transmitted via the unicast network to a server that can tally results in real time, and provide the vote tallies to the broadcast network so that voting results can be updated in real time via the broadcast network. In a further embodiment, the dynamic interactivity information may be broadcast over one or more data streams. In a further embodiment, interactivity event signaling messages may include data stream identifiers over which dynamically updated interactivity data related to that event is broadcast. This will enable receiver devices to select receiving interactivity data from data streams associated with interactivity events in which their user is currently participating. For example, an interactivity event signaling message for voting may include an identifier for a data stream carrying results for that voting event. In an embodiment, receiver devices may selectively acquire interactivity data from results data streams. For example, a receiver device may choose to receive interactivity data only if the user has participated in the associated voting event. In this manner, interactivity events may be linked to data streams carrying dynamically updated interactivity information. Likewise, users who do not find an event interesting may be spared the distraction of interactivity data being displayed on their receiver devices.

In a further embodiment, multiple interactivity events may be linked with each other, creating primary and secondary event relationships. In an embodiment, this event linking may be achieved through an event identifier or other state information included in the event signaling messages. Thus, a receiver device may determine to display secondary events to users only if the user participated in the related primary events. For example, during a quiz show, there may be follow-up questions based on answers to previous quizzes. Receiver devices may be configured not to acquire and display follow up questions if the user did not participate in the first quiz. In this manner, interactivity events may be linked to other interactivity events so that the events are targeted to interested users. Users who do not find such interactive events interesting may be spared the distraction of interactivity events displays appearing on their receiver devices.

FIG. 21A illustrates an example method 2100 which may be implemented in a receiver device for receiving dynamic interactive data (e.g., voting tallies) from data streams specified in an interactivity event based upon a user's participation.

In method 2100 at step 2102, the receiver device may acquire an interactivity event signaling message for a particular event, and render the corresponding display of the event in step 2104. The acquisition and rendering of such an interactivity event may use any of the methods of the other embodiments described herein. In determination step 2106, the receiver device may determine whether a user participated in a rendered interactivity event. This determination may be based upon whether a user selection was entered in response to the event. Alternatively, this determination may be based on whether the user selected a particular one or more of alternative user inputs corresponding to participation in the event. Thus, the receiver device may distinguish user inputs which cancel or decline to participate in the event from user inputs associated with actual participation. The interactivity event data or template may specify which user inputs correspond to participation. If the receiver device determines that the user did not participate in the interactivity event (i.e., determination step 2106="No"), processing may return to normal operations in step 2108. If the receiver device determines that the user did participate in the interactivity event (i.e., determination step 2106="Yes"), the receiver device may inspect the interactivity event data to determine whether it specifies a data stream identifier in determination step 2110. If the interactivity event data did not specify a data stream identifier (i.e., determination step 2110="No"), the receiver device may return to normal operations, step 2112, since there is no additional dynamic interactivity data to be received. If the receiver device determines that the interactivity event does specify an identifier for a data stream (i.e., determination step 2110="Yes"), the receiver device may use that data stream identifier to acquire dynamic interactivity data from the specified data streams from the broadcast signal in step 2114. The receiver device may then display the required dynamic interactivity data in step 2116. In this manner, a user participating in an interactivity event may receive information related to the event, such as voting or survey results, while those who did not participate are not bothered with such additional data presentations.

FIG. 21B illustrates an example method 2150 which may be implemented in a receiver device for receiving secondary dynamic interactive events (e.g., follow up questions) based upon a user's participation. In method 2150 at step 2102, the receiver device may acquire an interactivity event signaling message for a particular event, and render the corresponding display of the event in step 2104. The acquisition and rendering of such an interactivity event may use any of the methods of the other embodiments described herein. In determination step 2106, the receiver device may determine whether a user participated in a rendered interactivity event as described above with reference to FIG. 21A. If the receiver device determines that the user did not participate in the interactivity event (i.e., determination step 2106="No"), processing may return to normal operations, as illustrated in step 2108. If the receiver device determines that the user did participate in the interactivity event (i.e., determination step 2106="Yes"), the receiver device may inspect the interactivity event data to determine whether it included or identified other interactivity events in determination step 2152. Such additional interactivity events may be included in the components within the original interactivity event. Alternatively, the original interactivity event data may specify an event ID or other information that the receiver device can use to selectively receive and implement subsequently broadcast interactivity event signaling messages. If the interactivity event data did not contain or identify other interactivity events (i.e., determination step 2152="No"), the receiver device may return to normal operations, step 2112. If the receiver device determines that the interactivity event does contain or identify other interactivity events (i.e., determination step 2152="Yes"), the receiver device may use that information to acquire the related secondary interactivity events in step 2154. Again, secondary interactivity events may be obtained from data contained within the original interactivity event or from the broadcast stream using an interactivity event identifier, event signaling message filtering criteria, or other information that enables receiver device to selectively receive related event signaling messages. The receiver device may then display the acquired secondary interactivity events on the receiver device in step 2156. In this manner, users who participate in a first interactivity event may be invited to continue to participate in secondary or related events, while those who did not choose to participate initially are not bothered with a stream of interactivity events for which they have no interest.

As mentioned above, in order to enable receiver devices to receive interactivity resources and templates before they are required to be available for an interactivity event, such resources and templates may be scheduled for broadcast on file transfer flows or data channels identified in an electronic service guide or electronic catalog that receiver devices can monitor. In various embodiments, an interactivity catalog signaling file may be used to advertise lists of available interactivity resources and templates, and provide the information that receiver devices need to determine which interactivity resources and templates to acquire, as well as how and when to acquire such files. In another embodiment, the schedule for interactivity files can be carried over a file delivery overhead flow. In various embodiments, the interactivity server may generate the interactivity catalog signaling file. In various embodiments, the interactivity catalog signaling file may list the interactivity resources that will be, or are being, delivered over the broadcast file system.

In various embodiments, the interactivity catalog signaling file may be generated to include interactivity resources for all current and future interactive sequences. In various embodiments, the interactivity catalog signaling file may be generated to include interactivity resources for interactive sequences which fall within a catalog time window. For example, an interactivity catalog signaling file may be generated to include interactivity resources that will be required for all interactive event sequences that occur in the next 24 hours. In various embodiments, the interactivity catalog signaling file may be periodically re-generated at catalog time window boundaries, and if new interactivity sequences are generated, the associated resources and templates may be added to the current catalog time window. In various embodiments, the interactivity catalog file may include references to interactivity resources and templates (e.g., filename or template ID) in the broadcast file system. The interactivity catalog file may also include filtering or targeting criteria associated with interactivity files that receiver devices can use to determine whether the resources and/or template should be downloaded. Such filtering or targeting criteria may include, for example, target BCS, target real-time services, target device type, target area, etc.

Receiver devices may acquire the interactivity catalog file from a well-known location in the broadcast file system (e.g., /itv/cat.xml). In various embodiments, the receiver devices may monitor a well known directory and receive any catalog file under that directory. From the interactivity catalog file, a receiver device may determine a list of interactivity resources and templates which meet targeting criteria for that receiver device, and then acquire all such relevant resources and templates from the broadcast file delivery system. In various embodiments, the interactivity catalog file may be updated to remove interactivity resources and templates which are no longer needed by receiver devices. For example, the interactivity catalog file may be updated to remove interactivity resources because the associated interactive sequences have expired and the resource or template is not expected to be reused in the foreseeable future. In various embodiments, receiver devices may use the interactivity catalog file to identify those interactivity resources and templates which can be deleted from memory, such as those which are not listed in the interactivity catalog file.

In various embodiments, the interactivity catalog file is not updated immediately after an interactivity sequence expires. This saves receiver device battery power since receiver devices do not need to re-acquire the interactivity catalog file every time an interactive sequence expires and an interactivity resource is no longer needed. In an embodiment, interactivity resources for expired interactivity sequences may be removed when the interactivity catalog file is generated due to other triggers. For example, interactivity resources for expired interactivity sequences may be removed when the interactivity catalog file is generated at the catalog window boundary and when new interactivity resources for new/existing interactivity sequences are added.

In various embodiments, the interactivity catalog file may be generated based on a catalog file delivery period. In various embodiments, the interactivity catalog file may include interactivity resources for interactivity sequences which fall under a current and next catalog file delivery period. In these embodiments, this may be used to account for interactivity sequences which happen at the boundary of current and next catalog file delivery periods.

In various embodiments, receiver devices may be configured to delete interactivity resources and templates when the files are no longer included in the interactivity catalog file. In various embodiments, each resource or template in the interactivity catalog file may also have an expiry time specified (i.e., a date and time at which the resource or template may be deleted from memory). In an embodiment, the resource/template expiry time can be set based on the expiry time for the associated interactivity sequence if no future use of the resource or template is contemplated. Receiver devices may then delete an interactivity resource or template based on resource expiry if specified or included as part of the resource or template metadata.

Figure 22:
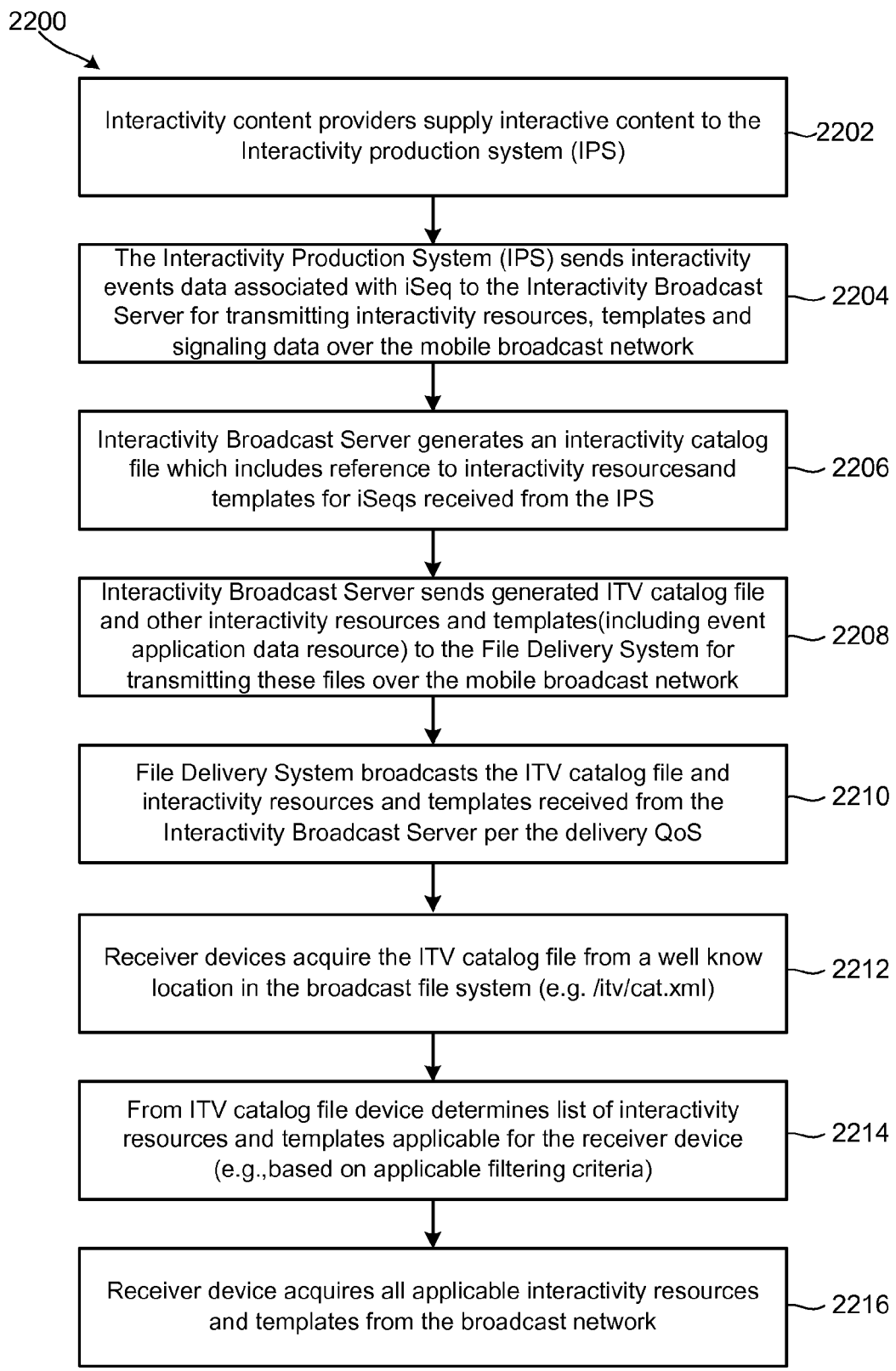
FIG. 22 is a process flow diagram of an embodiment method for generating catalog listings of interactivity events for inclusion within an electronic service guide catalog.

FIG. 22 illustrates an example method 2200 which may be used in broadcast headend facilities to generate and broadcast interactivity catalog files according to an embodiment. In method 2200 in step 2202, interactivity content providers may supply interactive content (i.e., event application data, resources and templates) to the interactivity production system. In step 2204, the interactivity production system may send interactivity events data associated with interactivity sequences to the interactivity server for transmitting interactivity application data, resources, templates and signaling data over the broadcast network. In step 2206, the interactivity server may generate an interactivity catalog file which may include reference to interactivity application data, resources and templates for interactivity sequences for current and future interactivity events. As part of the step, the interactivity server may set expiration times for interactivity resources and templates based on the expiration of associated interactivity sequences if such resources and templates are not designated for reuse. In step 2208, the interactivity server may send the generated interactivity catalog file and other interactivity resources and templates, including event application data resources, to the file delivery system for transmission of these files over the mobile broadcast network. In an embodiment, the interactivity catalog file may be updated frequently to enable broadcast of interactivity resources and application data just prior to the event start time in order to better utilize broadcast bandwidth. The interactivity server may schedule delivery of the interactivity catalog file for a time before delivery of the interactivity resources included in the catalog file. This ensures that the interactivity catalog file can be acquired and processed by receiver devices in time to enable them to receive any broadcast resources or templates.

In step 2210, the file delivery system may deliver the interactivity catalog file and interactivity resources and templates received from the interactivity server to the broadcaster for broadcasting over the mobile broadcast network in accordance with the delivery quality of service (QoS) specified by the interactivity server. In step 2212, receiver devices acquire the interactivity catalog file from a well known location in the broadcast file system (e.g., /itv/cat.xml). In step 2214, the receiver device may use the received interactivity catalog file to determine a list of interactivity resources and templates applicable to the receiver device, such as based on applicable filtering criteria. As part of step 2214, the receiver device may determine whether the listed resources and templates are newer versions of resources and templates currently stored in device memory. In step 2216, the receiver device may acquire all applicable interactivity resources and templates from the file delivery system within the broadcast network. As part of the step 2216, the receiver device may select only updated versions of resources and templates already stored in memory, in order to conserve battery power by eliminating the need to download files that have already been received and stored in memory.

Figure 23A:
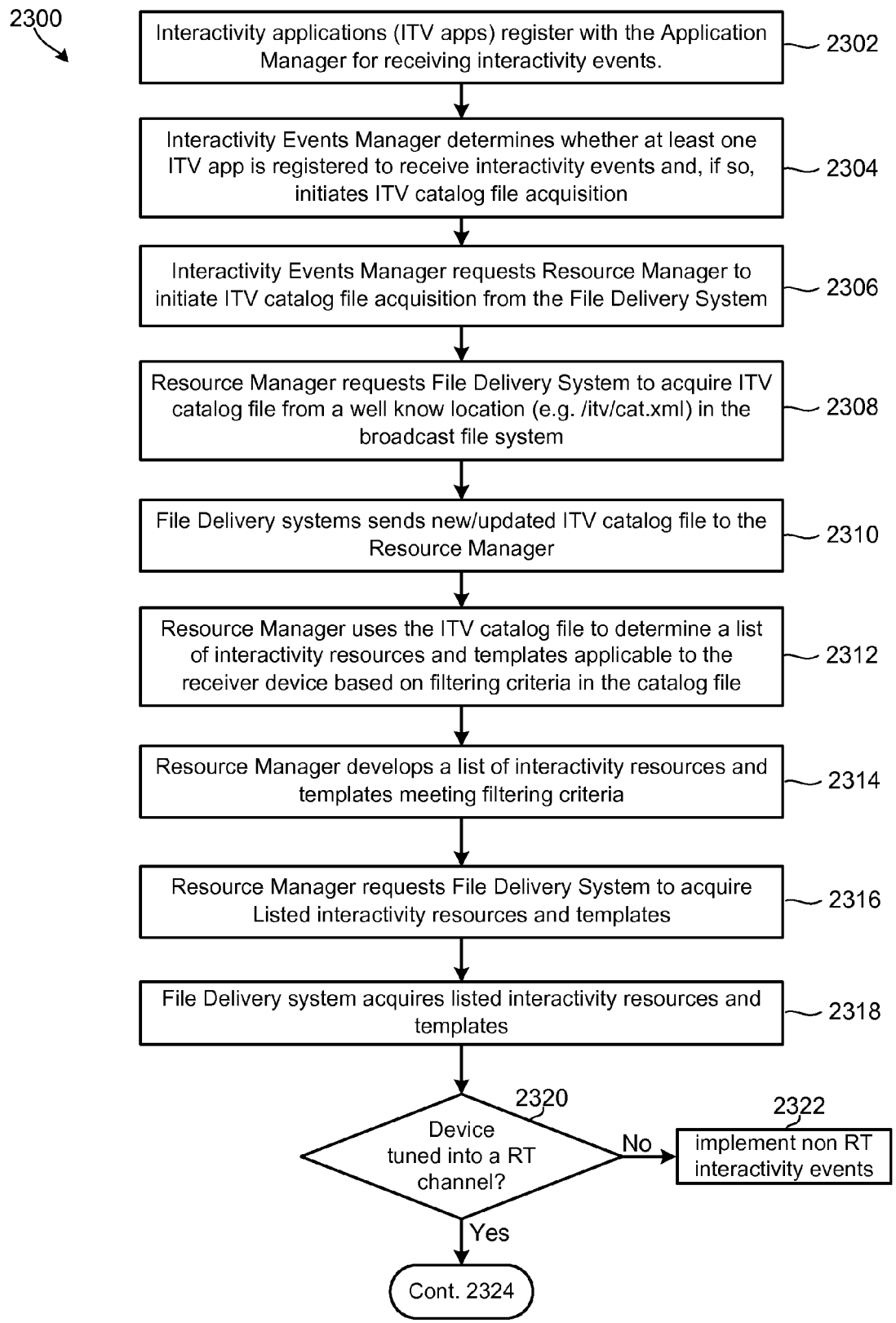
FIGS. 23A and 23B are process flow diagrams of an embodiment method for receiving and executing an interactivity event based upon catalog listings in an electronic service guide catalog.
Figure 23B:
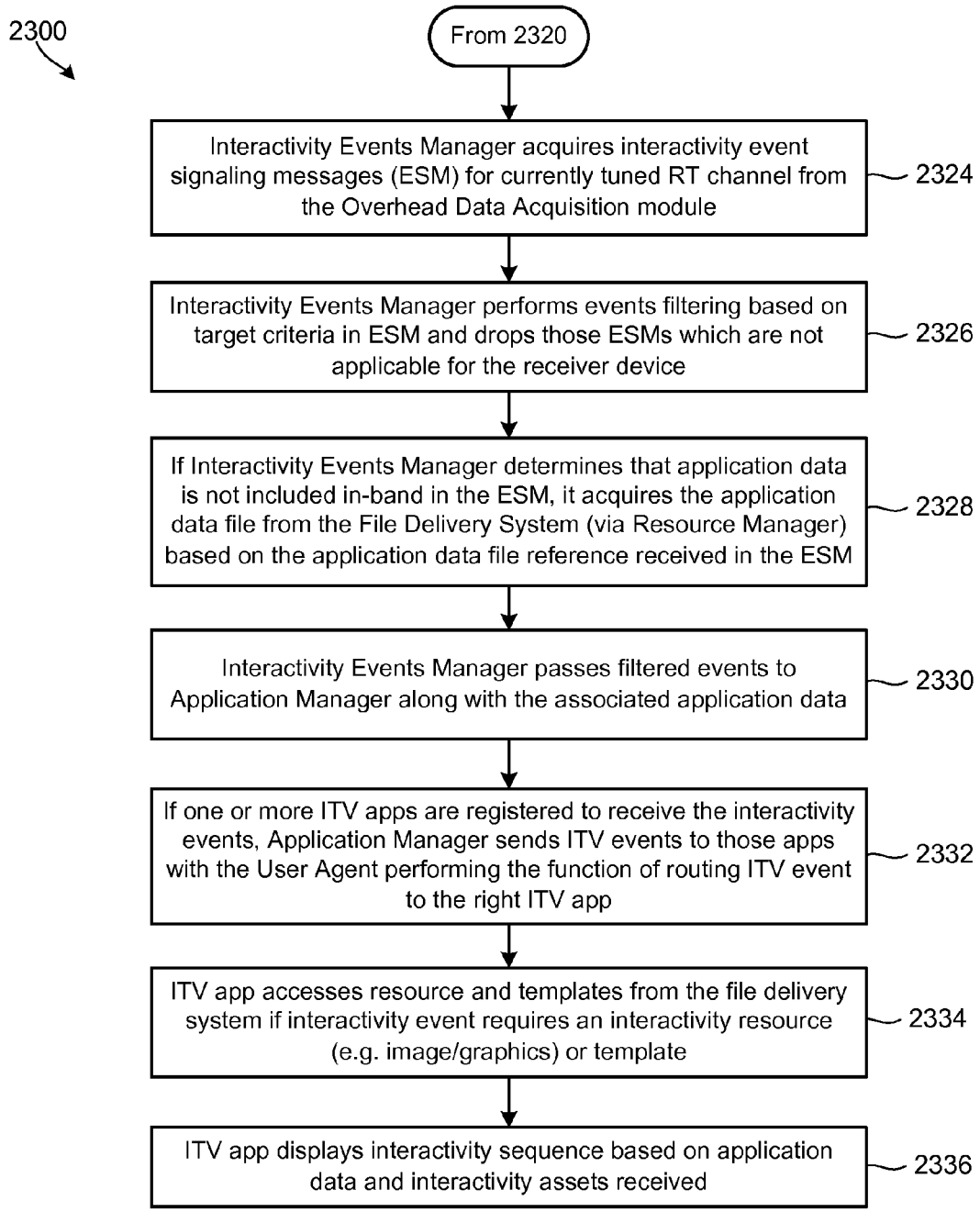

FIGS. 23A and 23B illustrate an example method 2300 which may be implemented in receiver devices for receiving and processing interactivity catalog files to receive interactivity resources and templates. In method 2300 in step 2302, interactivity applications may register with the application manager to receive interactivity events. As discussed above, in various embodiments, interactivity applications may register with the application manager in order to receive one or more types of interactivity events. In step 2304, the interactivity events manager may determine whether at least one interactivity application is registered to receive interactivity events and, if so, initiate the acquisition for the interactivity catalog file. In step 2306, the interactivity events manager may request the resource manager to initiate the interactivity catalog file acquisition from the file delivery system. In step 2308, the resource manager may request the file delivery system to acquire the interactivity catalog from a well known location (e.g., /itv/cat.xml) in the broadcast file system. In step 2310, the file delivery system may receive the interactivity catalog file and send the new or updated interactivity catalog file to the resource manager. In step 2312, the resource manager may use the interactivity catalog file to determine a list of interactivity resources and templates applicable for use by the receiver device based on filtering criteria specified in the catalog file. In step 2314, the resource manager may develop a list of relevant interactivity resources and templates meeting filtering criteria, such as applicability to the receiver device and to registered interactivity applications. In step 2316, the resource manager may request the file delivery system to acquire the interactivity resources and templates included in its list of applicable resources and templates. In step 2318, the file delivery system may acquire the listed interactivity resources and templates from the broadcast network.

In determination step 2320, the interactivity events manager may determine whether the receiver device is currently tuned to a particular real-time channel. If the receiver device is not tuned to a real-time channel (i.e., determination step 2320="No"), the receiver device may implement non-real-time interactivity events or unbound interactivity events if any are scheduled for execution in step 2322. If the receiver device is tuned to a real-time channel (i.e., determination step 2320="Yes"), the interactivity events manager may acquire the interactivity event signaling message for the currently tuned in real-time channel from the overhead data acquisition module in step 2324, in accordance with the method illustrated in FIG. 13. In step 2326, the interactivity events manager may perform event filtering based upon target criteria in a received interactivity event signaling message, and drop the signaling messages not applicable to the receiver device. In step 2328, if the interactivity events manager determines that application data is not included in band in the interactivity event signaling message, the manager may acquire the application data file out of band from the file delivery system (via the resource manager) or acquire it from memory (if already downloaded) based upon the application data file reference information received in the interactivity event signaling message. In step 2330, the interactivity events manager may pass the filtered events to the application manager, along with the associated application data and file location for resources and templates. In step 2332, if one or more interactivity applications are registered to receive the interactivity event, the application manager may send the interactivity event to the appropriate application, with the user agent performing the function of routing the interactivity event to the correct application. In step 2334, the interactivity application accesses required resources and templates from the file system if the interactivity event requires an interactivity resource (e.g., an image or graphic) or template. In step 2336, the interactivity application displays the interactivity sequence based on the application data and any interactivity resources and templates received.

Figure 24A:
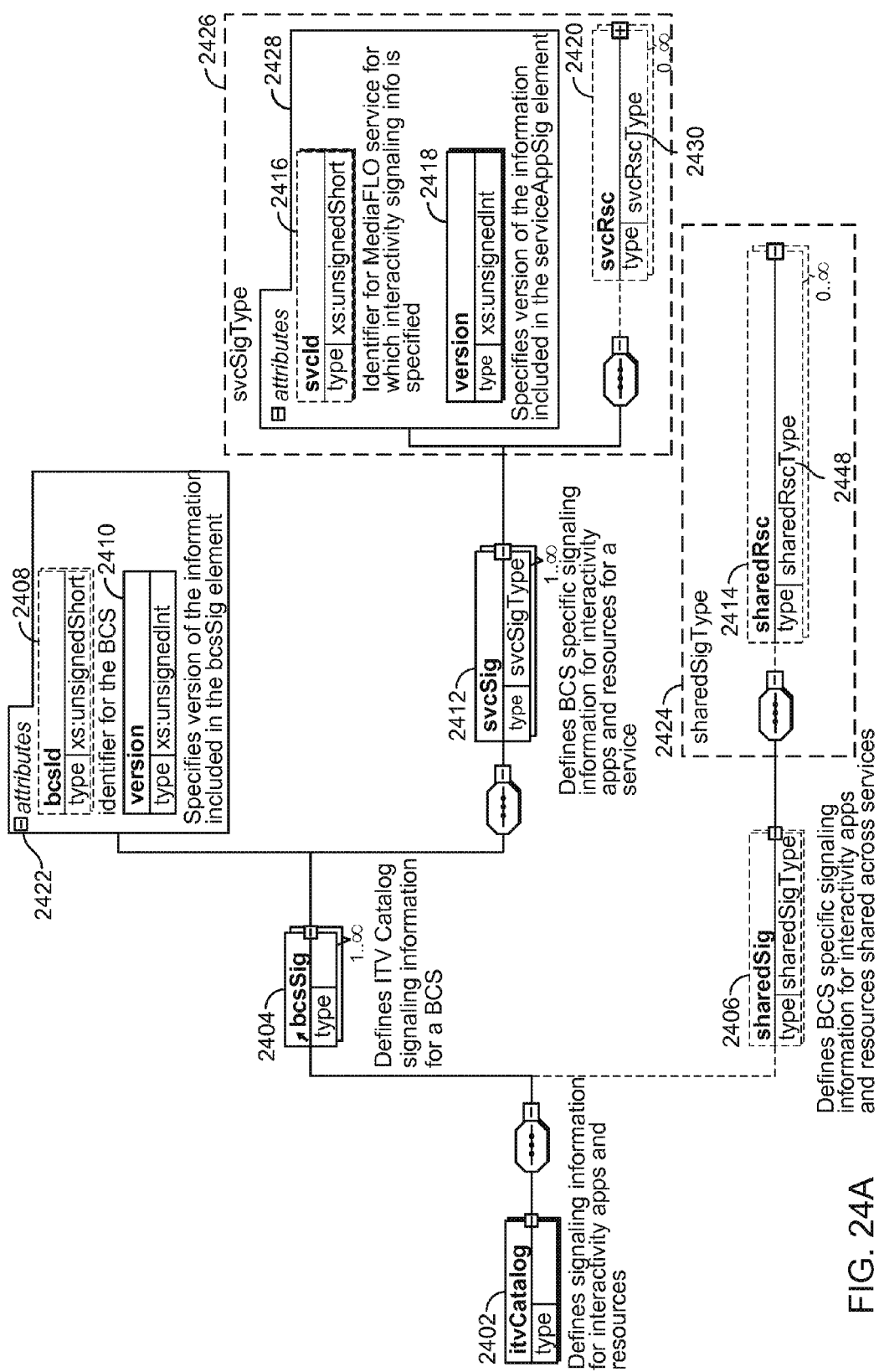
FIGS. 24A-24D illustrate example interactivity event catalog data schema suitable for use with an embodiment.

Example message schema suitable for use with the interactivity catalog file are illustrated in FIGS. 24A-24D. Specifically, FIGS. 24A-24D illustrate example data fields that may be included in the interactivity catalog file and lists descriptions of the purpose and nature of the various data elements. Referring to FIG. 24A, an interactivity catalog 2402 may include a billing and customer service providers (BCS) signal element 2404 and a shared signal element 2406. The BCS signal element 2404 may define the interactivity catalog signaling information for a BCS. The shared signal element 2406 may define catalog signaling information for interactivity applications and resources shared across services and BCSs. The shared signal element 2406 may also have a shared signal element type 2424 field having a shared RSC 2414 field, which may be of a shared RSC type 2448. The BCS signal element 2404 may have an attributes field 2422 having a BCS identification element 2408, which is an identifier for the BCS, and a version 2410 element, which specifies the version of the information included in the BCS signal element 2404. The BCS signal element 2404 may also have an SVC signal 2412 element that defines BCS specific signaling information for interactivity application and resources for a service. The SVC signal 2412 element may have an SVC signal type 2426 element having an attributes field 2428 and an SVC RSC 2420 field. The attributes field 2428 of the SVC signal type 2426 element may include an SVC identifier 2416 element, which may be an identifier for a MediaFLO® service for which interactivity signaling information is specified, and a version 2418 element, which specifies the version of the information included in the service signal element. In various embodiments, the SVC RSC 2420 element may be an SVC RSC type element 2430.

Figure 24B:
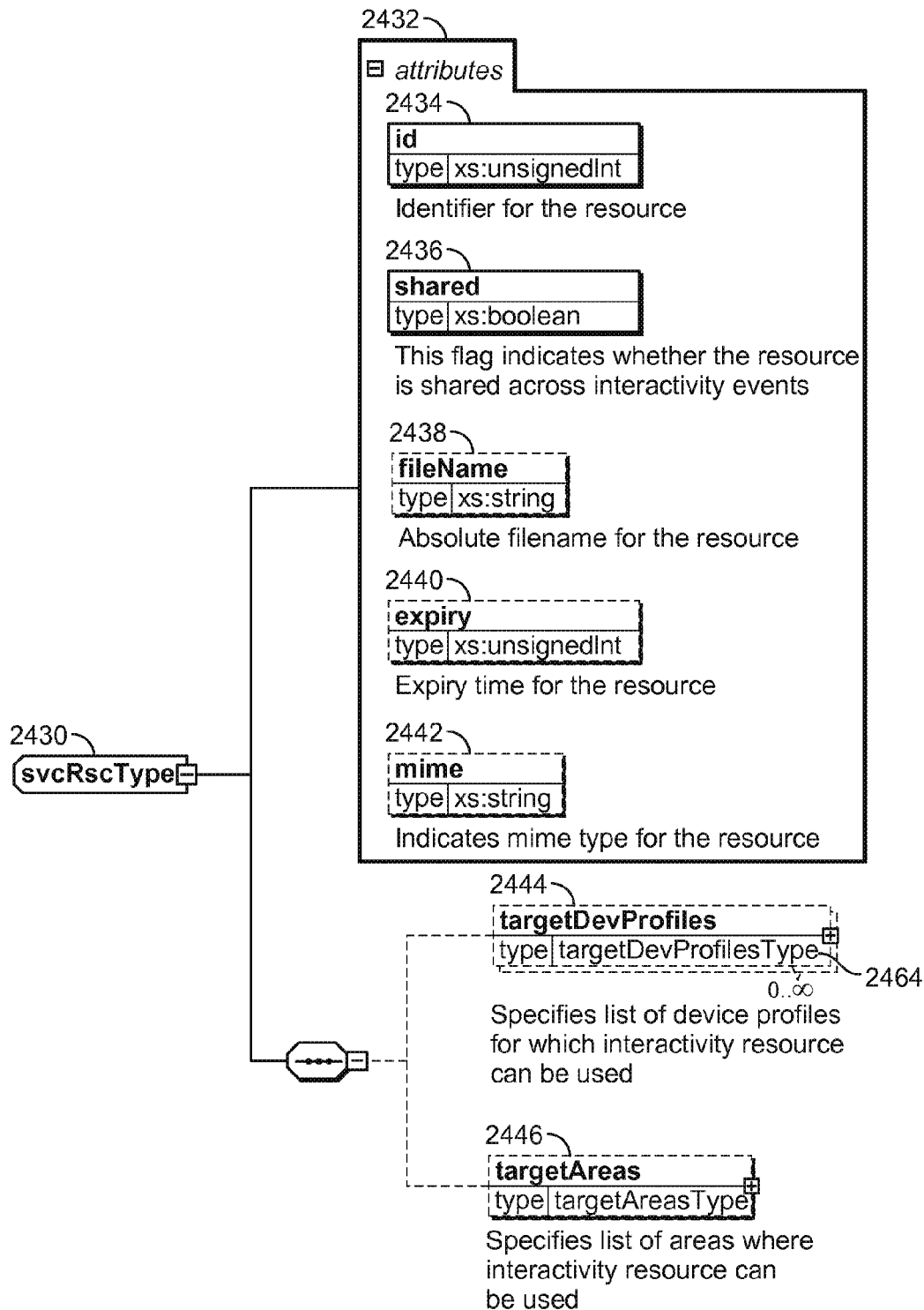

Referring to FIG. 24B, the SVC RSC type element 2430 may have an attributes element 2432, a target devices profiles element 2444, which specifies a list of device profiles for which interactivity resources can be used, and a target areas element 2446, which specifies a list of areas where interactivity resources can be used. The attributes element 2432 of the SVC RSC type 2430 element may include an identifier 2434 which provides a resource identifier, a shared element 2436, a filename 2438, an expiry element 2440, and a mime element 2442. The shared element 2436 may be a Boolean flag that indicates whether the resource is shared across interactivity events. For shared resources, the resource information is specified as part of the shared RSC element to optimize size of the interactivity catalog size. The filename element 2438 may be an absolute filename for the resources. The expiry element 2440 may be an expiry time for the resources. The mime element 2442 may indicated a mime type (e.g. jpeg, png) for the resource. In various embodiments, the target devices profiles element 2444 may indicate one or more target devices profiles types 2464, as discussed below with reference to FIG. 24D.

Figure 24C:
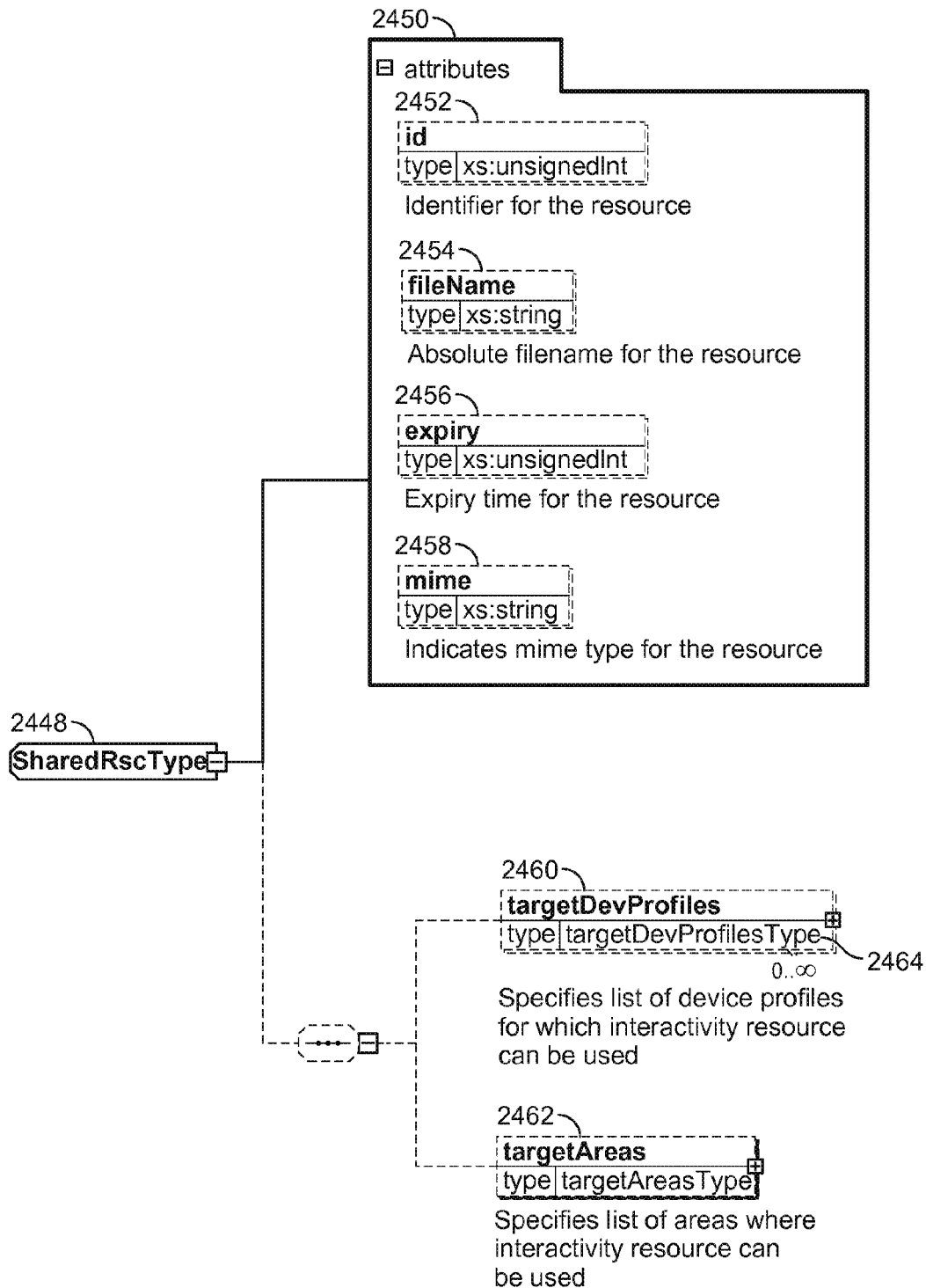

As discussed above, the shared signal type 2424 may have a shared RSC 2414 element. Specifically, FIG. 24A illustrates that the shared RSC 2414 element may be of a shared RSC type 2448. FIG. 24C illustrates that the shared RSC type 2448 may have an attributes element 2450, a target devices profiles element 2460, which specifies a list of device profiles for which interactivity resources can be used, and a target areas element 2462, which specifies a list of areas where interactivity resources can be used. The attributes element 2450 of the shared RSC type 2448 may include a resource identifier 2452, a filename 2454, an expiry element 2456, and a mime element 2458. The filename element 2454 may be an absolute filename for the resources. The expiry element 2456 may be an expiry time for the resources. The mime element 2458 may indicated a mime type for the resource. In various embodiments, the target devices profiles element 2460 may indicate one or more target devices profiles types 2464, as discussed below with reference to FIG. 24D.

Figure 24D:
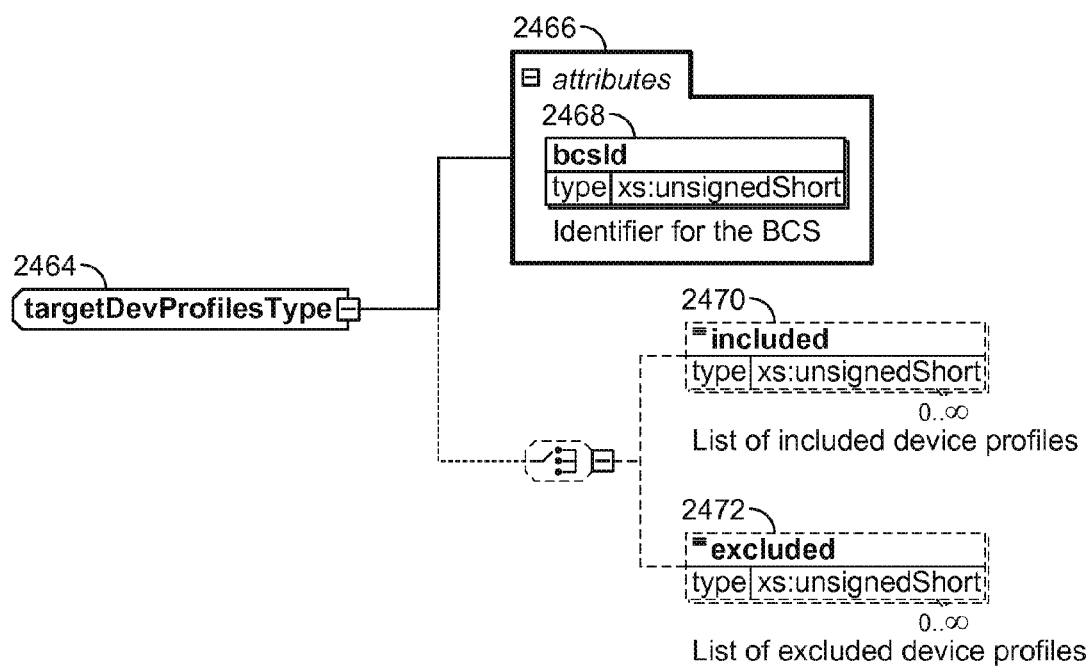

As discussed above, the SVC RSC type element 2430 and the shared RSC 2414 element may each have a target devices profiles element 2444, 2460 that specifies a list of device profiles for which the interactivity resource can be used. In various embodiments, the target devices profiles element 2444, 2460 may include a target devices profile type 2464 element. FIG. 24D illustrates that the target devices profile type 2464 element may include an attributes element 2466 that has a BCS identifier 2468 element. The target devices profile type 2464 element may also include an included 2470 element that lists all of the included device profiles and an excluded 2472 element that lists all of the excluded device profiles. In some embodiments, the target devices profile type 2464 may include either the included 2470 element or the excluded element 2472. In other embodiments, the target devices profile type 2464 may include both the included 2470 element and the excluded element 2472.

In some implementations there could be a large number of interactivity sequences created and broadcast simultaneously for multiple real time linear channels. However, at any given time users may only be able to view interactive sequences on the channels to which they are tuned at the time that any given interactivity event is displayed. If multiple interactive sequences are broadcast, with event start times set so the events will be played on top of linear advertising slots, interactive events for several different real time channels will mostly coincide. This is because advertising breaks tend to occur either at the same time or close to each other on different channels. Thus, if interactivity event application data and resources are broadcasted just prior to the start of interactivity events, such as in one or more file delivery system flows, receiver devices may be required to acquire a large amount of interactivity event data, even though the user will only watch one of the interactivity events, i.e., the event on the channel being watched. This may result in an unnecessary drain on battery power while taxing the processing power of the receiver device.

In order to address this and other potential issues, in an embodiment, receiver devices may be configured to only acquire interactivity event assets related to interactive sequences that will be displayed to users on the real-time channel being monitored by a mobile device. This embodiment reduces demands on device processing and device battery power.

As discussed above, the various embodiments provide a mechanism that enables mobile multimedia broadcasters to signal the broadcast file data delivery flows and signaling flows which carry interactivity signaling and interactivity resources information over the mobile broadcast network. In various embodiments, the interactivity resources may be delivered as data files over a broadcast file delivery system, and interactivity resource files may be broadcast on one or more file data flows. In various embodiments, the interactivity signaling information may be delivered over one or more signaling overhead flows. In various embodiments, the service system information overhead information for each real-time service for which an interactivity event is enabled may be augmented to specify links to file data flows which carry interactivity resources associated with the real-time services and to specify links to signaling flows which carry interactivity signaling messages associated with real-time services.

In various embodiments, interactivity resources for interactivity sequences associated with all real-time channels can share one file data flow (i.e., a global file data flow). These embodiments are particularly relevant in situations where there are only a few interactivity sequences which coincide or overlap in time across all real-time channels. In such situations, interactivity resource data files may be broadcast repeatedly, so when all resources are transmitted on the shared file data flow, they may be repeatedly broadcast in sequence. This may result in optimizing the broadcast bandwidth required to transmit interactivity resources across all real time channels.

In various embodiments, interactivity resources may be delivered on multiple file data flows. In various embodiments, interactivity resources may be delivered on a separate file data flow for each real-time channel (i.e., per real-time service file data flow). This is particularly relevant in situations where there are many interactivity sequences which coincide or overlap in time across real-time channels resulting in a large number of interactivity resources being broadcast. Delivering interactivity resources on multiple file data flows reduces the amount of time the receiver devices may need to wait before receiving the resource for particular real-time service, since the number of broadcasted resource data files on a given file data flow may be smaller. Broadcasting interactivity resources on dedicated file data flows can further reduce the amount of time the receiver devices may have to wait to receive a particular resource since the flow only carries resources for the corresponding real-time service. In various embodiments, interactivity resources from a subset of real-time channels can be combined and broadcast on one file data flow.

Similar to the broadcast of interactivity resources, in various embodiments, interactivity event signaling messages (IESMs) for all real-time channels may be broadcast on one auxiliary signaling flow (i.e., a global auxiliary flow). These embodiments are particularly useful in situations where there are not too many interactivity event signaling messages that overlap in time across all real-time channels. Also similar to the resource transmissions, the interactivity event signaling messages may be broadcast repeatedly, such as in a repeating sequence of multiple signaling messages. Interactivity event signaling messages may also be delivered on multiple auxiliary overhead flows, to reduce the number of interactivity event signaling messages which are broadcast in sequence, thereby reducing the amount of time a receiver device must wait to receive a particular interactivity event signaling message. Thus, in an embodiment, interactivity event signaling messages for a subset of real-time channels may be combined and broadcast on one or more auxiliary overhead flows. In an embodiment, interactivity event signaling messages may be delivered on separate auxiliary overhead flows corresponding to each real-time channel (i.e., per real-time service auxiliary flow). This is particularly useful in situations where there are many interactivity sequences which overlap in time across real-time channels.

For unbound interactive sequences (i.e., interactivity events that are not tied to a particular real-time service), a file data flow and signaling flow may be identified in a reserved service ID within the Service SI (System Information) to signal file data flows and auxiliary overhead flows.

Broadcasting the file data flow ID and signaling flow for interactivity event resources and signaling messages in the Service SI enables receiver devices to discover the file data flow and auxiliary overhead flow carrying interactivity resources and interactivity signaling messages respectively for particular services. Receiver devices can then use the identified flows to acquire applicable interactivity resources and interactivity signaling messages. The Service SI can also specify unicast links (e.g., a URL) from which receiver device may acquire interactivity resources and/or signaling information.

In various embodiments, a single file data flow may be used to deliver interactivity resources for interactivity sequences associated with all real-time channels, thereby improving the overall bandwidth utilization. However, if there are interactivity resources for many interactivity sequences that overlap in time across many or all real-time channels, the acquisition of these resources may take longer on the device, impacting the device's battery life. In various embodiments interactivity event providers or broadcasters may decide to share file data flows across few real-time services, or to use separate file data flows for delivering interactivity resources for each real-time service. In various embodiments, these decisions may be based on the number of overlapping interactivity sequences. In various embodiments, these decisions may be made dynamically. In an embodiment, these decisions may be made dynamically, throughout a broadcast day, depending upon the number of interactivity events scheduled at any given time. In this embodiment, the Service SI may be updated as necessary to reflect changes in the provisioning of interactivity resources across one or multiple file data flows.

In various embodiments, one auxiliary overhead flow may be used to deliver interactivity event signaling messages for all real-time channels, optimizing the overall over the air bandwidth needed to deliver these messages. However, if there are interactivity event signaling messages for many interactivity sequences which overlap in time across many real-time channels, this approach may increase receiver device acquisition time for any one signaling message. Therefore, in various embodiments, interactivity providers or broadcasters may decide to share or use separate auxiliary overhead flows for delivering interactivity signaling messages for each real-time service, based on the number of overlapping interactivity sequences. In various embodiments, these decisions may be made dynamically. In an embodiment, these decisions may be made dynamically, throughout a broadcast day, depending upon the number of interactivity events scheduled at any given time, with the Service SI updated as necessary to reflect changes in the provisioning of interactivity resources across one or multiple file data flows.

Figure 25A:
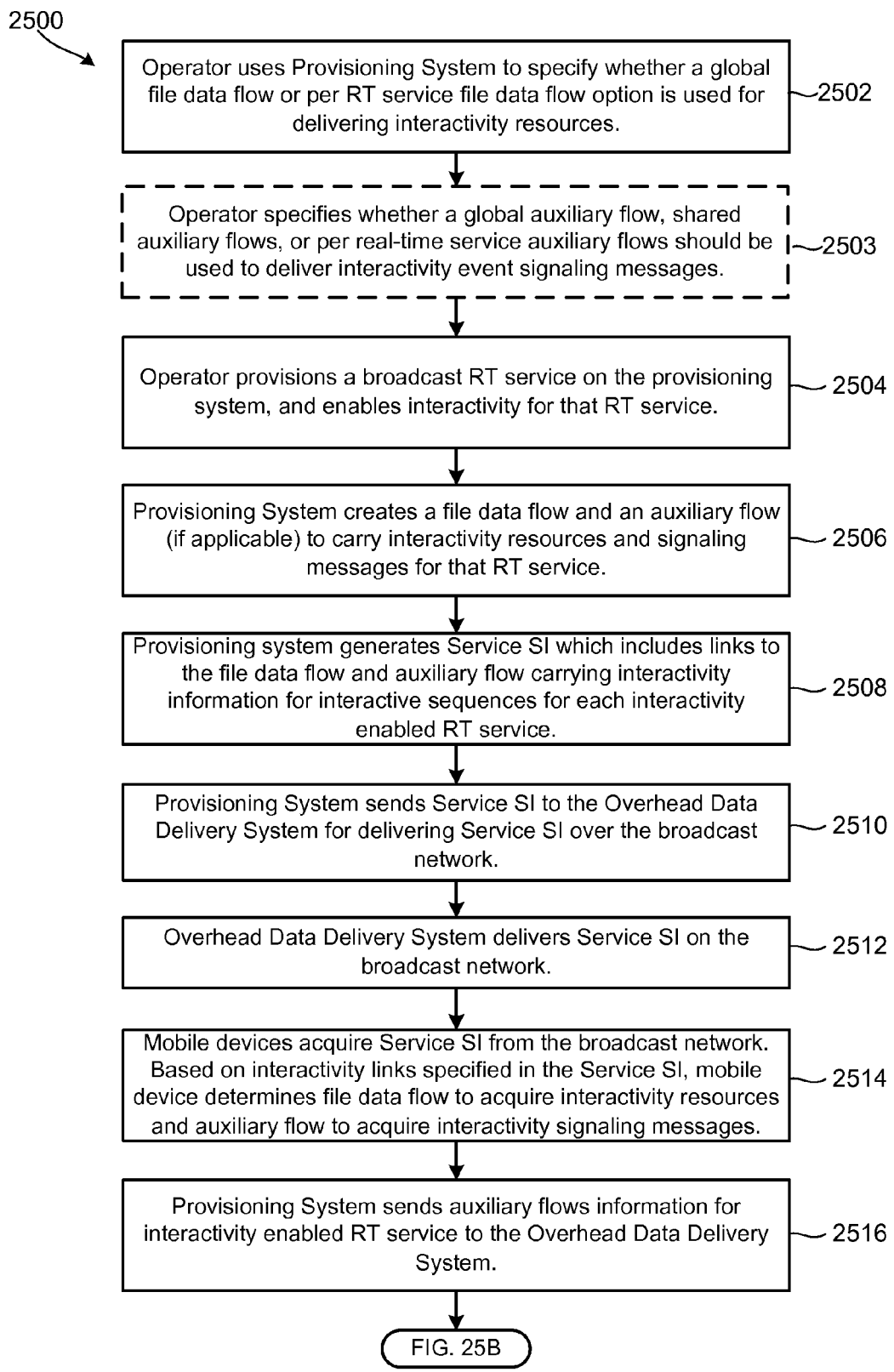
FIGS. 25A and 25B are process flow diagrams of an embodiment method for provisioning resource data file flows and generating Service SI information to enable receiver devices to acquire interactivity event resources.
Figure 25B:
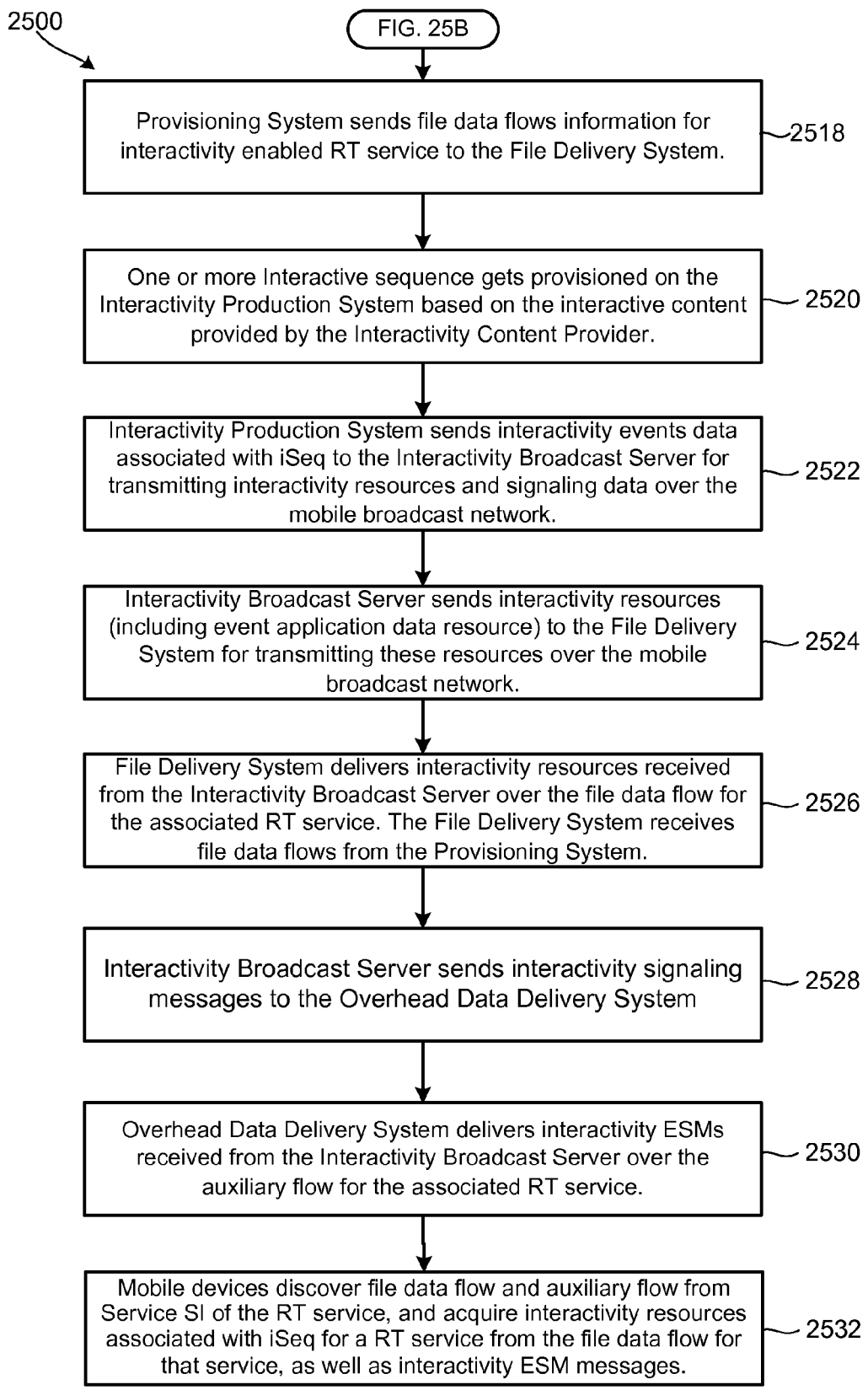

FIGS. 25A and 25B illustrate an example method 2500 suitable for provisioning resource file data flows and signaling/auxiliary flows used in generating the Service SI information transmitted in overhead data flows according to an embodiment. In method 2500 at step 2502, an operator may use a provisioning system to specify whether a global file data flow, shared file data flows, or per real-time service file data flows should be used for delivering interactivity resources. In various embodiments, the operator may specify whether a global auxiliary flow, shared auxiliary flows, or per real-time service auxiliary flows should be used to deliver interactivity event signaling messages in step 2503. In step 2504, an operator may use the provisioning system to provision a broadcast real-time service on the provisioning system and enable interactivity for a particular real-time service. In step 2506, the provisioning system may create a file data flow and an auxiliary flow (if applicable) to carry interactivity resources and signaling messages for that real-time service. If the global file data flow and global auxiliary flow option is used, the file data flow and auxiliary flow may be created when interactivity is enabled for the first real-time service. In step 2508, the provisioning system may generate the Service SI. The Service SI may include links to flow IDs for the file data flows and auxiliary flows carrying interactivity information for interactive sequences for each interactivity enabled real-time service. In various embodiments, the Service SI may also carry links to unbound flows using a reserved service ID.

In step 2510, the provisioning system may send the Service SI to the overhead data delivery system for delivering the Service SI over the broadcast network. In step 2512, the overhead data delivery system may deliver the Service SI on the broadcast network. In step 2514, receiver devices may acquire the Service SI from the broadcast network, and based on the interactivity links specified in the Service SI, determine the file data flow to acquire interactivity resources and the auxiliary flow to acquire interactivity signaling messages for monitored channels.

In step 2516, the provisioning system may send auxiliary flow information for interactivity enabled real-time services to the overhead data delivery system. Turning to FIG. 25B, in step 2518, the provisioning system may send file data flows information for interactivity-enabled real-time service to the file delivery system. In step 2520, one or more interactive sequences may be provisioned on the interactivity production system based on the interactive content provided by the interactivity content provider. In various embodiments, the interactivity sequence information may include: interactivity event metadata, such as event start time and validity duration (or stop time), event targeting criteria, associated interactivity assets (e.g., images/graphics, URLs etc.); and interactivity event application data, such as a set of information displayed to users, associated actions, etc.

In step 2522, the interactivity production system may send interactivity events data associated with an interactivity sequence to the interactivity broadcast server for transmission of interactivity resources and signaling data over the mobile broadcast network. In step 2524, the interactivity broadcast server may send the interactivity resources (including event application data resource) to the file delivery system for transmission of these resources over the mobile broadcast network. In step 2526, the file delivery system may deliver interactivity resources received from the interactivity broadcast server over the corresponding file data flow for the associated real-time service. In this process, the file delivery system may receive file data flows from the provisioning system, as described above with reference to step 2518. In step 2528, the interactivity broadcast server may send interactivity signaling messages to the overhead data delivery system for transmission of the interactivity event signaling messages over the mobile broadcast network. In step 2530, the overhead data delivery system may deliver interactivity event signaling messages received from the interactivity broadcast server over the auxiliary flow for the associated real-time service. In this step 2530, the overhead data delivery system may receive auxiliary flows from the provisioning system, as described above with reference to step 2516. In step 2532, receiver devices may acquire interactivity resources associated with an interactivity sequence for a real-time service from the file data flow for that real-time service. In various embodiments, receiver devices may also acquire interactivity event signaling messages associated a real-time service from the auxiliary flow for that real-time service.

Figure 26A:
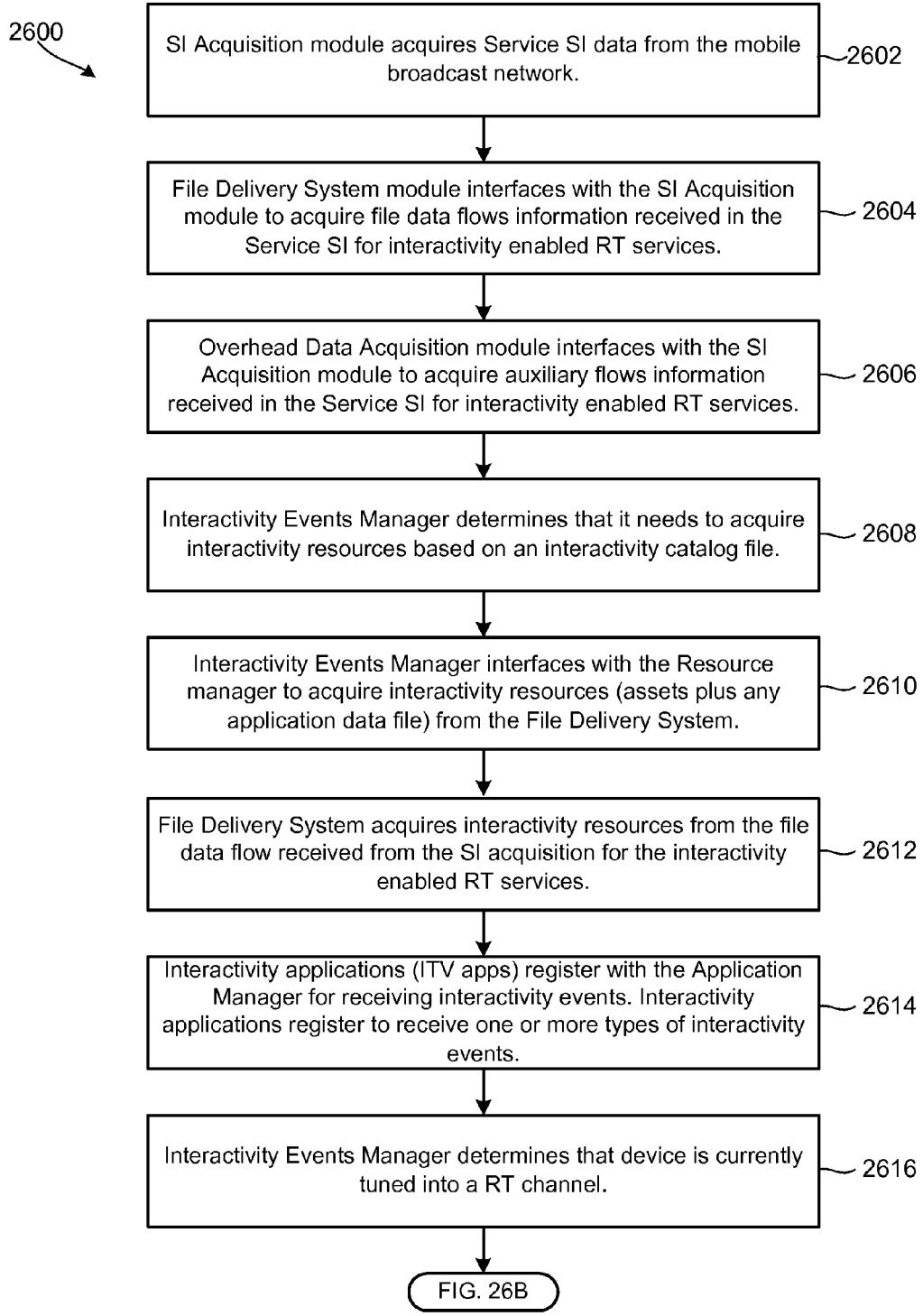
FIGS. 26A and 26B are process flow diagrams of an embodiment method for receiving interactivity event resources from resource data file flows based on information in the Service SI broadcast.
Figure 26B:
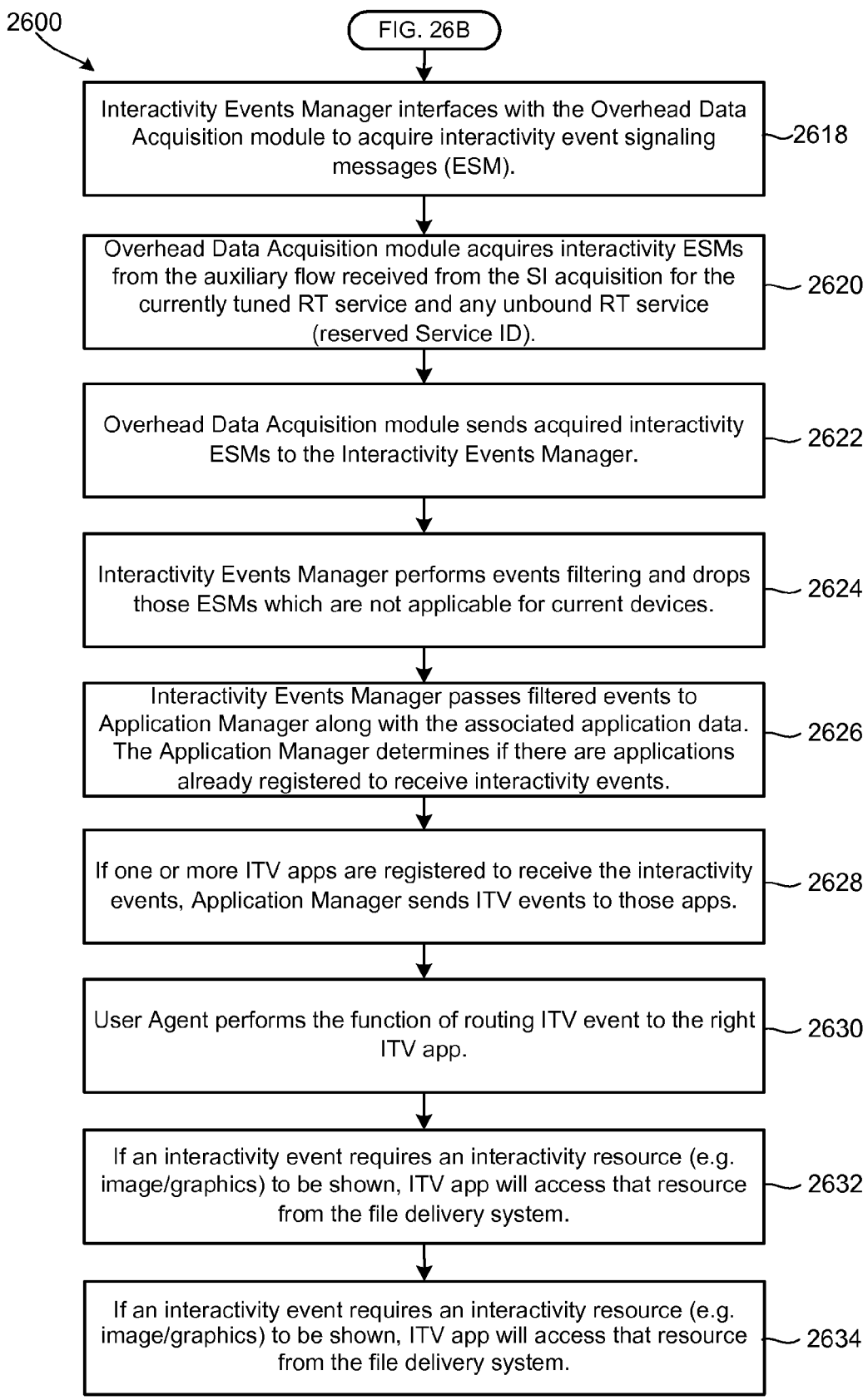

As discussed above, receiver devices may discover the file data flow and auxiliary flow from the Service SI of the real-time service. FIGS. 26A and 26B illustrate an example method 2600 which may be implemented on receiver devices to determine file data flows and overhead data flows for receiving interactivity event resources and signaling messages for a particular real-time service from the Service SI information received in overhead data flows according to an embodiment. In method 2600 at step 2602, an SI acquisition module within the receiver device may acquire the Service SI data from the mobile broadcast network. In step 2604, the file delivery system module may interface with the SI acquisition module to acquire the file data flows (including file data flow carrying catalog file) information received in the Service SI for interactivity enabled real-time services. In step 2606, the overhead data acquisition module may interface with the SI acquisition module to acquire auxiliary flows information received in the Service SI for interactivity enabled real-time services. In step 2608, the interactivity events manager may determine that it needs to acquire interactivity resources based on a received interactivity catalog file. In step 2610, the interactivity events manager may interface with the resource manager to acquire interactivity resources, assets and any application data file from the file delivery system. In step 2612, the file delivery system may acquire interactivity resources from the file data flows received from the Service SI acquisition module for the interactivity enabled real-time services to which the device is subscribed. In step 2614, interactivity applications (ITV apps) may register with the application manager to receive interactivity events. In various embodiments, interactivity applications may register to receive one or more types of interactivity events in step 2614.

In step 2616, the interactivity events manager may determine that the receiver device is currently tuned into a real-time channel. Turning to FIG. 26B, in step 2618, the interactivity events manager may interface with the overhead data acquisition module to acquire interactivity event signaling messages. In step 2620, the overhead data acquisition module may acquire interactivity signaling messages from the auxiliary flow received from the System SI acquisition for the currently tuned real-time service, as well as any unbound real-time service from the reserved Service ID. In step 2622, the overhead data acquisition module may send acquired interactivity event signaling messages to the interactivity events manager. In step 2624, the interactivity events manager may perform events filtering and drop those interactivity event signaling messages which currently are not applicable to the receiver device. As described above, in various embodiments, this filtering may be performed based on target criteria included in the interactivity event signaling message. If the interactivity events manager determines that application data is not included in-band in the event signaling message it may also acquire the necessary application data file from the file delivery system or from device memory (via the resource manager) based on the application data file reference received in the event signaling message.

In step 2626, the interactivity events manager may pass the filtered events to the applications manager along with the associated application data. The applications manager may determine if there are applications already registered to receive interactivity events. In various embodiments, this determination may be based on, for example, application ID, mime type for event application data, event name, and/or event type. In step 2628, if one or more interactivity applications are registered to receive the filtered interactivity events, the applications manager may send the interactivity events to those applications. In step 2630, the user agent may perform the function of routing interactivity events to the correct interactivity event application. In step 2632, if an interactivity event requires an interactivity resource (e.g., image/graphics) to be shown, the interactivity event may access that resource from the file delivery system. In step 2634, the interactivity application displays the interactivity sequence based on the received application data and interactivity assets.

Figure 27:
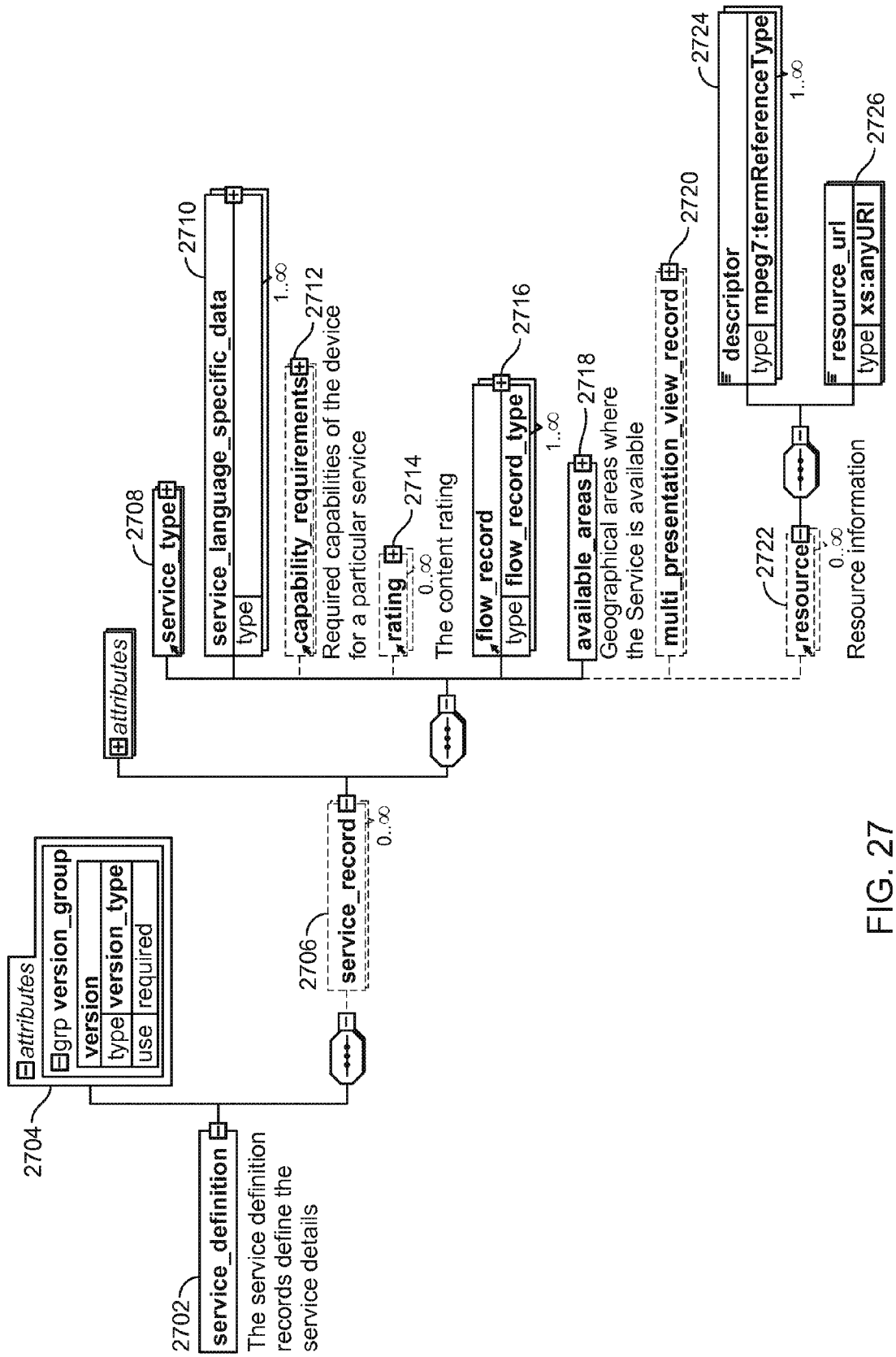
FIG. 27 illustrates an example Service SI data schema suitable for use with an embodiment.

FIG. 27 illustrates an example data schema for the service definition message of the Service SI overhead information. FIG. 27 also illustrates how the Service SI can be used to indicate the file data flow and auxiliary flow for a real-time service. For instance, FIG. 27 illustrates that a Service SI may include a service definition 2702 defining the service details, which may include an attributes 2704 element and a service record 2706 element. An interactive real-time-service service record 2706 may include a resource element 2722 that provides information on the flow ID or resource URL 2726 of the associated file data flow and the auxiliary flow. In various embodiments, the real-time-service service record 2706 may also include a service type 2708, service language specific data 2710, capability requirements 2712, ratings 2714, flow record 2716, available areas information 2718, and a multi-presentation view record 2720.

In various embodiments, the resource element 2722 may also include a descriptor element 2724 and a resource URL element 2726. The descriptor element 2724 provides description for the resource URL e.g. indicating whether resource information they need to acquire interactivity event resources and signaling messages from the correct file data flows, signaling overhead flows and/or external sources (e.g., a source accessed at the URL). In various embodiments, the descriptor element 2724 may indicate that the resource element is describing a file data flow or an auxiliary flow. In various embodiments, the descriptor element 2724 may be a controlled term reference that may be used for size optimization. In an embodiment, the descriptor control term may refer to the "itv-file-service" term in a resource descriptor classification scheme for a particular file data flow. In an embodiment, the descriptor 2724 control term may refer to the "itv-aux-flow" term in the resource descriptor classification scheme for an auxiliary flow.

In various embodiments, a snippet of a resource descriptor classification scheme highlighting the control term for "itv-file-service" and "itv-aux-flow" may be:

```
<?xml version="1.0" encoding="UTF-8"?>
<ClassificationScheme uri="urn:mf:rsDsc:usa" type="rsDsc"
xmlns="urn:mpeg:mpeg7:schema:2001" xmlns:xsi="http://www.w3.org/2001/XMLSchema-
instance" xsi:schemaLocation="urn:mpeg:mpeg7:schema:2001 ./mpeg7_parts.xsd">
    <Term termID="1"><Name xml:lang="en-US">Icon</Name>.........</Term>
    <Term termID="2"><Name xml:lang="en-US">Interactivity</Name>
        <Definition xml:lang="en-US">This term defines the set of descriptors for
        interactivity feature</Definition>
        <Term termID="2.1"><Name xml:lang="en-US">itv-aux-
flow</Name></Term>
        <Term termID="2.2"><Name xml:lang="en-US">itv-file-
service</Name></Term>
    </Term>
</ClassificationScheme>
```

As discussed above, in various embodiments, interactivity event resources and signaling messages may be obtained from non-broadcast sources, such as via a unicast network, by accessing a URL included in the System SI. In various embodiments, the resource url element 2726 identifying a file data flow can be of the format: 'itv:fileService-<serviceID>'. The resource url element 2726 identifying an auxiliary flow can be of the format: 'itv:auxFlow-<flowID>'. A snippet of an example service record for a real-time service in the service definition SI message highlighting the resource element for file data flow and auxiliary flow is provided below. It should be noted that the value "resource-url:2.1" in this example for the descriptor element refers to the Term with TermID 2.1 in the classification scheme with the alias resource-us1.

```
<service_record default_language="en-us" service_id="65535" validity_time="0"
abbreviated_name="String" genre="Text" corporate_affiliation="String">
    <service_type><real_time.......></service_type>
    ..............
    <resource>
        <descriptor>resource-us1:2.1</descriptor><resource_url>itv:auxFlow-
205</resource_url>
    </resource>
    <resource>
        <descriptor>resource-us1:2.2</descriptor><resource_url>itv:fileService-
43</resource_url>
    </resource>
</service_record>
```

URL specifies flow ID for a file data flow or overhead signaling flow. These data fields provide receiver devices with the In another embodiment, interactivity event application data, components, metadata and sequence logic may be broadcast over a file data flow for reception by receiver devices in a format that enables the receiver devices to generate a device-compatible interactivity event application. In this embodiment, rather than generating an interactivity application in the interactivity application generator 31 within the broadcast system, the components parts of such an application are broadcast as files over the file delivery system. Receiver devices acquire the application assets, application data, metadata and associated files via the file delivery system, such as by identifying the appropriate files within a received interactivity catalog file as described above. Such received data and application components may be assembled within the receiver device in the software and application modules described above with reference to FIG. 2. Since the receiver devices decides the type of interactivity event application that may be generated based upon their own capabilities, this embodiment may reduce the bandwidth required to transmit interactivity applications, since the broadcast system does not need to broadcast several varieties of each event applications to accommodate a variety of receiver device types.

Figure 28:
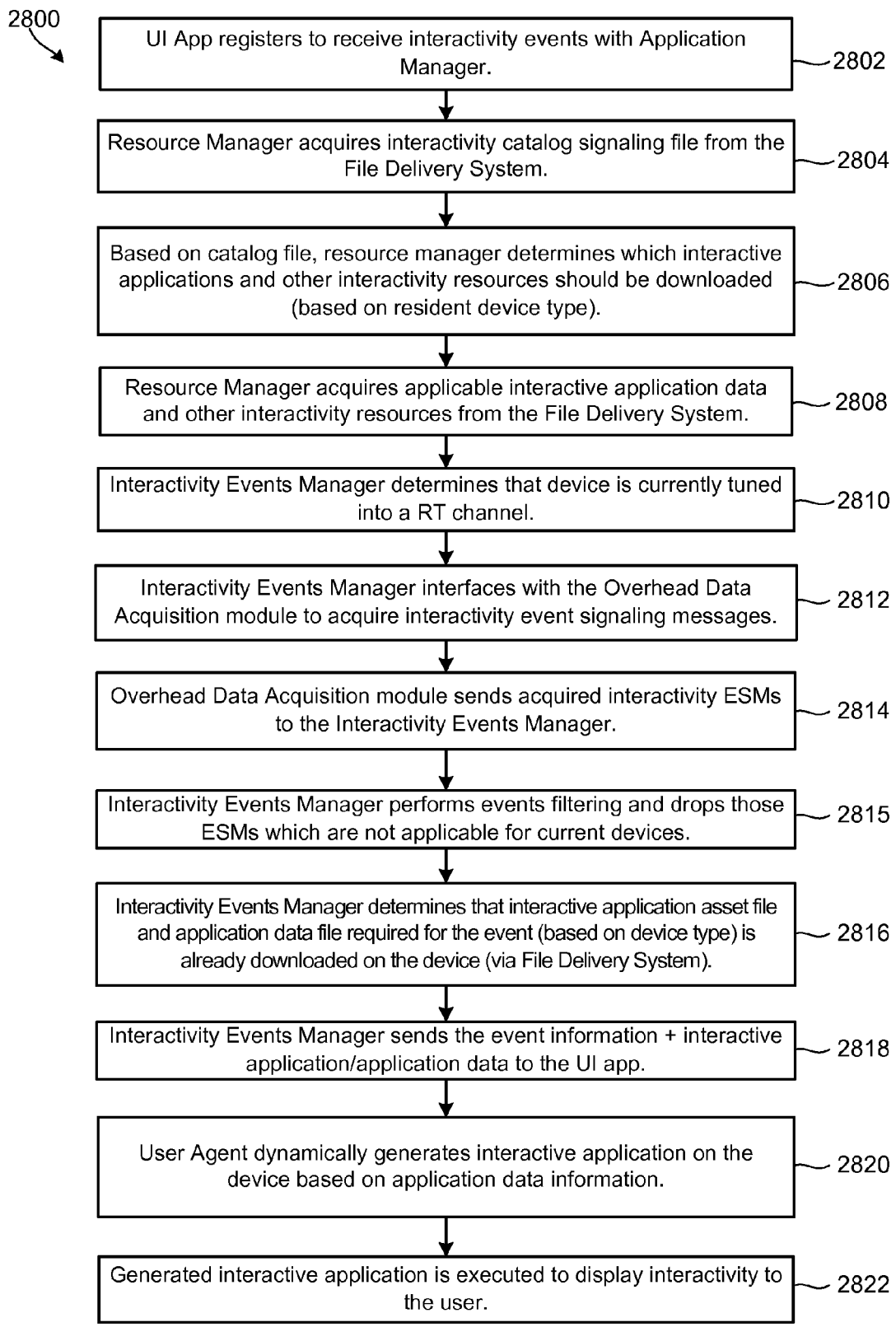
FIG. 28 is a process flow diagram of an embodiment method for receiving interactivity event elements and generating the appropriate interactivity event within a receiver device.

An example method 2800 that may be implemented within receiver devices for generating interactivity event applications is illustrated in FIG. 28. In step 2802 of method 2800, the user interface applications may register with an applications manager (or interactivity events manager) to receive interactivity events and related information via the overhead data acquisition module and file delivery system. In step 2804, the receiver device resource manager may acquire an interactivity catalog signaling file from the file delivery system. In step 2806, the resource manager may use the catalog signaling file to determine which interactivity applications data, interactivity assets and other interactivity resources should be downloaded. In an embodiment, this decision by the resource manager may take into account the resident applications and receiver device type and capabilities, so that only those resources and interactivity applications data that are relevant to and compatible with the receiver device are acquired. In various embodiments, the catalog signaling file may include the metadata with a data schema similar to the examples illustrated in FIGS. 24A-24D, enabling the receiver device to identify application assets, application data and resources required for displaying interactivity events. It should be noted that, in various embodiment, in the catalog file, applications data may be referred to as another resource file.

In step 2808, the resource manager may acquire the applicable interactivity application assets, application data and other interactivity resources from the file delivery system at the schedule broadcast time. In step 2810, the interactivity events manager may determine whether the device is currently tuned to a real-time channel. If the receiver device is tuned to a real-time channel, the interactivity events manager may interface with the overhead data acquisition module to acquire interactivity event signaling messages associated with the monitored real-time channel in step 2812. In step 2814, the overhead data acquisition module may send the acquired interactivity event signaling messages to the interactivity events manager. In step 2815, the interactivity events manager may perform event filtering and drop those interactivity event signaling messages that are not compatible with the receiver device or applications resident on the device. In step 2816, the interactivity events manager may determine whether the interactivity application asset files or application data files required for an interactivity event (based on the device type) is already downloaded and stored in memory on the device (via the file delivery system).

If the required information, resources and/or files have been acquired, the interactivity events manager sends the event information and interactivity application data and assets to the user interface application in step 2818. In step 2820, if the application data was received as part of the interactivity event signaling message, the user agent may dynamically generate the interactivity event application on the receiver device based upon the application data information it has received. In this step 2820, the user agent performs a similar function to that described above for the interactivity application generator within the broadcast headend. Namely, the user agent may assemble interactivity sequences, display content, user interface functionality, and sequencing logic into an executable application. In step 2822, the generated interactivity application is executed on the receiver device including displaying the interactivity event to the user, accepting user inputs, and executing the functionality defined for each user input.

In order to enable receiver devices to receive and assemble interactivity event application assets, application data, resources and event metadata into executable applications, the interactivity application data, resources and metadata may be identified in an application data file using a data schema such as illustrated in FIGS. 29-36. This data schema may be implemented in a manner similar to that described above with reference to FIGS. 25A-27. This data schema ensures that the receiver devices are informed about the display images, the display sequences, the user prompts to be displayed, user input functionality, display state timeout values, and sequence logic.

Figure 29:
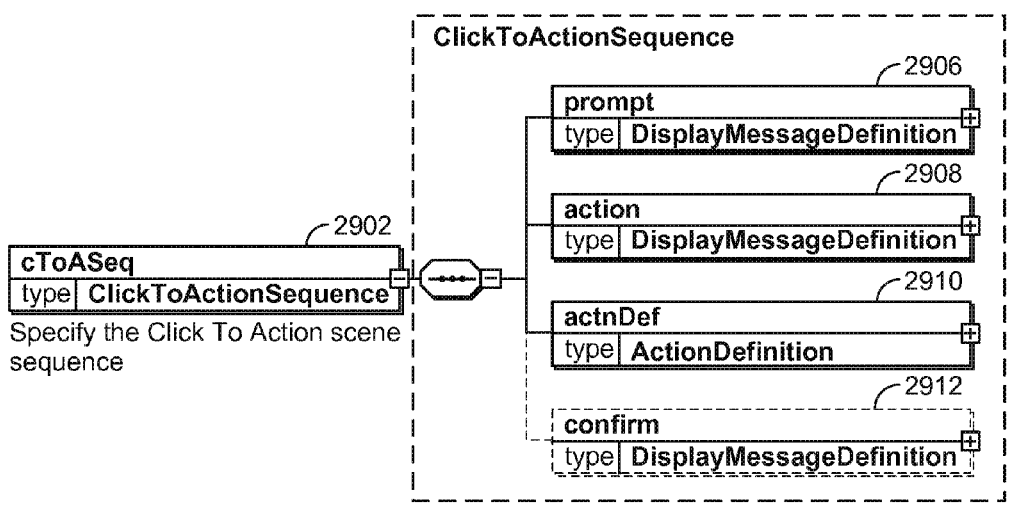
FIG. 29-36 illustrate example interactivity event generation data schema suitable for use with various embodiments.

For example, a user input functionality may be defined in a click to action scene sequence data schema as illustrated in FIG. 29 which a receiver device may use to specify the Click-to-Action scene sequence. The click to action sequence 2902 data may include a prompt scene 2906 element, an action scene 2908 element, an action definition 2910 element and a confirmation scene 2912 element.

Figure 30:
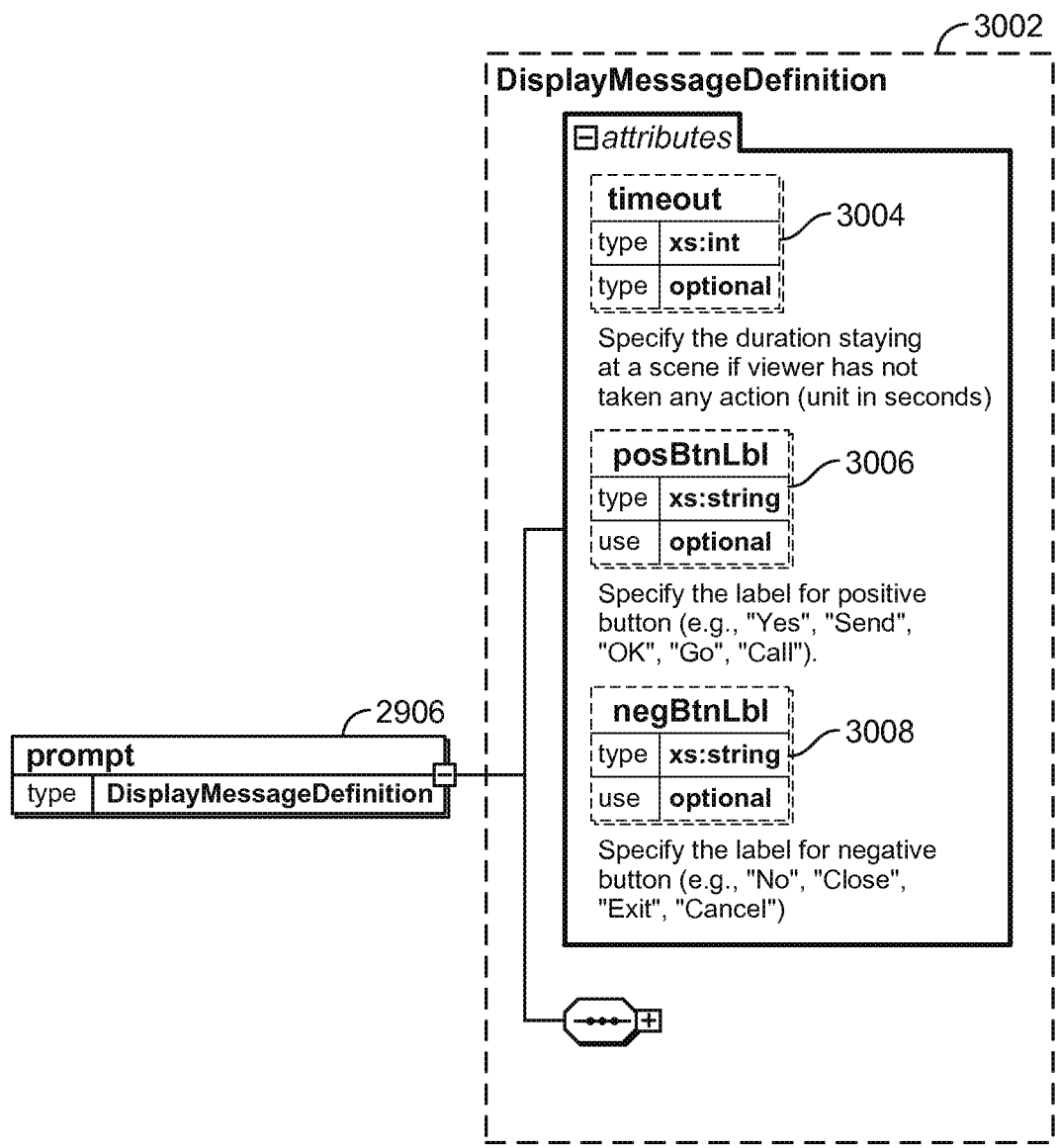

Example data elements of the prompt element for defining the timeout associated with a prompt scene, and the labels associated with various user inputs are illustrated in FIG. 30. For example, the prompt scene element 2906 of the click-to-action data schema may include a display message definition 3002 element that includes a timeout element 3004, a positive button label element 3006, and a negative button label element 3008. The timeout 3004 element may specify the duration (e.g., in seconds) that the system should maintain a screen display if the viewer has not taken an action. The positive button label element 3006 may specify a label for a positive button (e.g., Yes, Send, Ok, Go, Call). Likewise, the negative button label element 3008 may specify a label for a negative button (e.g., No, Close, Exit, Cancel).

Figure 31:
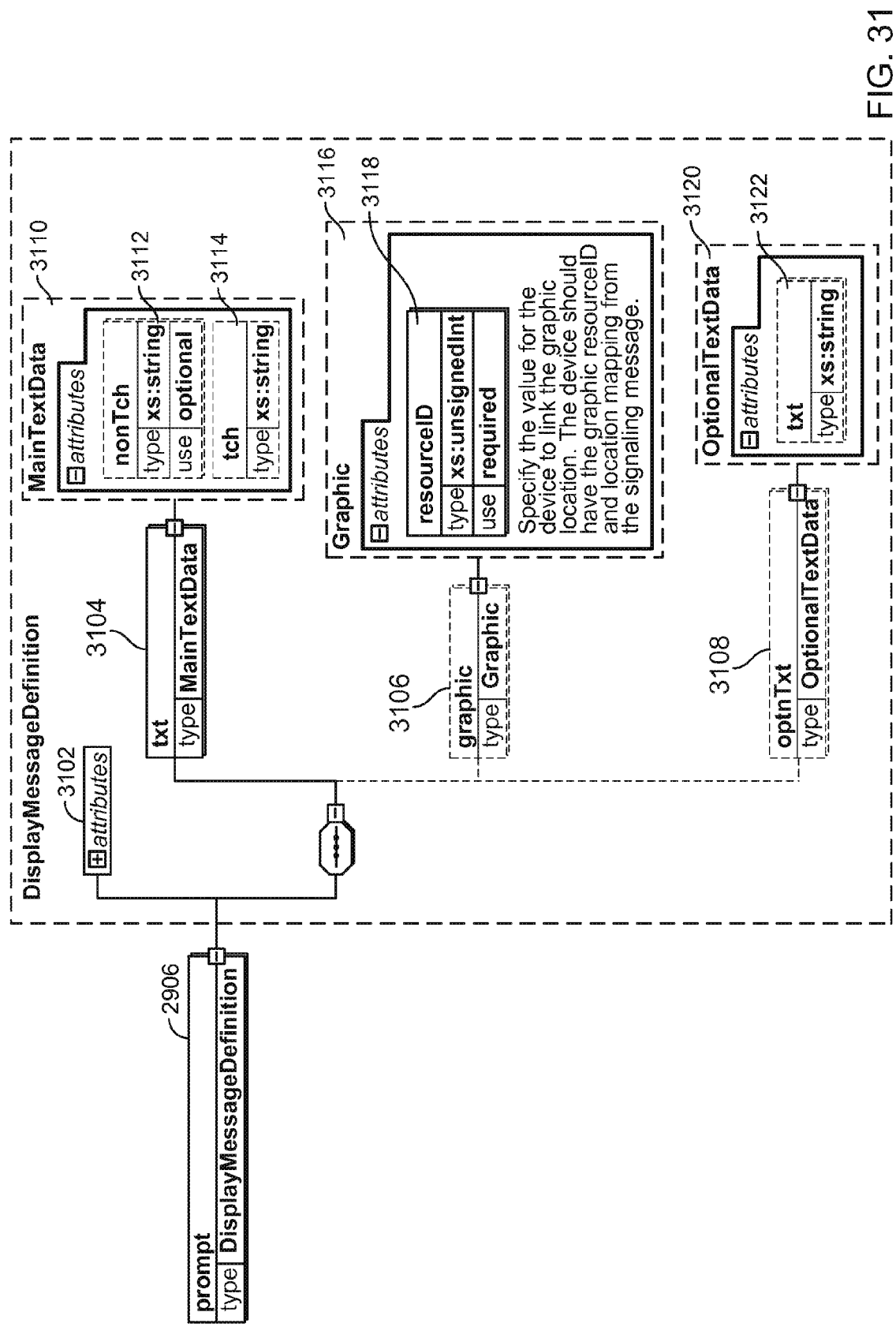

As illustrated in FIG. 31, the prompt scene element 2906 in the click-to-action data schema may further define the text 3104 to be included in the prompt, identify any graphics elements 3106 and include optional text 3108 that may be displayed within the prompt scene. The text 3104 may contain a main text data element 3110 which may included different text to cover the cases where the receiver device has buttons (i.e., is not touchscreen device) in a non touch element 3112 and has a touchscreen in a touch element 3114. The graphics element 3106 may include a graphic type element 3116 including a resource ID 3118 of a resource where the graphics can be obtained. An optional text element 3108 may include an optional text data field 3120 that includes a text data field 3122.

Figure 32:
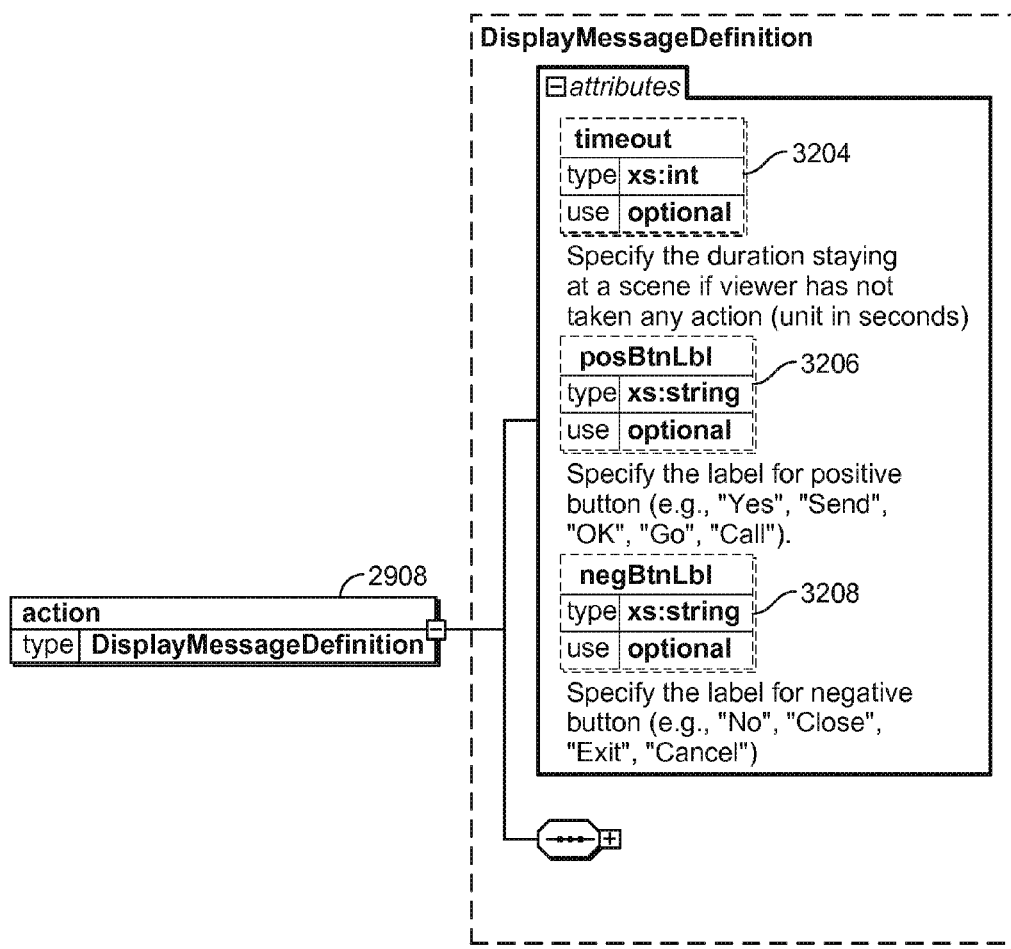
Figure 33:
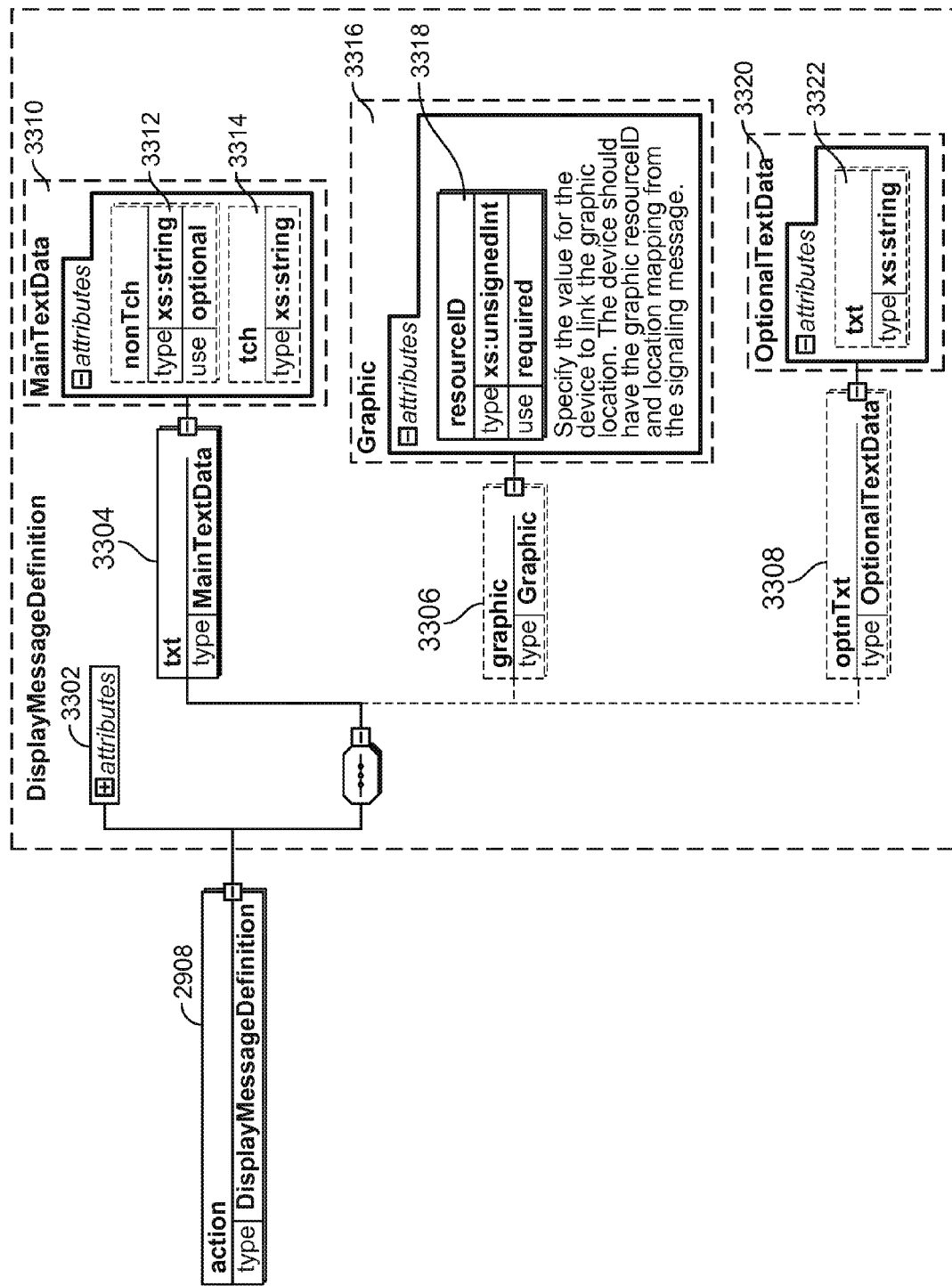

Similarly, action scenes elements may include the elements illustrated in FIGS. 32 and 33. For example, an action element 2908 may include a display message definition element that includes a timeout element 3204, a positive button label element 3206, and a negative button label element 3208. The timeout element 3204 may specify the duration (e.g., in seconds) that the system should display a screen if viewer has not taken an action. The positive button label element 3206 may specify a label for a positive button (e.g., Yes, Send, Ok, Go, Call), and the negative button label element 3208 may specify a label for a negative button (e.g., No, Close, Exit, Cancel). The action element 2908 may further include the text 3304 to be included in the action scene, identify any graphics elements 3306 and include optional text 3308 that may be displayed within the action scene. The text 3304 may contain a main text data element 3310 and separate texts for non-touchscreen and touchscreen devices in a non touch element 3312 and a touch element 3314. The graphics element 3306 may include a graphic type 3316 including a resource ID 3318 identifying where the graphics can be obtained. The optional text element 3308 may include an optional text data field 3320 that includes a text data field 3322.

Figure 34:
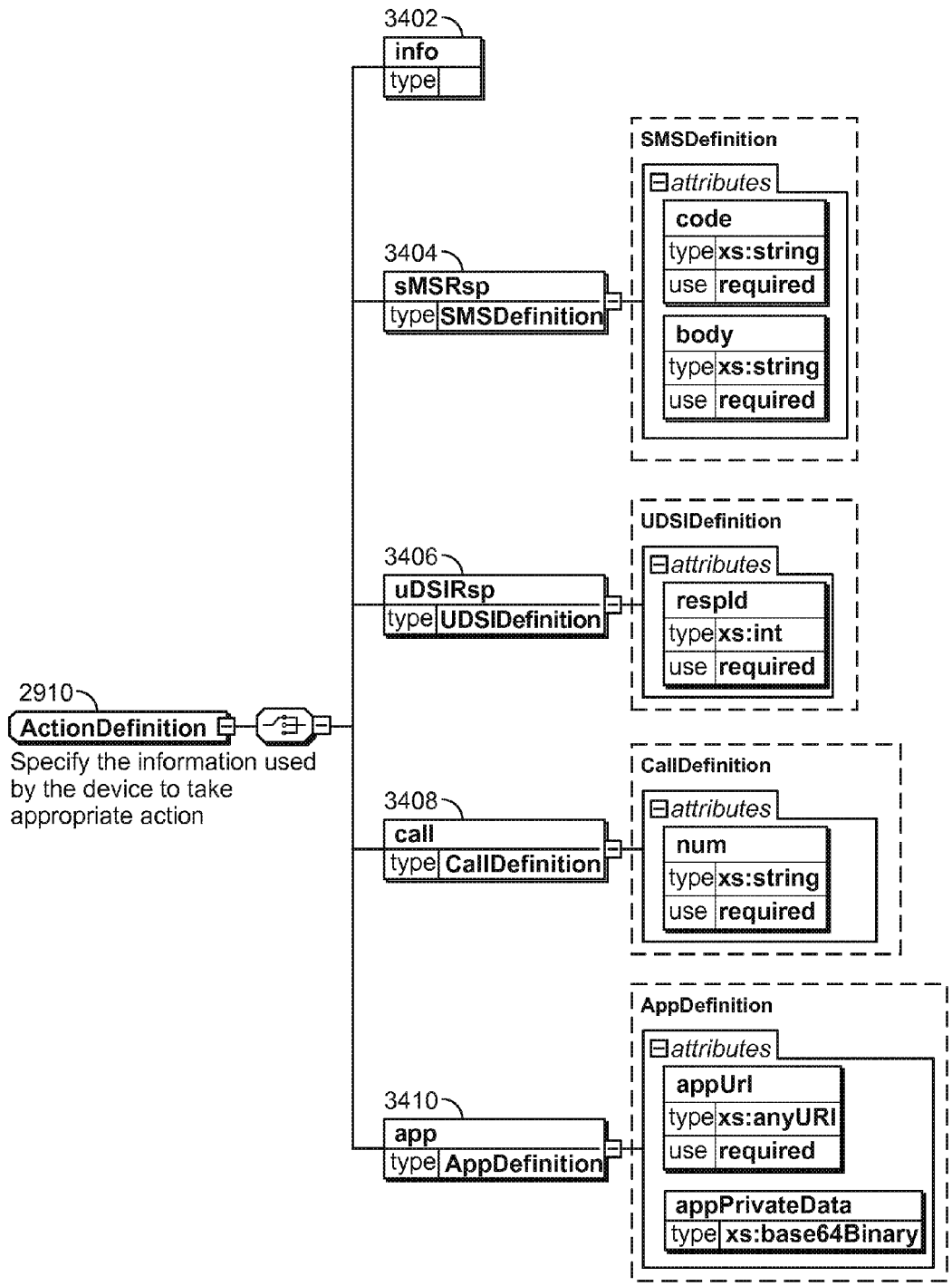

The action definition associated with an interactivity event application may be communicated in message using the data schema illustrated in FIG. 34. As illustrated, an action definition element 2910 may include information 3402 regarding the action definition, as well as code or information that may be used to complete the action, such as information needed to send an SMS message 3404, a UDSI (unicast based) reply 3406, place a call 3408, and/or activate an application 3410 on the device (through a URL).

Figure 35:
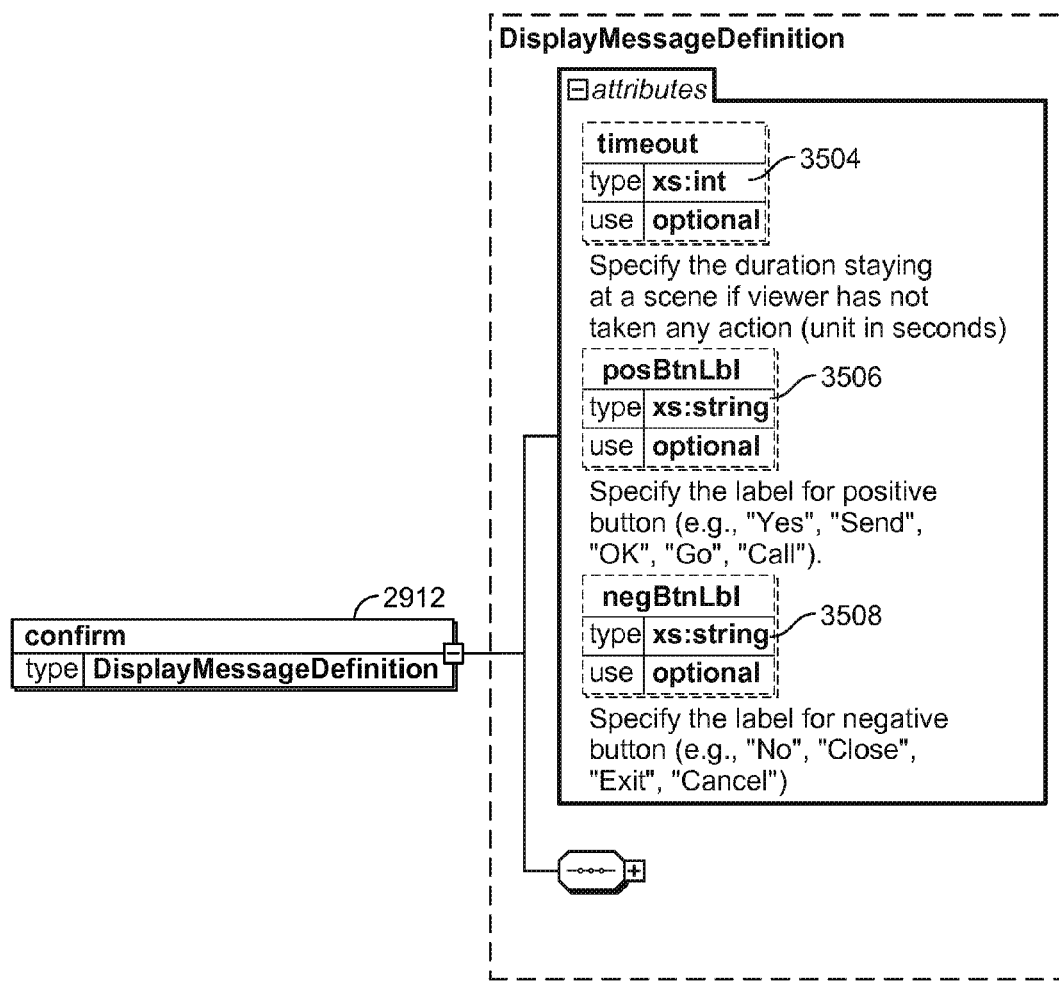
Figure 36:
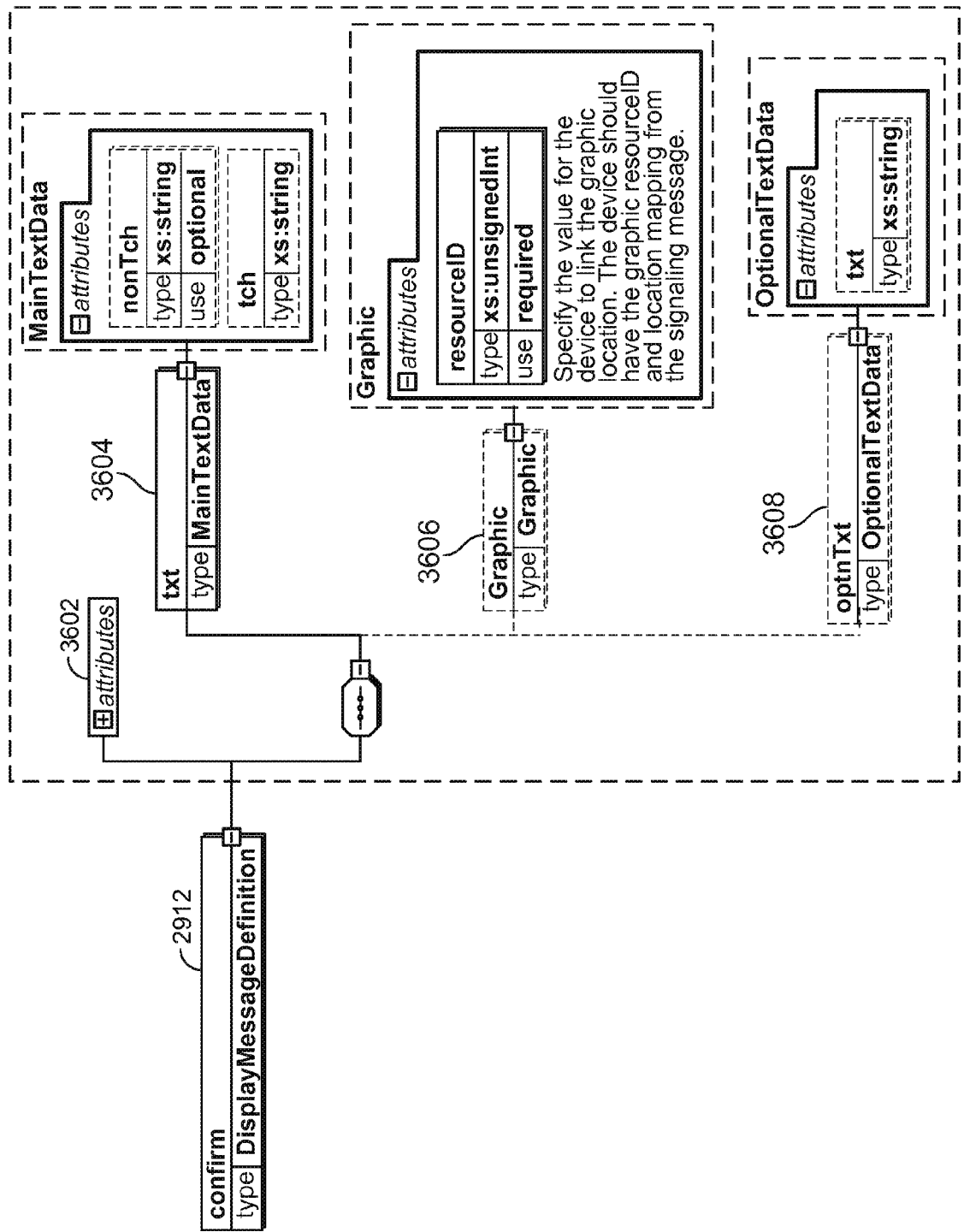

Confirmation scenes may be defined by messages sent using the data schema illustrated in FIGS. 35 and 36. FIG. 35 illustrates that the confirm element 2912 may include a display message definition element that includes a timeout element 3504, a positive button label element 3506, and a negative button label element 3508. FIG. 36 illustrates that the confirm 2912 element may further include text 3604 to be included in the confirm scene, identify any graphics elements 3606, and include optional text 3608 that may be displayed within the confirm scene.

Figure 37:
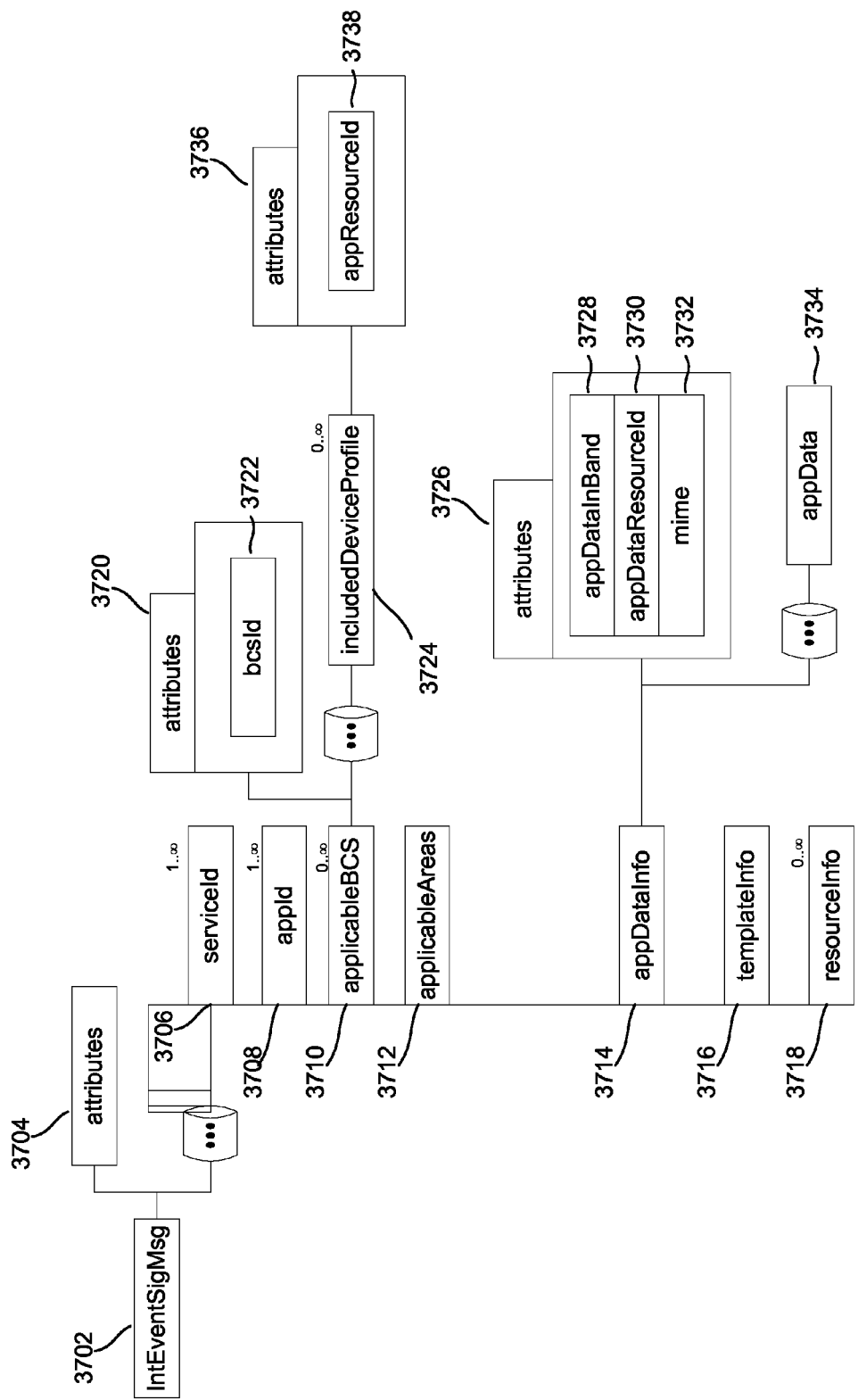
FIG. 37 illustrates a example data scheme for implementing an interactivity event signal message (IESM).

FIG. 37 illustrates a sample data scheme for implementing an interactivity event signal message (IESM). Specifically, an interactivity event signal message 3702 may include an attributes field 3704 and various elements, such as a service ID element 3706, a application ID element 3708, an applicable BCS element 3710, an applicable areas element 3712, an application data information element 3714, a template information element 3716, and a resource information element 3718. The applicable BCS element 3710 may include an attributes field 3720 including a BCS ID field 3722, and an included device profile element 3724 that contains an attributes field 3736 including an application resource ID field 3738. The application resource ID field 3738 is used to fetch the appropriate application data resource for an event based on device profile if different application data is generated for different device types. The application data information element 3714 may include an application data field 3734 and an attributes field 3726 including an application data in band element 3728, and application data resource ID element 3730, and a mime type element 3732.

Figure 38:
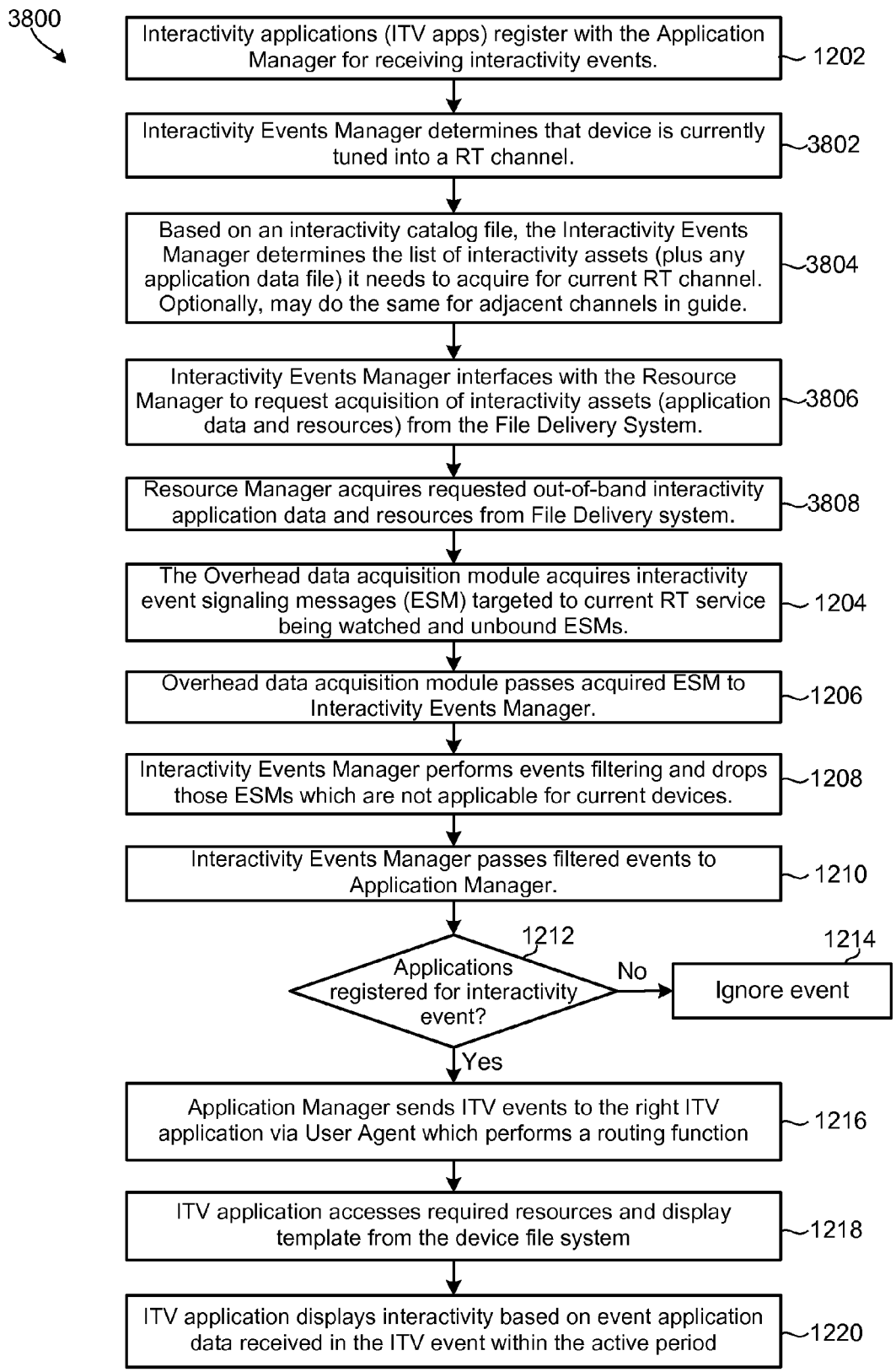
FIG. 38 is a process flow diagram of an embodiment method for receiving interactivity event application data and resources limited to a monitored channel and, optionally, a channel on either side of the monitored channel within a program listing.

FIG. 38 illustrates an example method 3800 for receiving and processing interactivity event signaling messages in receiver devices so that only those events related to a currently monitored channel are received and processed. In method 3800 in step 1202, interactivity applications active on a mobile device may register with the application manager in order to receive interactivity events in a manner similar to that described above with reference to FIG. 12. In step 3802, the interactivity events manager may determine whether the device is currently tuned into a real-time channel, including identifying the particular channel being monitored. In step 3804, the interactivity events manager may access a received interactivity catalog file to determine the list of interactivity assets (i.e., application data and resource files) that are needed to execute interactivity events scheduled for the currently monitored real-time channel. Reception of the interactivity catalog file is described above.

Optionally, in step 3804, the interactivity events manager may also use the interactivity catalog file to determine the interactivity assets that would be needed to execute interactivity events on one or two real-time channels adjacent to the currently monitored real-time channel in the program guide listing (i.e., the on-screen channel guide user interface that enable users to select a channel for viewing). This embodiment enables receiver devices to prepare to display interactivity events in an adjacent channel so that a user scrolling through broadcast channels will see interactivity events in successive channels without delay. This embodiment also reduces the amount of interactivity event data and resources that receiver devices must routinely download.

In step 3806, the interactivity events manager may interface with the resource manager to request acquisition of the identified interactivity assets (i.e., application data and resource). The resource manager may use the asset acquisition request to acquire those files from the file delivery system. In this embodiment, interactivity event application data that is transmitted out of band (e.g., in an interactivity event resource file delivery stream) may be received and stored in memory until the interactivity event is scheduled to begin. The interactivity events manager may accomplish this by passing a resource ID or the event ID and application ID to the overhead data acquisition module which selectively receives interactivity event assets for registered application IDs for the identified event from overhead flows received from the FLO network, or by using the event ID and registered application IDs as filtering criteria for selectively processing interactivity events. Such filtering may also or alternatively be accomplished based on resource IDs, channel ID, program information, and any other information than enables the device to selectively receive interactivity event assets relevant to the monitored channel (and optionally adjacent channels). In various embodiments and implementations, the interactivity applications may request specific interactivity events to be received from the broadcast channel or a file delivery data flow based on different factors and filters, such as based on unique event names, unique event types, file delivery system data streams, etc.

In step 3808, the resource manager module may acquire the requested interactivity event application data and resources from the file delivery system as per the logic and method described above with reference to FIG. 23. Thus, in various embodiments, step 3808 may represent the actions performed in response to the request for identified interactivity assets (i.e., application data and resource) received from the interactivity events manager in step 3806.

In step 1204, the overhead data acquisition module may acquire an interactivity event signaling message from the broadcast overhead flow. The overhead data acquisition module may filter interactivity event signaling messages based upon a variety of criteria. In various embodiments, this criterion may include the real-time channel to which the receiver device is currently tuned. For example, in various embodiments, the overhead data acquisition module may only acquire those interactivity event signaling messages which are targeted to the current real-time service being watched. In various embodiments, interactivity event signaling messages that are not tied to a real-time service (e.g., unbound interactivity event signaling messages) may be acquired at any time regardless of which real-time services are being watched, provided that the interactivity event signaling messages satisfy other filtering criteria, such as device type, targeted carrier, user demographics, etc.

In step 1206, the overhead data acquisition module may pass the acquired interactivity event signaling messages to the interactivity events manager. This is illustrated in FIG. 4 by the arrow 4802. In step 1208, the interactivity events manager may perform event filtering and drop any interactivity event signaling messages not applicable to the receiver device or to the current state of the device. In various embodiments, this filtering may be performed based on target criteria included in the event signaling message. In an embodiment, the interactivity event manager may also determine if a mandatory resource or template required to play the interactivity event has already been downloaded from the resource manager in step 1203. In various embodiments, the interactivity event will not be played if the mandatory resource or template is not available at the interactivity event time.

In step 1210, the interactivity events manager may pass filtered interactivity events to the application manager. The application manager may determine if there are any interactivity applications already registered to receive the received interactivity event at step 1212. This determination may be based upon the application ID, mime type for the event application data, event name, event type, or similar information included within the interactivity event signaling message. If the received interactivity event does not match any registered interactivity application (i.e., determination step 1212="No"), the received event may be ignored in step 1214.

If one or more of the interactivity applications registered with the application manager to receive interactivity event matches the received interactivity event signaling message (i.e., determination step 1212="Yes"), the application manager may send the interactivity event to the appropriate interactivity application via the user agent within the user interface at step 1216. In an embodiment, the user agent may perform the function of routing interactivity events to the correct interactivity application. In step 1218, an interactivity application receiving an interactivity event may access the required resources and templates from the device file system, and use such resources and/or templates to assemble or generate the required interactivity display and functionality. In step 1220, the interactivity application may display the interactivity content based upon the event application data that was received in the interactivity event signaling message.

In various embodiments, method 3800 may be performed in a continuous loop so that the interactivity events manager is continuously providing updated requests for acquisition of interactivity event assets to the resource manager. In these embodiments, the resource manager and overhead data acquisition module may continuously acquire assets required for the interactivity events to be executed in the monitored real-time channel.

Figure 39:
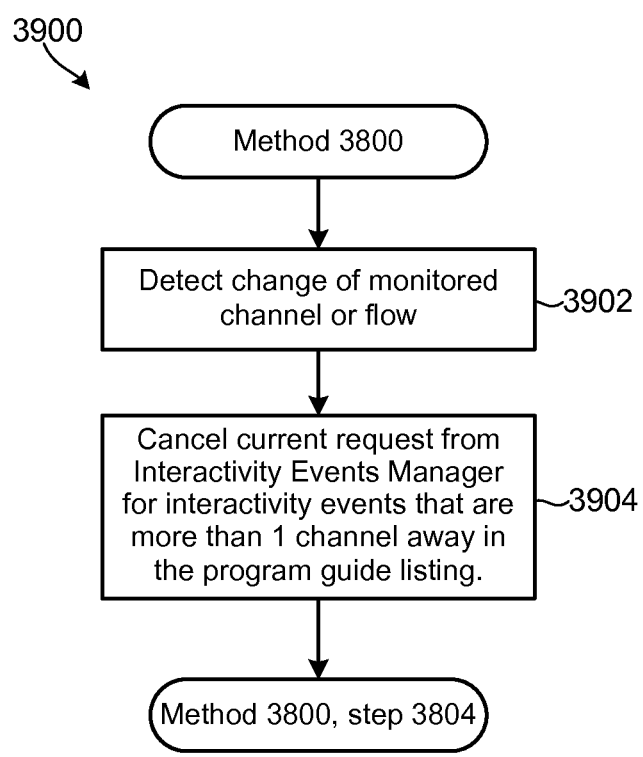
FIG. 39 is a process flow diagram of an embodiment method for receiving interactivity event application data and resources when a monitored channel is changed.

FIG. 39 illustrates a processing method 3900 that allows receiver devices to accommodate users changing channels at any time. At any time during the execution of method 3800, the receiver device processor may detect a change of monitored channel or content flow in step 3902. This step may be part of the functionality executed in response to a user making a channel selection or a scrolling input to the receiver device. As part of step 3902, the interactivity events manager may determine the newly monitored channel.

In step 3904, the interactivity events manager may cancel current request(s) to the resource manager for downloading of interactivity event assets. In embodiments in which interactivity assets are downloaded for the monitored channel and each channel adjacent to it within the program guide (i.e., the channel above and below in the program listing), the interactivity events manager may cancel current request(s) to the resource manager for any channel that is more than one channel away in the program guide listing. In this manner, as a user changes channels, requests for interactivity event assets that have not yet been supported (i.e., the requested assets have not yet been received) relevant to real-time channels which are now more than one or two channels away in the program listing are canceled so that the receiver device does not extend power and processing time to acquire assets that will not be necessary. For example, in an embodiment in which interactivity assets are downloaded for the monitored channel and each channel adjacent to it within the program guide (i.e., the channel above and below in the program listing), when a user scrolls down through the program guide, the interactivity events manager may cancel requests for interactivity event asset downloads associated with the channel that is now two listings removed from the currently monitored channel. As another example, if the user jumps to a channel in the program guide listing that is more than two listings away from the previously monitored channel, the interactivity events manager may cancel all requests for interactivity event asset downloads.

In various embodiments, the number of adjacent channels may be set by setting a configuration setting on the receiver devices. In some embodiments, the number of adjacent channels to which resources and/or assets may be targeted may be controlled by a server in the broadcast network, while in other embodiments the user may control this setting. In various embodiments, the configuration setting may control the number of adjacent channels on each side of a current channel. Thus, in various embodiments, adjacent channels can be configurable such that, instead of acquiring data for next and previous channels, receiver devices can be configured to acquire data for X channels up and Y channels down in the programming guide. For example, in an embodiment, the configuration setting could set such that a receiver device can be configured to acquire data for 2 channels up and 2 channels down in the programming guide. In this example, the configuration setting could designate the number of adjacent channels as being 2 channels on each side, or may expressly designate 2 channels up and 2 channels down.

Returning to FIG. 39, after step 3904, method 3900 may then proceed to step 3804 in method 3800 to use the interactivity catalog file to determine the list of interactivity assets relevant to the newly monitored channel, as well as adjacent channels in some embodiments, with processing proceeding as described above with reference to FIG. 38 until another channel change is detected in step 3902.

Figure 40:
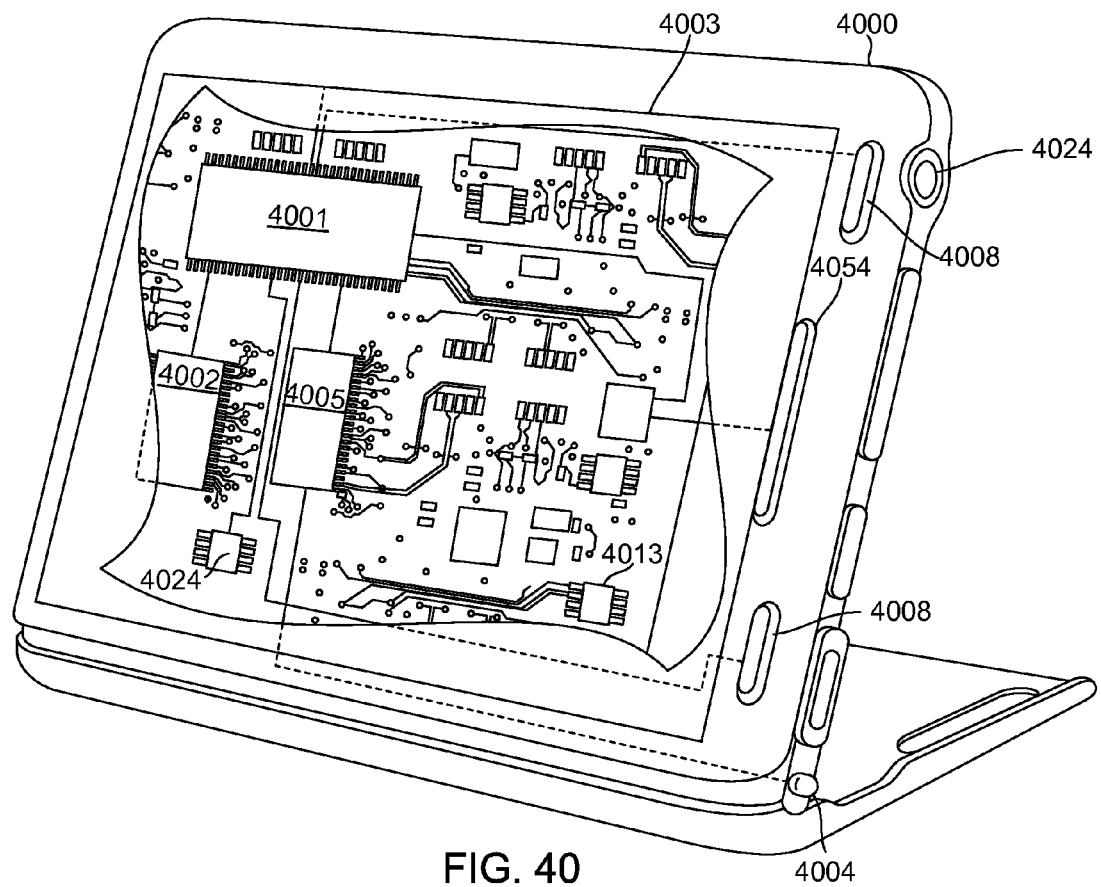
FIG. 40 is a component block diagram of an example receiver device suitable for use with the various embodiments.

FIG. 40 is a system block diagram of a receiver device suitable for use with any of the embodiments. A typical receiver device 4000 may include a processor 4001 coupled to internal memory 4002, a display 4003, and to a speaker 4054. Additionally, the receiver device 4000 may include an antenna 4004 for sending and receiving electromagnetic radiation that may be connected to a wireless data link and/or cellular telephone transceiver 4005 coupled to the processor 4001 and a mobile multimedia broadcast receiver 4024 coupled to the processor 4001. Receiver devices 4000 typically also include menu selection buttons or rocker switches 4008 for receiving user inputs.

The various embodiment methods for receiving and processing interactivity event signaling messages may be performed by the multimedia broadcast receiver 4024 and portions of the processor 4001 and memory 4002. Alternatively dedicated modules within or coupled to the multimedia broadcast receiver 4024 may perform the embodiment methods.

Figure 41:
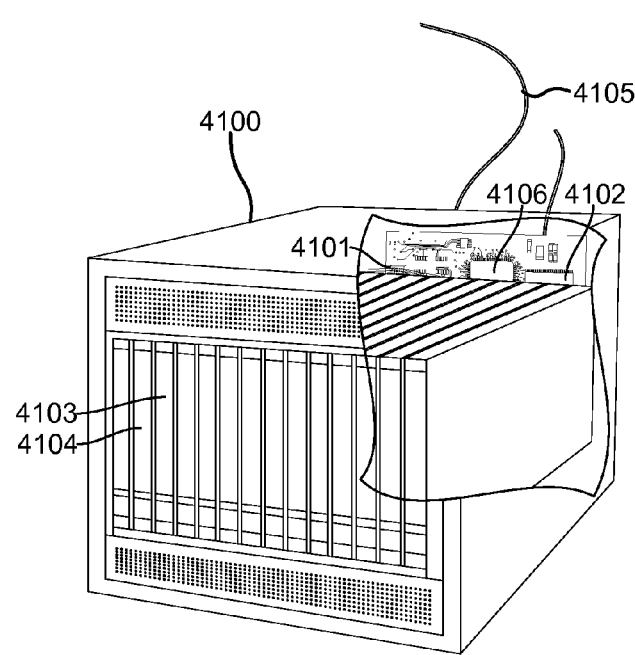
FIG. 41 is a component block diagram of an example server suitable for use with various embodiments.

The various embodiments on the broadcast network side described above may be implemented on any of a variety of commercially available server devices, such as the server 4100 illustrated in FIG. 41. Such a server 4100 typically includes a processor 4101 coupled to volatile memory 4102 and a large capacity nonvolatile memory, such as a disk drive 4103. The server 4100 may also include a floppy disc drive, compact disc (CD) or DVD disc drive 4106 coupled to the processor 4101. The server 4100 may also include network access ports 4104 coupled to the processor 4101 for establishing data connections with a network 4105, such as a local area network coupled to other broadcast system computers and servers.

The processors 4001, 4101 may be any programmable microprocessor, microcomputer or multiple processor chip or chips that can be configured by software instructions (applications) to perform a variety of functions, including the functions of the various embodiments described below. In some mobile receiver devices, multiple processors 4101 may be provided, such as one processor dedicated to wireless communication functions and one processor dedicated to running other applications. Typically, software applications may be stored in the internal memory 4002, 4102, 4103 before they are accessed and loaded into the processor 4001, 4101. The processor 4001, 4101 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such, non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of, non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for processing an interactivity event on a broadcast network, comprising at a server:
   transmitting an information message on an overhead flow, wherein the information message includes information identifying interactivity signaling flows that carry interactivity event signaling messages, and file data flows that carry interactivity event resources, for each of a plurality of real-time channels;
   determining a start time of the interactivity event on one of the plurality of real-time channels;
   generating an interactivity event signaling message for the interactivity event on the one of the plurality of real-time channels, the interactivity event signaling message comprises one or more of an event identifier, a version identifier, filtering criteria, event start time data, event validity duration or end time, and a priority, and further including one or more of application data, resources and templates references to be used by a receiver device in executing the interactivity event on the one of the plurality of real-time channels;

transmitting, over a file data flow identified in the information message for the one of the plurality of real-time channels, interactivity event resources for the interactivity event on the one of the plurality of real-time channels, including application data, templates and assets, close to the determined start time of the interactivity event on the one of the plurality of real-time channels; and transmitting, over an interactivity signaling flow identified in the information message for the one of the plurality of real-time channels, the interactivity event signaling message, wherein the interactivity signaling flow is separate from the file data flow.

2. The method of claim 1, further comprising at the receiver device:

determining if the interactivity event is relevant to a currently monitored real-time channel;

receiving the interactivity event signaling message when the interactivity event is relevant to the currently monitored real-time channel;

passing the interactivity event signaling message to an interactivity application resident on the receiver device; and executing, by using event data and resources, the interactivity event based on the event start time specified in the event start time data of the interactivity event signaling message.

3. The method of claim 1, further comprising at the server:

generating an interactivity catalog file including metadata and filtering information for interactivity application data, resources and templates which are available for reception from the broadcast network; and broadcasting the interactivity catalog file on the broadcast network.

4. The method of claim 3, further comprising at the server:

periodically updating the interactivity catalog file to include updated information regarding application data, resources and templates; and periodically re-broadcasting the updated interactivity catalog file.

5. The method of claim 3, further comprising at the receiver device:

receiving interactivity event application data, resources and templates for a currently tuned real-time channel based on filtering information from the interactivity catalog file; and executing the interactivity event using the received interactivity event application data, resources and templates.

6. The method of claim 5, further comprising at the receiver device:

monitoring the overhead flow of the broadcast network for interactivity event signaling messages either continuously or periodically.

7. The method of claim 5, further comprising at the receiver device:

identifying real-time channels adjacent to the currently tuned real-time channel within a program guide listing, adjacent channels being identified based on a configuration parameter; and acquiring interactivity event application data, resources and templates for the identified real-time channels adjacent to the currently tuned real-time channel within the program guide listing.

8. The method of claim 7, wherein acquiring interactivity event application data, resources and templates for the identified real-time channels adjacent to the currently tuned real-time channel within a program guide listing comprises:

identifying from information within the interactivity catalog file any interactivity application data, resources and templates for the real-time channels adjacent to the currently tuned real-time channel within the program guide listing that should be received by the receiver device;

requesting of the identified interactivity application data, resources and templates for the real-time channels adjacent to the currently tuned real-time channel within the program guide listing;

receiving the identified interactivity application data, resources and templates; and storing the received interactivity application data, resources and templates in memory.

9. The method of claim 7, wherein the configuration parameter is stored on the receiver device and controlled by the server within the broadcast network.

10. The method of claim 7, wherein the configuration parameter designates a set number of channels adjacent to the currently tuned real-time channel within the program guide listing.

11. The method of claim 10, wherein the set number of channels adjacent to the currently tuned real-time channel within the program guide listing is two.

12. The method of claim 7, wherein the configuration parameter designates a set number of channels above the currently tuned real-time channel in the program guide listing and a set number of channels below the currently tuned real-time channel in the program guide listing.

13. The method of claim 12, wherein the set number of channels above the currently tuned real-time channel is two.

14. The method of claim 5, further comprising at the receiver device:

receiving the interactivity catalog file;

identifying a real-time channel that the receiver device is currently monitoring;

determining, from information within the interactivity catalog file, interactivity application data, resources and templates for the currently monitored real-time channel that should be received by the receiver device;

requesting the identified interactivity application data, resources and templates for the currently monitored real-time channel;

receiving the identified interactivity application data, resources and templates; and storing the received interactivity application data, resources and templates in memory.

15. The method of claim 14, further comprising at the receiver device deleting from memory an application data, resource or template that is not listed in the received interactivity catalog file.

16. The method of claim 14, further comprising at the receiver device:

detecting a change of the currently monitored real-time channel to a newly monitored real-time channel;

canceling requests for the identified interactivity application data, resources and templates relevant to the previously monitored real time channel, which are not required for the newly monitored real-time channel;

identifying from information within the interactivity catalog file any interactivity application data, resources and templates relevant to the newly monitored real-time channel that should be received by the receiver device; and requesting of the identified interactivity application data, resources and templates relevant to the newly monitored real-time channel.

17. The method of claim 16, further comprising at the receiver device:
canceling requests for identified interactivity application data, resources and templates relevant to a channel which is not adjacent to the newly monitored real-time channel within a program guide listing;
identifying from information within the interactivity catalog file any interactivity application data, resources and templates relevant to the newly monitored real-time channel and to real-time channels adjacent to the newly monitored real-time channel that should be received by the receiver device; and
requesting the identified interactivity application data, resources and templates relevant to the newly monitored real-time channel and to the real-time channels adjacent to the newly monitored real-time channel within the program guide listing.

18. A communication system, comprising:
a broadcast communication network comprising a transmitter system for broadcasting wireless signals and a server coupled to the transmitter system; and
a receiver device comprising a receiver configured to receive the wireless signals broadcast by the transmitter system, a memory and a receiver device processor coupled to the receiver and the memory,
wherein the server is configured with server-executable instructions to perform operations comprising:
transmitting an information message on an overhead flow, wherein the information message includes information identifying interactivity signaling flows that carry interactivity event signaling messages, and file data flows that carry interactivity event resources, for each of a plurality of real-time channels;
determining a start time of an interactivity event on one of the plurality of real-time channels;
generating an interactivity event signaling message for the interactivity event on the one of the plurality of real-time channels, wherein the interactivity event signaling message includes one or more of an event identifier, a version identifier, filtering criteria, event start time data, event validity duration or end time, and a priority, and further includes one or more of application data, resources and templates references to be used by the receiver device in executing the interactivity event on the one of the plurality of real-time channels;
transmitting, over a file data flow identified in the information message for the one of the plurality of real-time channels, interactivity event resources for the interactivity event on the one of the plurality of real-time channels, including application data, templates and assets, close to the determined start time of the interactivity event; and
transmitting, over an interactivity signaling flow identified in the information message for the one of the plurality of real-time channels, the interactivity event signaling message, wherein the interactivity signaling flow is separate from the file data flow.

19. The communication system of claim 18, wherein the receiver device processor is configured with processor-executable instructions to perform operations comprising:
determining if the interactivity event is relevant to a currently monitored real-time channel;
receiving the interactivity event signaling message when the interactivity event is relevant to the currently monitored real-time channel;
passing the interactivity event signaling message to an interactivity application resident on the receiver device; and
executing, by using event data and resources, the interactivity event based on an event start time specified in the event start time data of the interactivity event signaling message.

20. The communication system of claim 18, wherein the server is configured with server-executable instructions to perform operations further comprising:
generating an interactivity catalog file including metadata and filtering information for interactivity application data, resources and templates which are available for reception from the broadcast network; and
broadcasting the interactivity catalog file on the broadcast network.

21. The communication system of claim 20, wherein the server is configured with server-executable instructions to perform operations further comprising:
periodically updating the interactivity catalog file to include updated information regarding application data, resources and templates; and
periodically re-broadcasting the updated interactivity catalog file.

22. The communication system of claim 20, wherein the receiver device processor is configured with processor-executable instructions to perform operations further comprising:
receiving interactivity event application data, resources and templates for a currently tuned real-time channel based on filtering information from the interactivity catalog file; and
executing the interactivity event in the receiver device using the received interactivity event application data, resources and templates.

23. The communication system of claim 22, wherein the receiver device processor is configured with processor-executable instructions to perform operations further comprising:
monitoring an overhead flow of the broadcast network for interactivity event signaling messages either continuously or periodically.

24. The communication system of claim 22, wherein the receiver device processor is configured with processor-executable instructions to perform operations further comprising:
identifying real-time channels adjacent to the currently tuned real-time channel within a program guide listing, adjacent channels being identified based on a configuration parameter; and
acquiring interactivity event application data, resources and templates for the identified real-time channels adjacent to the currently tuned real-time channel within the program guide listing.

25. The communication system of claim 24, wherein the receiver device processor is configured with processor-executable instructions to perform operations such that acquiring interactivity event application data, resources and templates for the identified real-time channels adjacent to the currently tuned real-time channel within a program guide listing comprises:
identifying from information within the interactivity catalog file any interactivity application data, resources and templates relevant to the real-time channels adjacent to the currently tuned real-time channel that should be received by the receiver device;

requesting of the identified interactivity application data, resources and templates relevant to the real-time channels adjacent to the currently tuned real-time channel;

receiving the identified interactivity application data, resources and templates; and storing the received interactivity application data, resources and templates in memory.

26. The communication system of claim 24, wherein the receiver device processor is configured with processor-executable instructions to perform operations such that the configuration parameter is stored on the receiver device and controlled by the server within the broadcast network.

27. The communication system of claim 24, wherein the receiver device processor is configured with processor-executable instructions to perform operations such that the configuration parameter designates a set number of channels adjacent to the currently tuned real-time channel within the program guide listing.

28. The communication system of claim 27, wherein the receiver device processor is configured with processor-executable instructions to perform operations such that the set number of channels adjacent to the currently tuned real-time channel within the program guide listing is two.

29. The communication system of claim 24, wherein the receiver device processor is configured with processor-executable instructions to perform operations such that the configuration parameter designates a set number of channels above the currently tuned real-time channel in the program guide listing and a set number of channels below the currently tuned real time channel in the program guide listing.

30. The communication system of claim 29, wherein the receiver device processor is configured with processor-executable instructions to perform operations such that the set number of channels above the currently tuned real-time channel is two.

31. The communication system of claim 22, wherein the receiver device processor is configured with processor-executable instructions to perform operations further comprising:

receiving the interactivity catalog file;

identifying a real-time channel that the receiver device is currently monitoring;

determining, from information within the interactivity catalog file, interactivity application data, resources and templates relevant to the currently monitored real-time channel that should be received by the receiver device;

requesting the identified interactivity application data, resources and templates relevant to the currently monitored real-time channel;

receiving the identified interactivity application data, resources and templates; and storing the received interactivity application data, resources and templates in memory.

32. The communication system of claim 31, wherein the receiver device processor is configured with processor-executable instructions to perform operations further comprising deleting from memory an application data, resource or template that is not listed in the received interactivity catalog file.

33. The communication system of claim 31, wherein the receiver device processor is configured with processor-executable instructions to perform operations further comprising:

detecting a change of the currently monitored real-time channel to a newly monitored real-time channel;

canceling requests for interactivity resources associated with the previously monitored real time channel which are not required for the newly monitored real-time channel;

identifying from information within the interactivity catalog file any interactivity resources relevant to the newly monitored real-time channel that should be received by the receiver device; and requesting the identified interactivity resources relevant to the newly monitored real-time channel.

34. The communication system of claim 33, wherein the receiver device processor is configured with processor-executable instructions to perform operations further comprising:

canceling requests for identified interactivity application data, resources and templates relevant to a channel which is not adjacent to the newly monitored real-time channel within a program guide listing;

identifying from information within the interactivity catalog file any interactivity application data, resources and templates relevant to the newly monitored real-time channel and to real-time channels adjacent to the newly monitored real-time channel that should be received by the receiver device; and requesting the identified interactivity application data, resources and templates relevant to the newly monitored real-time channel and to the real-time channels adjacent to the newly monitored real-time channel.

35. A server of a broadcast system configured to process an interactivity event on a broadcast network, the server comprising:

a memory; and a processor coupled to the memory, wherein the processor is configured with processor-executable instructions to perform operations comprising:

transmitting an information message on an overhead flow, wherein the information message includes information identifying interactivity signaling flows that carry interactivity event signaling messages, and file data flows that carry interactivity event resources, for each of a plurality of real-time channels;

determining a start time of the interactivity event on one of a plurality of real-time channels;

generating an interactivity event signaling message for the interactivity event on the one of the plurality of real-time channels, wherein the interactivity event signaling message including one or more of an event identifier, a version identifier, filtering criteria, event start time data, event validity duration or end time, and a priority, and further including one or more of application data, resources and templates references to be used by a receiver device in executing the interactivity event on the one of the plurality of real-time channels;

transmitting, over a file data flow identified in the information message for the one of the plurality of real-time channels, interactivity event resources for the interactivity event on the one of the plurality of real-time channels, including application data, templates and assets, close to the determined start time of the interactivity event on the one of the plurality of real-time channels; and transmitting, over an interactivity signaling flow identified in the information message for the one of the plurality of real-time channels, the interactivity event signaling message, wherein the interactivity signaling flow is separate from the file data flow.

36. The server of claim 35, wherein the processor is configured with processor-executable instructions to perform operations further comprising:
generating an interactivity catalog file including metadata and filtering information for interactivity application data, resources and templates which are available for reception from the broadcast network; and
broadcasting the interactivity catalog file on the broadcast network.

37. The server of claim 36, wherein the processor is configured with processor-executable instructions to perform operations further comprising:
periodically updating the interactivity catalog file to include updated information regarding application data, resources and templates; and
periodically re-broadcasting the updated interactivity catalog file.

38. A receiver device, comprising:
a receiver configured to receive broadcast signals from a broadcast network;
a memory; and
a processor coupled to the receiver and the memory, wherein the processor is configured with processor-executable instructions to perform operations comprising:
receiving an information message on an overhead flow of the broadcast network, wherein the information message includes information identifying interactivity signaling flows that carry interactivity event signaling messages, and file data flows that carry interactivity resources, for each of a plurality of real-time channels, wherein the interactivity signaling flows are separate from the file data flows;
monitoring a first interactivity signaling flow identified in the information message as carrying interactivity event signaling messages for a current channel and a second interactivity signaling flow identified in the information message as carrying interactivity event signaling messages for a real-time channel adjacent to the current channel within a program listing or a program guide;
receiving an interactivity event signaling message on the first interactivity signaling flow or the second interactivity signaling flow, wherein the interactivity event signaling message includes one or more of an event identifier, a version identifier, filtering criteria, event start time data, event validity duration or end time, and a priority, and further includes one or more of application data, resources and templates references, and expiration times for one or more of resources and templates;
passing the interactivity event signaling message to an interactivity application resident on the receiver device; and
executing, by using the one or more of application data, resources and templates references, the relevant interactivity event based on an event start time specified in the event start time data of the interactivity event signaling message.

39. The receiver device of claim 38, wherein the processor is configured with processor-executable instructions to perform operations further comprising:
receiving interactivity event application data, resources and templates for a currently tuned real-time channel based on filtering information from an interactivity catalog file; and
executing the interactivity event using the received interactivity event application data, resources and templates.

40. The receiver device of claim 38, wherein the processor is configured with processor-executable instructions to perform operations further comprising:
monitoring the overhead flow of the broadcast network for interactivity event signaling messages either continuously or periodically.

41. The receiver device of claim 38, wherein the processor is configured with processor-executable instructions to perform operations further comprising:
identifying real-time channels adjacent to the currently tuned real-time channel within a program guide listing adjacent channels being identified based on a configuration parameter; and
acquiring interactivity event application data, resources and templates for the identified real-time channels adjacent to the currently tuned real-time channel within the program guide listing.

42. The receiver device of claim 41, wherein the processor is configured with processor-executable instructions such that acquiring interactivity event application data, resources and templates for the identified real-time channels adjacent to the currently tuned real-time channel within a program guide listing comprises:
identifying from information within the interactivity catalog file any interactivity application data, resources and templates relevant to the real-time channels adjacent to the currently monitored real-time channel that should be received by the receiver device;
requesting the identified interactivity application data, resources and templates relevant to the real-time channels adjacent to the monitored real-time channel;
receiving the identified interactivity application data, resources and templates; and
storing the received interactivity application data, resources and templates in memory.

43. The receiver device of claim 41, wherein the processor is configured with processor-executable instructions such that the configuration parameter is stored on the receiver device and controlled by a server within the broadcast network.

44. The receiver device of claim 41, wherein the processor is configured with processor-executable instructions such that the configuration parameter designates a set number of channels adjacent to the currently tuned real-time channel within the program guide listing.

45. The receiver device of claim 44, wherein the processor is configured with processor-executable instructions such that the set number of channels adjacent to the currently tuned real-time channel within the program guide listing is two.

46. The receiver device of claim 41, wherein the processor is configured with processor-executable instructions such that the configuration parameter designates a set number of channels above the currently tuned real-time channel in the program guide listing and a set number of channels below the currently tuned real-time channel in the program guide listing.

47. The receiver device of claim 46, wherein the processor is configured with processor-executable instructions such that the set number of channels above the currently tuned real-time channel is two.

48. The receiver device of claim 39, wherein the processor is configured with processor-executable instructions to perform operations further comprising:

receiving the interactivity catalog file;
identifying a real-time channel that the receiver device is currently monitoring;
determining, from information within the interactivity catalog file, interactivity application data, resources and templates relevant to the currently monitored real-time channel that should be received by the receiver device;
requesting the identified interactivity application data, resources and templates relevant to the currently monitored real-time channel;
receiving the identified interactivity application data, resources and templates; and
storing the received interactivity application data, resources and templates in memory.

49. The receiver device of claim 48, wherein the processor is configured with processor-executable instructions to perform operations further comprising deleting from memory an application data, resource or template that is not listed in the received interactivity catalog file.

50. The receiver device of claim 48, wherein the processor is configured with processor-executable instructions to perform operations further comprising:
detecting a change of the currently monitored real-time channel to a newly monitored real-time channel;
canceling requests for interactivity application data, resources and templates associated with the previously monitored real time channel which are not required for the newly monitored real-time channel;
identifying from information within the interactivity catalog file any of the listed interactivity application data, resources and templates relevant to the newly monitored real-time channel that should be received by the receiver device; and
requesting the identified interactivity application data, resources and templates relevant to the newly monitored real-time channel.

51. The receiver device of claim 50, wherein the processor is configured with processor-executable instructions to perform operations further comprising:
canceling requests for identified interactivity application data, resources and templates relevant to a channel which is not adjacent to the newly monitored real-time channel within a program guide listing;
identifying from information within the interactivity catalog file any interactivity application data, resources and templates relevant to the newly monitored real-time channel and to real-time channels adjacent to the newly monitored real-time channel that should be received by the receiver device; and
requesting the identified interactivity application data, resources and templates relevant to the newly monitored real-time channel and to the real-time channels adjacent to the newly monitored real-time channel.

52. A broadcast system, comprising:
means for transmitting an information message on an overhead flow, wherein the information message includes information identifying interactivity signaling flows that carry interactivity event signaling messages, and file data flows that carry interactivity event resources, for each of a plurality of real-time channels;
means for determining a start time of an interactivity event on one of a plurality of real-time channels;
means for generating an interactivity event signaling message for the interactivity event on the one of the plurality of real-time channels, the interactivity event signaling message including one or more of an event identifier, a version identifier, filtering criteria, event start time data, event validity duration or end time, and a priority, and further including one or more of application data, resources and templates references to be used by a receiver device in executing the interactivity event on the one of the plurality of real-time channels;
means for transmitting, over a file data flow identified in the information message for the one of the plurality of real-time channels, interactivity event resources for the interactivity event on the one of the plurality of real-time channels, including application data, templates and assets, close to the determined start time of the interactivity event on the one of the plurality of real-time channels; and
means for transmitting, over an interactivity signaling flow identified in the information message for the one of the plurality of real-time channels, the interactivity event signaling message, wherein the interactivity signaling flow is separate from the file data flow.

53. The broadcast system of claim 52, further comprising:
means for generating an interactivity catalog file including metadata and filtering information for interactivity application data, resources and templates which are available for reception from the broadcast network; and
means for broadcasting the interactivity catalog file on the broadcast network.

54. The broadcast system of claim 53, further comprising:
means for periodically updating the interactivity catalog file to include updated information regarding application data, resources and templates; and
means for periodically re-broadcasting the updated interactivity catalog file.

55. A receiver device configured to receive broadcast signals from a broadcast network, comprising:
means for receiving an information message on an overhead flow of the broadcast network, wherein the information message includes information identifying interactivity signaling flows that carry interactivity signaling messages, and file data flows that carry interactivity resources, for each of a plurality of real-time channels, wherein the interactivity signaling flows are separate from the file data flows;
means for monitoring a first interactivity signaling flow identified in the information message as carrying interactivity event signaling messages for a current channel and a second interactivity signaling flow identified in the information message as carrying interactivity event signaling messages for a real-time channel adjacent to the current channel within a program listing or a program guide;
means for receiving an interactivity event signaling message on the first interactivity signaling flow or the second interactivity signaling flow, wherein the interactivity event signaling message includes one or more of an event identifier, a version identifier, filtering criteria, event start time data, event validity duration or end time, and a priority, and further includes one or more of application data, resources and templates references, and expiration times for one or more of the resources and templates;
means for passing the interactivity event signaling message to an interactivity application resident on the receiver device; and
means for executing, by using the one or more of application data, resources and templates references, the interactivity event based on the event start time specified in the event start time data of the interactivity event signaling message.

56. The receiver device of claim 55, further comprising
means for receiving interactivity event application data, resources and templates for a currently tuned real-time channel based on filtering information from the interactivity catalog file; and
means for executing the interactivity event in the receiver device using the received interactivity event application data, resources and templates.

57. The receiver device of claim 55, further comprising:
means for monitoring an overhead flow of the broadcast network for interactivity event signaling messages either continuously or periodically.

58. The receiver device of claim 55, further comprising:
means for identifying real-time channels adjacent to the currently tuned real-time channel within a program guide listing, adjacent channels being identified based on a configuration parameter; and
means for acquiring interactivity event application data, resources and templates for the identified real-time channels adjacent to the currently tuned real-time channel within the program guide listing.

59. The receiver device of claim 58, wherein means for acquiring interactivity event application data, resources and templates for the identified real-time channels adjacent to the currently tuned real-time channel within a program guide listing comprises:
means for identifying from information within the interactivity catalog file any interactivity application data, resources and templates relevant to the identified real-time channels adjacent to the currently monitored real-time channel that should be received by the receiver device;
means for requesting the identified interactivity application data, resources and templates relevant to the real-time channels adjacent to the monitored real-time channel;
means for receiving the identified interactivity application data, resources and templates; and
means for storing the received interactivity application data, resources and templates in memory.

60. The receiver device of claim 58, further comprising means for storing the configuration parameter on the receiver device such that the configuration parameter is controlled by a server within the broadcast network.

61. The receiver device of claim 58, further comprising means for designating, via the configuration parameter, a set number of channels adjacent to the currently tuned real-time channel within the program guide listing.

62. The receiver device of claim 61, further comprising means for setting the set number of channels adjacent to the currently tuned real-time channel within the program guide listing to two.

63. The receiver device of claim 58, further comprising means for designating, via the configuration parameter, a set number of channels above the currently tuned real-time channel in the program guide listing and a set number of channels below the currently tuned real-time channel in the program guide listing.

64. The receiver device of claim 63, further comprising means for setting the set number of channels above the currently tuned real-time channel to two.

65. The receiver device of claim 56, further comprising:
means for receiving the interactivity catalog file;
means for identifying the real-time channel that the receiver device is currently monitoring;
means for determining, from information within the interactivity catalog file, interactivity application data, resources and templates relevant to the currently monitored real-time channel that should be received by the receiver device;
means for requesting the identified interactivity application data, resources and templates relevant to the currently monitored real-time channel;
means for receiving the identified interactivity application data, resources and templates; and
means for storing the received interactivity application data, resources and templates in memory.

66. The receiver device of claim 65, further comprising means for deleting from memory an application data, resource or template that is not listed in the received interactivity catalog file.

67. The receiver device of claim 65, further comprising:
means for detecting a change of the currently monitored real-time channel to a newly monitored real-time channel;
means for canceling requests for interactivity resources associated with the previously monitored real time channel which are not required for the newly monitored real-time channel;
means for identifying from information within the interactivity catalog file any of interactivity resources relevant to the newly monitored real-time channel that should be received by the receiver device; and
means for requesting the identified interactivity resources relevant to the newly monitored real-time channel.

68. The receiver device of claim 67, further comprising:
means for canceling requests for identified interactivity application data, resources and templates relevant to a channel which is not adjacent to the newly monitored real-time channel within a program guide listing;
means for identifying from information within the interactivity catalog file any interactivity application data, resources and templates relevant to the newly monitored real-time channel and to real-time channels adjacent to the newly monitored real-time channel that should be received by the receiver device; and
means for requesting the identified interactivity application data, resources and templates relevant to the newly monitored real-time channel and to the real-time channels adjacent to the newly monitored real-time channel.

69. A non-transitory computer readable storage medium having stored thereon processor-executable software instructions configured to cause a processor to perform operations for processing an interactivity event on a broadcast network, the operations comprising:
transmitting an information message on an overhead flow, wherein the information message includes information identifying interactivity signaling flows that carry interactivity event signaling messages, and file data flows that carry interactivity event resources, for each of a plurality of real-time channels;
determining a start time of the interactivity event on one of a plurality of real-time channels;
generating an interactivity event signaling message for the interactivity event on the one of the plurality of real-time channels, the interactivity event signaling message including one or more of an event identifier, a version identifier, filtering criteria, event start time data, event validity duration or end time, and a priority, and further including one or more of application data, resources and templates references to be used by a receiver device in executing the interactivity event on the one of the plurality of real-time channels;

transmitting, over a file data flow identified in the information message for the one of the plurality of real-time channels, interactivity event resources for the interactivity event on the one of the plurality of real-time channels, including application data, templates and assets, close to the determined start time of the interactivity event on the one of the plurality of real-time channels; and transmitting, over an interactivity signaling flow identified in the information message for the one of the plurality of real-time channels, the interactivity event signaling message, wherein the interactivity signaling flow is separate from the file data flow.

70. The non-transitory computer readable storage medium of claim 69, wherein the stored processor-executable software instructions are configured to cause a processor to perform operations further comprising:

generating an interactivity catalog file including metadata and filtering information for interactivity application data, resources and templates which are available for reception from the broadcast network; and broadcasting the interactivity catalog file on the broadcast network.

71. The non-transitory computer readable storage medium of claim 70, wherein the stored processor-executable software instructions are configured to cause a processor to perform operations further comprising:

periodically updating the interactivity catalog file to include updated information regarding application data, resources and templates; and periodically re-broadcasting the updated interactivity catalog file.

72. A non-transitory computer readable storage medium having stored thereon processor-executable software instructions configured to cause a receiver device processor to perform operations comprising:

receiving an information message on an overhead flow of a broadcast network, wherein the information message includes information identifying interactivity signaling flows that carry interactivity event signaling messages, and file data flows that carry interactivity resources, for each of a plurality of real-time channels, wherein the interactivity signaling flows are separate from the file data flows;

monitoring a first interactivity signaling flow identified in the information message as carrying interactivity event signaling messages for a current channel and a second interactivity signaling flow identified in the information message as carrying interactivity event signaling messages for a real-time channel adjacent to the current channel within a program listing or a program guide;

receiving an interactivity event signaling message on the first interactivity signaling flow or the second interactivity signaling flow, wherein the interactivity event signaling message includes one or more of an event identifier, a version identifier, filtering criteria, event start time data, event validity duration or end time, and a priority, and further includes one or more of application data, resources and templates references, and expiration times for one or more of the resources and templates;

passing the interactivity event signaling message to an interactivity application resident on the receiver device; and executing, by using the one or more of application data, resources and templates references, the interactivity event based on the event start time specified in the event start time data of the interactivity event signaling message.

73. The non-transitory computer readable storage medium of claim 72, wherein the stored processor-executable software instructions are configured to cause the receiver device processor to perform operations further comprising:

receiving interactivity event application data, resources and templates for a currently tuned real-time channel based on filtering information from the interactivity catalog file; and executing the interactivity event in the receiver device using the acquired interactivity event application data, resources and templates.

74. The non-transitory computer readable storage medium of claim 73, wherein the stored processor-executable software instructions are configured to cause the receiver device processor to perform operations further comprising:

monitoring an overhead flow of the broadcast network for interactivity event signaling messages either continuously or periodically.

75. The non-transitory computer readable storage medium of claim 73, wherein the stored processor-executable software instructions are configured to cause the receiver device processor to perform operations further comprising:

identifying real-time channels adjacent to the currently tuned real-time channel within a program guide listing adjacent channels being identified based on a configuration parameter; and acquiring interactivity event application data, resources and templates for the identified real-time channels adjacent to the currently tuned real-time channel within the program guide listing.

76. The non-transitory computer readable storage medium of claim 75, wherein the stored processor-executable software instructions are configured to cause the receiver device processor to perform operations such that acquiring interactivity event application data, resources and templates for the identified real-time channels adjacent to the currently tuned real-time channel within a program guide listing comprises:

identifying from information within the interactivity catalog file any interactivity application data, resources and templates relevant to the real-time channels adjacent to the currently monitored real-time channel;

requesting the identified interactivity application data, resources and templates relevant to the real-time channels adjacent to the monitored real-time channel;

receiving the identified interactivity application data, resources and templates; and storing the received interactivity application data, resources and templates in memory.

77. The non-transitory computer readable storage medium of claim 75, wherein the stored processor-executable software instructions are configured to cause the receiver device processor to perform operations such that the configuration parameter is stored on the receiver device and controlled by a server within the broadcast network.

78. The non-transitory computer readable storage medium of claim 75, wherein the stored processor-executable software instructions are configured to cause the receiver device processor to perform operations such that the configuration parameter designates a set number of channels adjacent to the currently tuned real-time channel within the program guide listing.

79. The non-transitory computer readable storage medium of claim 78, wherein the stored processor-executable software instructions are configured to cause the receiver device processor to perform operations such that the set number of channels adjacent to the currently tuned real-time channel within the program guide listing is two.

80. The non-transitory computer readable storage medium of claim 75, wherein the stored processor-executable software instructions are configured to cause the receiver device processor to perform operations such that the configuration parameter designates a set number of channels above the currently tuned real-time channel in the program guide listing and a set number of channels below the currently tuned real-time channel in the program guide listing.

81. The non-transitory computer readable storage medium of claim 80, wherein the stored processor-executable software instructions are configured to cause the receiver device processor to perform operations such that the set number of channels above the currently tuned real-time channel is two.

82. The non-transitory computer readable storage medium of claim 73, wherein the stored processor-executable software instructions are configured to cause the receiver device processor to perform operations further comprising:
   receiving the interactivity catalog file in the receiver device;
   identifying a real-time channel that the receiver device is currently monitoring;
   determining, from information within the interactivity catalog file, interactivity application data, resources and templates relevant to the currently monitored real-time channel that should be received by the receiver device;
   requesting the identified interactivity application data, resources and templates relevant to the currently monitored real-time channel;
   receiving the identified interactivity application data, resources and templates; and
   storing the received interactivity application data, resources and templates in memory.

83. The non-transitory computer readable storage medium of claim 82, wherein the stored processor-executable software instructions are configured to cause the receiver device processor to perform operations further comprising deleting from memory an application data, resource or template that is not listed in the received interactivity catalog file.

84. The non-transitory computer readable storage medium of claim 82, wherein the stored processor-executable software instructions are configured to cause the receiver device processor to perform operations further comprising:
   detecting a change of the currently monitored real-time channel to a newly monitored real-time channel;
   canceling requests for interactivity application data, resources and templates relevant to the previously monitored real-time channel which are not required for the newly monitored real-time channel;
   identifying from information within the interactivity catalog file any interactivity application data, resources and templates relevant to the newly monitored real-time channel that should be received by the receiver device; and
   requesting the identified interactivity application data, resources and templates relevant to the newly monitored real-time channel.

85. The non-transitory computer readable storage medium of claim 84, wherein the stored processor-executable software instructions are configured to cause the receiver device processor to perform operations further comprising:
   canceling requests for identified interactivity application data, resources and templates relevant to a channel which is not adjacent to the newly monitored real-time channel within a program guide listing;
   identifying from information within the interactivity catalog file any interactivity application data, resources and templates relevant to the newly monitored real-time channel and to real-time channels adjacent to the newly monitored real-time channel that should be received by the receiver device; and
   requesting of the identified interactivity application data, resources and templates relevant to the newly monitored real-time channel and to the real-time channels adjacent to the newly monitored real-time channel.

\* \* \* \* \*